US006816296B2

(12) United States Patent
Romanovsky

(10) Patent No.: US 6,816,296 B2
(45) Date of Patent: Nov. 9, 2004

(54) OPTICAL SWITCHING NETWORK AND NETWORK NODE AND METHOD OF OPTICAL SWITCHING

(75) Inventor: Alexander B. Romanovsky, San Jose, CA (US)

(73) Assignee: Teloptics Corporation, San Francisco, CA (US)

( * ) Notice: Subject to any disclaimer, the term of this patent is extended or adjusted under 35 U.S.C. 154(b) by 0 days.

(21) Appl. No.: 10/140,083

(22) Filed: May 6, 2002

(65) Prior Publication Data

US 2003/0063363 A1 Apr. 3, 2003

Related U.S. Application Data

(63) Continuation-in-part of application No. 10/013,336, filed on Nov. 5, 2001, which is a continuation-in-part of application No. 09/434,085, filed on Nov. 5, 1999, now Pat. No. 6,381,060, which is a continuation-in-part of application No. 08/959,778, filed on Oct. 29, 1997, now Pat. No. 6,310,712.
(60) Provisional application No. 10/288,757, filed on May 4, 2001, and provisional application No. 60/245,810, filed on Nov. 3, 2000.

(51) Int. Cl.[7] .............................. G02F 1/03; G02F 1/07
(52) U.S. Cl. ...................... 359/245; 359/128; 359/109; 359/254; 359/322
(58) Field of Search ................................ 359/128, 109, 359/245, 246, 247, 248, 250, 254, 322, 323, 315, 154, 152, 320, 237, 238, 117

(56) References Cited

U.S. PATENT DOCUMENTS

| | | | |
|---|---|---|---|
| 3,458,247 A | 7/1969 | Buhrer et al. | 359/376 |
| 3,497,286 A | 2/1970 | Morton et al. | 359/289 |
| 3,584,223 A | 6/1971 | Aldrich et al. | 250/216 |
| 3,873,187 A | 3/1975 | Brooks | 359/259 |
| 3,958,862 A | 5/1976 | Scibor-Rylski | 359/261 |
| 4,006,963 A | 2/1977 | Baues et al. | 385/37 |
| 4,008,947 A | 2/1977 | Baües et al. | 385/9 |
| 4,125,318 A | 11/1978 | Scibor-Rylski | 359/317 |
| 4,181,399 A | 1/1980 | McMahon et al. | 385/16 |
| 4,196,977 A | 4/1980 | Scibor-Rylski et al. | 359/279 |

(List continued on next page.)

FOREIGN PATENT DOCUMENTS

| | | |
|---|---|---|
| EP | 0 344 857 A1 | 5/1989 |
| GB | 2 304 919 A | 3/1997 |
| JP | 62-85219 | 4/1987 |
| JP | 62-267719 | 11/1987 |
| JP | 05-005922 | 1/1993 |

(List continued on next page.)

OTHER PUBLICATIONS

*Antiferroelectric–Phase PLZT For Use in High Density Optical Data Storage*, S. Mancha, J. Bullington, R. Carter and C. Dehainaut, Airforce Weapons Laboratory (AFSC) Kirtland Airforce Base New Mexico, *Ferroelectrics*, 1988 Gordon and Breach Science Publishers S.A., vol. 82, pp. 99–104.

(List continued on next page.)

Primary Examiner—Ricky Mack
Assistant Examiner—Brandi N Thomas
(74) Attorney, Agent, or Firm—Knobbe, Martens, Olson & Bear, LLP

(57) ABSTRACT

A device, system and method are disclosed for optical communications using beams of light in which a solid state total internal reflection optical switching element is used to switch the optical pathways of optical communications signals inside a node of an optical network. The solid state total internal reflection optical switching element is used in a substantially planar waveguide assembly, and has electro-optically active material which responds to electrical fields greater than a switching electrical field to create a total internal reflection boundary that switches the optical pathway inside the switching element.

13 Claims, 27 Drawing Sheets

U.S. PATENT DOCUMENTS

| | | | |
|---|---|---|---|
| 4,201,442 A | 5/1980 | McMahon et al. ............. 385/17 |
| 4,278,327 A | 7/1981 | McMahon et al. .......... 349/197 |
| 4,281,904 A | 8/1981 | Sprague et al. ............. 359/263 |
| 4,283,113 A | 8/1981 | Eden ........................... 385/18 |
| 4,285,569 A | 8/1981 | Yao et al. |
| 4,367,946 A | 1/1983 | Varner ......................... 355/71 |
| 4,385,799 A | 5/1983 | Soref ........................... 385/17 |
| 4,396,252 A | 8/1983 | Turner ........................ 359/263 |
| 4,406,521 A | 9/1983 | Mir et al. .................... 359/254 |
| 4,410,823 A | 10/1983 | Miller et al. ................ 310/313 |
| 4,451,123 A | 5/1984 | McNeill et al. ............. 359/263 |
| 4,478,483 A | 10/1984 | Sprague |
| 4,491,384 A | 1/1985 | Yamashita et al. |
| 4,514,739 A | 4/1985 | Johnson et al. ............. 347/248 |
| 4,560,994 A | 12/1985 | Sprague ...................... 347/239 |
| 4,563,059 A | 1/1986 | Clark et al. .................. 349/123 |
| 4,585,301 A | 4/1986 | Bialkowski .................. 359/243 |
| 4,645,293 A | 2/1987 | Yoshida et al. ............... 385/40 |
| 4,669,831 A | 6/1987 | Birnbaum et al. .......... 359/318 |
| 4,693,547 A | 9/1987 | Soref et al. ................... 385/16 |
| 4,697,889 A | 10/1987 | Takubo et al. .............. 359/254 |
| 4,728,167 A | 3/1988 | Soref et al. ................... 385/16 |
| 4,739,520 A | 4/1988 | Collins, Jr. et al. ........... 398/45 |
| 4,746,191 A | 5/1988 | Kawakami et al. .......... 385/16 |
| 4,746,942 A | 5/1988 | Moulin ........................ 396/549 |
| 4,765,721 A | 8/1988 | Agostinelli ................. 359/251 |
| 4,766,445 A | 8/1988 | Springer |
| 4,796,982 A | 1/1989 | Kitabatake et al. ......... 359/398 |
| 4,798,435 A | 1/1989 | Fujiwara et al. .............. 385/17 |
| 4,802,741 A | 2/1989 | Kaukeinen ................. 359/254 |
| 4,813,771 A | 3/1989 | Handschy et al. .......... 349/196 |
| 4,815,803 A | 3/1989 | Faulkner et al. .............. 385/24 |
| 4,822,124 A | 4/1989 | Suzuki ......................... 385/17 |
| 4,842,368 A | 6/1989 | Darcie et al. ................. 385/30 |
| 4,865,406 A | 9/1989 | Khanarian et al. .......... 385/122 |
| 4,867,516 A | 9/1989 | Baken ........................... 385/3 |
| 4,867,543 A | 9/1989 | Bennion et al. ............. 359/259 |
| 4,887,104 A | 12/1989 | Kitano et al. ............... 359/246 |
| 4,896,930 A | 1/1990 | Tsuchitani et al. .......... 389/122 |
| 4,919,522 A | 4/1990 | Nelson ....................... 359/246 |
| 4,952,010 A | 8/1990 | Healey et al. ................. 359/11 |
| 4,973,121 A | 11/1990 | Brophy et al. ................ 385/10 |
| 4,988,157 A * | 1/1991 | Jackel et al. ............. 350/96.15 |
| 4,993,811 A | 2/1991 | Blazey et al. ............... 359/251 |
| 5,006,285 A | 4/1991 | Thackara et al. ............ 264/1.2 |
| 5,011,271 A | 4/1991 | Saito et al. .................. 359/259 |
| 5,016,959 A | 5/1991 | Diemeer ...................... 385/16 |
| 5,031,978 A | 7/1991 | Shibaguchi et al. ......... 359/206 |
| 5,033,814 A | 7/1991 | Brown et al. ................. 385/16 |
| 5,036,220 A | 7/1991 | Byer et al. ................... 359/328 |
| 5,040,864 A | 8/1991 | Hong ........................... 385/16 |
| 5,061,028 A | 10/1991 | Khanarian et al. .......... 385/132 |
| 5,078,478 A | 1/1992 | Evans ......................... 359/299 |
| 5,090,824 A | 2/1992 | Nelson et al. ................. 385/22 |
| 5,103,492 A | 4/1992 | Ticknor ......................... 385/9 |
| 5,153,770 A * | 10/1992 | Harris ......................... 359/279 |
| 5,157,541 A | 10/1992 | Schildkraut et al. ........ 359/276 |
| 5,168,535 A | 12/1992 | Laor ............................ 385/16 |
| 5,182,665 A | 1/1993 | O'Callaghan et al. ...... 349/201 |
| 5,189,548 A | 2/1993 | Hecht .......................... 359/263 |
| 5,220,643 A | 6/1993 | Collings ...................... 706/40 |
| 5,221,989 A | 6/1993 | Stappaerts et al. .......... 354/323 |
| 5,255,332 A | 10/1993 | Welch et al. ................. 385/17 |
| 5,260,719 A | 11/1993 | Maloney ..................... 347/135 |
| 5,267,336 A | 11/1993 | Sriram et al. .................. 385/2 |
| 5,274,246 A | 12/1993 | Hopkins et al. .............. 257/17 |
| 5,278,924 A | 1/1994 | Schaffner ...................... 385/3 |
| 5,305,136 A | 4/1994 | Smith ......................... 359/247 |
| 5,337,183 A | 8/1994 | Rosenblatt .................. 359/248 |
| 5,347,377 A | 9/1994 | Revelli, Jr. et al. ......... 349/193 |
| 5,349,466 A | 9/1994 | Delacourt et al. .......... 359/326 |
| 5,367,584 A | 11/1994 | Ghezzo et al. ................ 385/17 |
| 5,367,585 A | 11/1994 | Ghezzo et al. ................ 385/23 |
| 5,369,718 A | 11/1994 | Kamata et al. ............... 385/21 |
| 5,396,363 A | 3/1995 | Valette ........................ 359/248 |
| 5,412,743 A | 5/1995 | Brazas, Jr. ..................... 383/2 |
| 5,416,631 A | 5/1995 | Yagi ............................ 359/254 |
| 5,455,709 A * | 10/1995 | Dula, III et al. ............ 359/245 |
| 5,504,772 A | 4/1996 | Deacon et al. .............. 372/102 |
| 5,521,748 A | 5/1996 | Sarraf ......................... 399/321 |
| 5,528,414 A | 6/1996 | Oakley ........................ 359/259 |
| 5,559,906 A | 9/1996 | Maerz |
| 5,581,643 A | 12/1996 | Wu ............................... 385/17 |
| 5,615,041 A | 3/1997 | Field et al. .................. 359/326 |
| 5,631,735 A | 5/1997 | Nagai .......................... 356/330 |
| 5,699,462 A | 12/1997 | Fouquet et al. ............... 385/18 |
| 5,732,177 A | 3/1998 | Deacon et al. .............. 385/122 |
| 5,835,458 A | 11/1998 | Bischel et al. ........... 369/44.12 |
| 5,862,276 A | 1/1999 | Karras ......................... 385/30 |
| 5,909,303 A | 6/1999 | Trezza ........................ 359/248 |
| 5,966,234 A * | 10/1999 | Ford et al. ................... 359/248 |
| 5,966,493 A | 10/1999 | Wagoner et al. ............ 385/140 |
| 5,978,125 A | 11/1999 | Yao .............................. 359/256 |
| 6,049,640 A | 4/2000 | Doerr |
| 6,055,087 A | 4/2000 | Kwon et al. ................. 359/248 |
| 6,055,344 A | 4/2000 | Fouquet et al. ............... 385/16 |
| 6,057,955 A | 5/2000 | Yamamoto ................... 354/254 |
| 6,111,633 A | 8/2000 | Albert et al. ................ 349/196 |
| 6,124,965 A | 9/2000 | Doi et al. ..................... 354/248 |
| 6,229,934 B1 | 5/2001 | Melman et al. ............... 385/18 |
| 6,288,822 B2 | 9/2001 | Romanovsky .............. 359/245 |
| 6,297,899 B1 | 10/2001 | Romanovsky .............. 359/245 |
| 6,310,712 B1 | 10/2001 | Romanovsky .............. 359/245 |
| 6,320,994 B1 | 11/2001 | Donald et al. ................ 385/16 |
| 6,381,060 B1 | 4/2002 | Romanovsky .............. 359/245 |
| 6,486,996 B1 | 11/2002 | Romanovsky .............. 359/245 |
| 6,614,574 B2 | 9/2003 | Romanovsky .............. 359/247 |
| 2002/0136482 A1 * | 9/2002 | Zhang ......................... 385/16 |

FOREIGN PATENT DOCUMENTS

| | | |
|---|---|---|
| JP | 06-350050 | 12/1994 |
| JP | 07-020499 | 1/1995 |
| WO | WO 90/14606 | 11/1990 |
| WO | WO 95/33219 | 12/1995 |
| WO | WO 95/34016 | 12/1995 |
| WO | WO 95/07940 | 3/1996 |
| WO | WO 95/07943 | 3/1996 |
| WO | WO 96/07945 | 3/1996 |
| WO | WO 96/07949 | 3/1996 |
| WO | WO 96/07950 | 3/1996 |
| WO | WO 96/07952 A1 | 3/1996 |
| WO | WO 96/08059 | 3/1996 |
| WO | WO 96/10776 | 4/1996 |
| WO | WO 96/18131 | 6/1996 |
| WO | WO 96/41216 | 12/1996 |
| WO | WO 97/16763 | 5/1997 |
| WO | WO 98/07279 | 2/1998 |
| WO | WO 98/10321 | 3/1998 |
| WO | WO 98/35251 | 8/1998 |
| WO | WO 98/40770 | 9/1998 |
| WO | WO 98/40771 | 9/1998 |
| WO | WO 98/40783 | 9/1998 |
| WO | WO 98/59276 | 12/1998 |
| WO | WO 99/12061 | 3/1999 |
| WO | WO 99/19763 | 4/1999 |
| WO | WO 99/22266 | 5/1999 |

OTHER PUBLICATIONS

*Crossing–Channel Waveguide Electroptic Modulators*, Gary E. Betts and William S.C. Chang, IEEE Journal of Quantum Electronics, vol. QE–22, No. 7, Jul. 1986, pp. 1027–1038.

*Crystallization of Lanthanum–Modified Lead Zirconate Titanate (PLZT) Using Coprecipitated Gels*, Yao–Jung Lee, Fu–Su Yen, Jong–Ping Wu and Hsing–I Hsiang, Jpn. J. Appl. Phys. vol. 34, Pt. 1, No. 8A, Aug. 1995, pp. 4137–4142.

*Deposition and Characterization of Thin Ferroelectric Lead Lanthanum Zirconate Titanate (PLZT) Films on Sapphire For Spatial Light Modulators Applications*, S. Krishnakumar, V.H. Ozguz, C. Fan, C. Cozzolino, S.C. Esener and S.H. Lee, IEEE Transactions on Ultrasonics, Ferroelectrics and Frequency Control, vol. 38, No. 6, Nov. 1991, pp. 585–590.

*Electrooptic Light Modulators*, I.P. Kaminow and E.H. Turner, Proceedings of the IEEE, vol. 54, No. 10, Oct. 1966, pp. 1374–1390.

*Electrooptical Channel Waveguide Matrix Switch Using Total Internal Reflection*, F.R. El–Akkari, C.L. Chang, and C.S. Tsai, Topical Meeting on Integrated and Guided Wave Optics, Incline Village, Nev., Paper TuE4, 1980.

*Electrooptics, Phenomena, Materials and Applications*, Fernando Agulló–López, José Manuel Cabrera, Fernando Aguilló–Rueda, Academic Press, Harcourt Brace & Company Publishers, 1994, pp. 193–197.

*High Speed Optical TIR Switches Using PLZT Thin–Film Waveguides on Sapphire*, Hidetaka Higashino, Takao Kawaguchi, Hideaki Adachi, Toshihiko Makino and Osamu Yamazaki, Proceedings of the Sixth International meeting on Ferroelectricity, Kobe, 1985, Jpn. J. Appl. Phys. vol. 24 (1985) Suppl. 24–2, p. 284.

*One–Dimensional Silicon/PLZT Spatial Light Modulators*, Sadik C. Esener, Jing H. Wang, Timothy J. Drabik, Mark A. Title and Sing H. Lee, Optical Engineering, May 1987, vol. 26, No. 5, pp. 406–413.

*PLZT Laser Beam Modulator*, Maris Ozolinsh, Paulis Paulins, Ansis Viesturs, Maris Kundzins, Karlis Kundzins, Andris Krumins, Ferroelectrics, 1992, vol. 128, pp. 73–78.

*Preparation of Pb(Zr, Ti)$O_3$ Thin Films by Sol–Gel Technique*, Tomoyasu Takusagawa, Noriaki Yamada, Terumasa Kato, Hajime Hattori and Teruyuki Matsui, Jpn. J. Appl. Phys. vol. 33, Pt. 1, No. 98, 1994, pp. 5151–5154.

Utsunomlya et al., Japanese Journal of Applied Physics, vol. 24, Supplement 24–3 May, 1985, pp. 169–171.

P. Shames et al, *Modeling and optimization of electro–optic phase modulator*, Article on Web at http://kfir.ucsd.edu/papers/Modeling.pdf.

8×8 Optical Waveguide Switch Using Liquid Crystal; Hiroshi Terui and Morio Kobayashi, Integrated Optical Circuit Engineering, SPIE, vol. 517, 1984, pp. 267–274.

A Low–Crosstalk Microoptic Liquid Crystal Switch, Skinner & Lane, IEEE Journal on Selected Areas In Communications, 6(7):1178–1185 (1988).

A Very Low Operation Current InGaAsP/InP Total Internal Reflection Optical Switch using p/n/p/n Current Blocking Layers, Kwang–Ryong Oh, Ki–Sung Park, Dae–Kon Oh, Hong–Man Kim, Hyung Moo Park and KwyRo Lee, IEEE Photonics Technology Letter, vol. 6, No. 1, Jan. 1994, pp. 65–67.

Digital Optical Switch, Y Silberberg, P. Perlmulter and J.E. Baran, Appl. Phys. Lett., vol. 51 No. 16, Oct. 19, 1987, pp. 1230–1232.

Electro–Optic Switching Using Total Internal Reflection by a Ferroelectric Liquid Crystal, Meadows et al., Appl. Phys. Lett, 54(15):1394–1396 (1989).

Linear total internal reflection spatial light modulator for laser printing, Robert A. Sprague, William D. Turner, Lawrence N. Flores, SPIE vol. 299 Advances in Laser Scanning–Technology (1981); pp. 68–75.

Liquid Crystal Switching Components, Richard A. Soref, Proceedings: Fiber Optic Communications (1980).

Optical Switch Utilizing Total Reflection of (Pb, La) (Zr, Ti)$O_3$ Ceramics, Toshio Utsunomiya, Jpn. J. Appl. Phys. vol. 33 (1994) pp. 5440–5442 Part 1, No. 9B, Sep. 1994.

Total Reflection Liquid–Crystal Electrooptic Device, R.A. Kashnow and C.R. Stein, Applied Optics, vol. 12, No. 10, Oct. 1973, pp. 2309–2311.

Total Switching of Unpoloarized Fiber With a Four–Port Electro–Optic Liquid–Crystal Device, R.A. Soref and D.H. McMahon, Optical Society of America, 5(4):147–149 (1980).

*Optical TIR Switches Using PLZT Thin–Film Waveguides on Sapphire*, Kiyotaka Wasa et al., Journal of Lightwave Technology, vol. LT–2, No. 5, pp. 710–713, Oct. 1984.

*Integrated Optical Devices Based on Nonlinear Optical Polymers*, Emmanuel Van Tomme et al., IEEE Journal of Quantum Electronics, vol. 27, No. 3, Mar. 1991, pp. 778–787.

*Electro–Optic Functional Waveguide Using New Polymer p–NAn–PVA for Integrated Photonic Devices*, Shogo Ura et al., Jpn. J. Appl. Phys., vol. 31 (1992) pp. 1378–1381.

*Mirror–type optical branch and switch*, H. Naitoh et al., Applied Optics, vol. 17, No. 1, Jan. 1, 1978, pp. 101–104.

*Electrically active optical bifurcation: BOA*, M. Papuchon et al., Applied Physics Letters, vol. 31, No. 4, Aug. 15, 1977, pp. 226–267.

*Theoretical and Experimental Studies on Active Y–Junctions in Optical Waveguides*, Hiroshi Sasaki et al., IEEE Journal of Quantum Electronics, vol. QE–14, No. 11, Nov. 1978, pp. 883–892.

*Integrated Optics Components and Devices Using Periodic Structures*, Toshiaki Suhara et al., IEEE Journal of Quantum Electronics, vol. QE–22, No. 6, Jun. 1986, pp. 845–867.

CLEO'93/Tuesday Afternoon, CTuN63, *Thin–film electro–optic beam deflector using domain reversal in LiTaO$_3$*, Qibiao Chen et al, pp. 196–197.

*Poled electro–optic waveguide formation in thin–film organic media*, J.I. Thackara et al., Appl. Phys. Lett. 52 (13), Mar. 28, 1988, pp. 1031–1033.

*Electrooptical switching in thin film waveguides for a computer communication bus*, R. A. Becker et al., Applied Optics, vol. 18, No. 19, Oct. 1, 1979, pp. 3296–3300.

*Prism–Type Optical Deflector Using PLZT Ceramics*, Toshio Utsunomiya et al., Japanese Journal of Applied Physics, vol. 24, (1985) Supplement 24–3, pp. 169–171.

Nishihara et al., *Optical Integrated Circuits*, McGraw–Hill Book Company, Copyright 1985, 1989, pp. 294–296, 305, 341.

*Compact optical cross–connect switch based on total internal reflection in a fluid–containing planar lightwave circuit*, J.E. Fouquet, Optical Fiber Communication Conference, OSA Technical Digest (Optical Society of America, Washington, D.C., 2000), TuM1–1, pp. 204–206.

Patent Abstracts of Japan, Publication No. 56–101123, Publication Date: Aug. 13, 1981.

Patent Abstracts of Japan, Publication No. 60–097319, Publication Date: May 31, 1985.

Patent Abstracts of Japan, Publication No. 05–281583, Publication Date: Oct. 29, 1993.

Patent Abstracts of Japan, Publication No. 02–002531, Publication Date: Jan. 8, 1990.

U.S. patent application No. 10/013,336, filed on Nov. 5, 2001 (TOPTICS.004CP2).

U.S. patent application No. 10/033,153, filed on Oct. 25, 2001 (TOPTICS.004C3).

U.S. patent application No. 10/247,720, filed on Sep. 19, 2002 (TOPTICS.4C3C1).

U.S. patent application No. 10/648,821, filed on Aug. 26, 2003 (TOPTICS.4CP1C1C).

U.S. patent application No. 10/129,722, filed on Feb. 11, 2003 (TOPTICS.004CP3).

U.S. patent application No. 10/140519, filed on May 7, 2002 (TOPTICS.004CP5).

U.S. patent application No. 10/138,009, filed on May 2, 2002 (TOPTICS.015A).

U.S. patent application No. 09/891,689, filed on Jun. 26, 2001 (TOPTICS.018A).

U.S. patent application No. 10/140,520, filed on May 7, 2002 (TOPTICS.019A).

U.S. patent application No. 10/151,776, filed on May 20, 2002 (TOPTICS.020A).

U.S. patent application No. 10/156,241, filed on May 24, 2002 (TOPTICS.022A).

* cited by examiner

OPTICAL SWITCHING NETWORK AND NETWORK NODE AND METHOD OF OPTICAL SWITCHING

RELATED APPLICATIONS

This application is a continuation-in-part of U.S. patent application Ser. No. 10/013336, entitled "Electro-Optic Switching Assembly and Method" filed on Nov. 5, 2001, which claims the benefit under 35 U.S.C. 119(e) of U.S. Provisional Application 60/245,810, filed Nov. 3, 2000, and which is a continuation-in-part of U.S. patent application Ser. No. 09/434,085, filed on Nov. 5, 1999, now U.S. Pat. No. 6,381,060, issued to Romanovsky on Apr. 30, 2002, which is a continuation-in-part of U.S. patent application Ser. No. 08/959,778, filed Oct. 29, 1997, now U.S. Pat. No. 6,310,712, issued to Romanovsky on Oct. 30, 2001. This application also claims priority under 35 U.S.C. §119(e) from U.S. Provisional Patent Application Serial No. 60/288,757, filed May 4, 2001.

BACKGROUND OF THE INVENTION

1. Field of the Invention

This invention relates generally to the field of data, video, and voice communications networks, and more particularly optical switches and switching modules, and to a network or network node using an optical switching element having an electro-optic region responsive to an electric field for switching a data communications light beam between an input optical waveguide and one or more output optical waveguides.

2. Description of the Related Art

The increasing amount of data and voice communication has created a great need for improvements in the speed and capacity of the systems used to deliver communication signals. For example, the increasing number of internet users has created a demand for higher volumes of data transfers. The amount of data being communicated by each internet user has been increasing also, creating further demand for communication system capacity. As the amount of data increases, there is also a demand for quicker communication of the data. These increased demands are affecting the data communications companies, telephone companies and cable television companies.

One way to increase the speed and capacity of communication systems is to use fiber optic cables to transfer signals by light beams. A technique called dense wavelength division multiplexing (known as DWDM) has been used to allow many separate signal channels, each at a slightly different wavelength, to be sent on a single fiber optic cable. The use of DWDM allows a great increase in the quantity of data that may be sent through a single fiber optic cable.

A conventional way of routing DWDM optical signals in a network is to use nodes in the network which convert the optical signals to electronic signals using a optical receiver, process and modify the electronic signals for routing, and convert the processed and modified electronic signals back to optical signals using optical transmitters. This type of node is often referred to as o-e-o, meaning that there are conversions in the node from optical to electronic, and back to optical. A problem faced by users of such o-e-o nodes is that the processing and modification of signals in electronic form takes time, and limits the speed at which the node can operate. As the number of DWDM channels flowing through a node increases, the amount of electronic processing and modification inside such an o-e-o node also increases, and requires added electronics which is expensive, heat generating, and space consuming. A further problem faced by users of o-e-o nodes is the expense of such nodes, since many optical detectors are required in each node, and many laser light sources are required in each node, and such detectors and lasers are expensive components. An additional problem faced by users of such an o-e-o node is that optical signals sent to such a node must have a format consistent with the formats used in and supported by such a node. For example, if the particular o-e-o node uses and supports only asynchronous transfer mode (ATM) formatted signals, then an optical signal using the internet protocol (IP) format cannot be sent to and processed by such an o-e-o node. Another problem faced by users of such o-e-o nodes is that fiber optic cables are being installed into existing telephone, cable TV and communication company facilities which are cramped for space, and which do not tolerate being overheated by added electronics. A way to reduce the problem of overheating has been to add air conditioning capacity to existing facilities, but air conditioning equipment requires additional expense, additional amounts of the scarce available space, and additional amounts of electrical power.

Two important needs of modern communications networks are for bandwidth allocation and for service provisioning. Bandwidth allocation refers to the need to change the communications or data transfer capacity, such as the maximum allowable number of voice channels or maximum bit rate, between two nodes in a communications network. Service provisioning refers to the need to provide dedicated communications or data capacity, such as the use of a T3 communications line for a limited time period, to satisfy a particular need, for example a user's desire to broadcast a combined video and data transmission to a number of sites on a network simultaneously. A network of conventional o-e-o nodes requires significant time to change the configuration of signal pathway connections in all the nodes, thus limiting how fast changes may be made to bandwidth allocation in such networks, and requiring a long setup time for service provisioning in such networks.

A way to overcome some of the problems of o-e-o nodes is to use optical switch elements inside the nodes, so that the optical signals coming into the node are switched into the desired pathways inside the node, and sent out of the node, all without converting the optical signals into electronic signals. The optical switch elements have included micro-electro-mechanical systems (known as MEMS) of miniature moving mirrors that reflect the optical signals into desired pathways. Another optical switch element used in nodes is an optically transparent oil placed in the optical pathway, along with a heater used to create a vapor bubble in the oil, so that the optical signals may be reflected from the surface of the bubble to move the optical signals to the desired pathways. The MEMS optical switch elements may be expensive to manufacture, and wear and breakage of the moving mirrors can result in failure of the optical switch element. The use of oil in a switch element can lead to chemical degradation of the oil as it is heated over a long time period, or leakage of the oil, either of which can result in failure of the optical switch element. A particular problem is believed to occur in a switch which uses oil if the switch is kept in an on condition, with a bubble constantly kept heated for an extended period of time, such as for months or years; in which case the chemical breakdown of the oil is expected and failure of the switch is expected. A way to overcome some of the problems of reliability of MEMS and oil containing optical switch elements is to provide primary optical switch elements and one or more sets of backup secondary optical switch elements of the same type which operate in parallel, and to provide a backup control electronic system for selectively activating the backup secondary optical switch elements in the case of failure of the primary optical switch elements. Such use of primary and secondary optical switch elements increases the size and cost of the node, and the use of such a backup control electronic system increases the size, cost, and waste heat produced by the node. The MEMS optical switch elements require a substantial amount of time to change the optical pathway, since the miniature mirrors must physically change position. The use of oil in an optical switch element requires a substantial amount of time to change the optical pathway, since the heating of oil requires substantial time to create a bubble, and allowing the oil to cool enough to collapse a bubble also requires substantial time. Such delays in changing optical pathways inside a node are disadvantages of the MEMS optical switch element and the optical switch element which uses oil.

Optical switch elements have been suggested that use liquid crystal materials configured to create total internal reflection (known as TIR) optical switch elements. Such liquid crystal materials are known to have thermal instabilities, thus limiting their usefulness as reliable optical switch elements. Optical switches made using such liquid crystal materials are known to have undesirable cross-talk if arrays of such switches are created on a substrate, thus limiting their usefulness, and making them undesirable, since such optical switch elements. Optical switch elements have been suggested using lithium niobate (LiNbO$_3$) as an electro-optic material for waveguides. Such lithium niobate switch elements are known to have high insertion losses and polarization dependent losses, both of which are undesirable properties for optical switch elements. In addition, arrays of switches formed on a substrate using lithium niobate are known to have high crosstalk, which is undesirable for optical switches.

Lead zirconate titanate (known as PLZT) is an electro-optic material that has been used for optical shutters and attenuators.

The use of Clos switches is conventional in optical and electronic switching communications systems.

SUMMARY OF THE INVENTION

In one aspect of the present invention, an optical communications network comprises a plurality of fiber optic cables capable of carrying optical communications signals in the form of light beams and a plurality of switching nodes capable of sending and receiving the optical communications signals. Each of the nodes is connected to a predetermined group of the fiber optic cables for switching the optical pathway of the optical communications signals between the predetermined group of fiber optic cables. Each of the switching nodes has a plurality of solid state total internal reflection optical switching elements connected to the fiber optic cables. Each of the solid state total internal reflection optical switching elements have a substantially planar substrate assembly which is electrically insulating and which is not substantially electro-optic. This substantially planar substrate assembly contains substantially planar optical waveguides which are coplanar with and inside the substrate assembly and are capable of guiding the optical pathway of the optical communications signals. At least two of the waveguides meet at a waveguide intersection inside the substrate assembly. Each of the solid state total internal reflection optical switching elements has an electro-optic switching part positioned inside the substrate assembly at the waveguide intersection and is oriented to provide an optical pathway for the optical communications signals to travel through the part and between the waveguides. The switching part has a body material with an electro-optically active region. Activating electrodes are positioned adjacent the switching part to create an optical total internal reflection boundary in the part when a voltage greater than a predetermined switching voltage is applied between the electrodes to create an electric field greater than a predetermined switching electric field inside the part. The electrodes are oriented to align the optical total internal reflection boundary at an angle greater than a predetermined critical angle with respect to the waveguides.

In another aspect of the invention, optical communications switching node includes a plurality of optical inputs to the switching node for receiving optical communications signals and a plurality of optical outputs from the switching node for sending optical communications signals. The optical communications switching node further includes a node controller capable of providing electronic switch selection signals that specify the optical pathway for optical communications signals traveling between the optical inputs and the optical outputs. The electronic switch selection signals exceed a predetermined switching voltage. An optical component is connected to the optical inputs and to the optical outputs, and is responsive to the electronic switch selection signals. The optical component has a plurality of solid state total internal reflection optical switching elements connected. Each of the solid state total internal reflection optical switching elements has a substantially planar substrate assembly which is electrically insulating and which is not substantially electro-optic. The substantially planar substrate assembly contains substantially planar optical waveguides which are coplanar with and inside the substrate assembly and are capable of guiding the optical pathway of the optical communications signals. At least two of the waveguides meet at a waveguide intersection inside the substrate assembly. The solid state total internal reflection optical switching elements also have an electro-optic switching part positioned inside the substrate assembly at the waveguide intersection and oriented to provide an optical pathway for the optical communications signals to travel through the part and between the waveguides. The switching part has a body material with an electro-optically active region. The solid state total internal reflection optical switching elements also have activating electrodes positioned adjacent the switching part to create an optical total internal reflection boundary in the part when a voltage greater than the predetermined switching voltage is applied between the electrodes to create an electric field greater than a predetermined switching electric field inside the part. The electrodes are oriented to align the optical total internal reflection boundary at an angle greater than a predetermined critical angle with respect to the waveguides.

Another aspect of the invention comprises a method of using an optical communications network. In this method, optical communication signals are sent on fiber optic cables connected in a network, and directed to be received by a predetermined destination node connected to the network. Node control signals are provided to specify the optical pathway for the optical communications signals through nodes connected to the fiber optic cables in the network. The optical pathway for the optical communications signals are switched inside a node connected to the network, in response to the node control signals, using a plurality of solid state total internal reflection optical switching elements connected to the fiber optic cables. The solid state total internal reflection optical switching elements have a substantially planar substrate assembly which is electrically insulating and which is not substantially electro-optic. This substantially planar substrate assembly contains substantially planar optical waveguides which are coplanar with and inside the substrate assembly and are capable of guiding the optical pathway of the optical communications signals. At least two of the waveguides meet at a waveguide intersection inside the substrate assembly. The solid state total internal reflection optical switching elements also include an electro-optic switching part positioned inside the substrate assembly at the waveguide intersection and oriented to provide an optical pathway for the optical communications signals to travel through the part and between the waveguides. The switching part has a body material with an electro-optically active region. Activating electrodes are positioned adjacent the switching part to create an optical total internal reflection boundary in the part when a voltage greater than a predetermined switching voltage is applied between the electrodes to create an electric field greater than a predetermined switching electric field inside the part. The electrodes are oriented to align the optical total internal reflection boundary at an angle greater than a predetermined critical angle with respect to the waveguides.

Still another aspect comprises a method of using an optical communications switching node. In this method, optical communications signals are received on a fiber optic cable connected to an input of the node. Node control signals are received that specify the optical pathway for the optical communications signals through the node. The optical pathway for the optical communications signals is switched inside the node, for sending the optical communications signals along an optical pathway to a fiber optic cable connected to a selected output of the node. The selected output is specified by the node control signals. The switching uses a plurality of solid state total internal reflection optical switching elements connected to the fiber optic cables. The solid state total internal reflection optical switching elements have a substantially planar substrate assembly which is electrically insulating and which is not substantially electro-optic. The substantially planar substrate assembly contains substantially planar optical waveguides which are coplanar with and inside the substrate assembly and are capable of guiding the optical pathway of the optical communications signals. At least two of the waveguides meet at a waveguide intersection inside the substrate assembly. The solid state total internal reflection optical switching elements includes an electro-optic switching part positioned inside the substrate assembly at the waveguide intersection and oriented to provide an optical pathway for the optical communications signals to travel through the part and between the waveguides. The switching part has a body material with an electro-optically active region. Activating electrodes are positioned adjacent the switching part to create an optical total internal reflection boundary in the part when a voltage greater than a predetermined switching voltage is applied between the electrodes to create an electric field greater than a predetermined switching electric field inside the part. The electrodes are oriented to align the optical total internal reflection boundary at an angle greater than a predetermined critical angle with respect to the waveguides.

One technical advantage of the technology described below is that high speed optical communications networks may have optical pathways switched quickly and reliably in reduced cost network nodes by the use of solid state TIR optical switch elements made with electro-optic material.

Another technical advantage is that high speed optical communications networks may have network nodes capable of reconfiguring optical pathways quickly in order to allow quick changes in bandwidth allocation in such networks, and in order to allow service provisioning to be provided in such networks with short setup times.

A further technical advantage is that the network nodes have enhanced reliability since they are made using solid state TIR optical switch elements that are thermally stable, have no moving parts to wear out or break, and contain no organic oils that degrade with time or use; including during use in an activated or on condition for extended periods of time, such as for months or years.

Another technical advantage of the technology described below is that the network nodes have reduced cost since the reliability of the solid state TIR optical switching elements reduces the need for expensive multiple layers of redundant backup circuits, and backup control circuits for activating such backup circuits, and the expensive electrical power needed to operate such backup circuits and backup control circuits.

A further technical advantage is that high speed optical communications networks may have optical pathways using a wide variety of optical communications formats by using network nodes having solid state TIR optical switch elements that operate independent of the particular format of the optical communications signals. For example, optical communication signals in having an ATM or IP format may be sent to the optical switch elements, and signals of each format will be switched in the same way, independent of the signal format. The format independence of the switch elements allows an optical network to use new formats for data signals, where such new formats have not been specified at the time that a network node is designed or constructed.

Another technical advantage this technology is that the switching elements used in the network nodes have a low insertion loss, thus reducing the need for optical signal amplification and increasing the number of nodes and distance over which the optical communication signals may propagate without intervening amplification.

A further technical advantage is that the switching elements used in the network nodes do not have polarization dependent losses, thus reducing the need for optical signal amplification and increasing the number of nodes and distance over which the optical communication signals may propagate without intervening amplification.

A further technical advantage is that various embodiments provides polarization independent switching modules as a part of a network node, so that optical communication signals with any of a wide range of polarizations may be reliably switched in the network node.

Another technical advantage is that the switching elements used in the network node use an electro-optic material, PLZT, placed in optically and electrically isolated cavities or regions in a substrate with waveguides so that optical and electrical crosstalk between nearby switching elements is reduced. The reduction of crosstalk is important to improve the performance of the network node to insure that optical communications signals remain private and reliably arrive at designated destinations without contamination by any other optical communications signals passing through the same network node. The reduction of crosstalk also insures that activation of one optical switching element in an array of optical switching elements will not inadvertently activate another nearby optical switching element in the same array.

An additional advantage is that the switching elements used in the network node use a low electrical potential for switching, eliminating the need for expensive, bulky and heat producing high voltage power supplies.

BRIEF DESCRIPTION OF THE DRAWINGS

A more complete understanding of the present invention and advantages thereof may be acquired by referring to the following description, taken in conjunction with the accompanying drawings in which like reference numbers indicate like features and wherein.

DETAILED DESCRIPTION OF THE PREFERRED EMBODIMENT

Preferred embodiments of the present invention are illustrated in the figures, like numerals being used to refer to like and corresponding parts of the various drawings.

Figure 1:
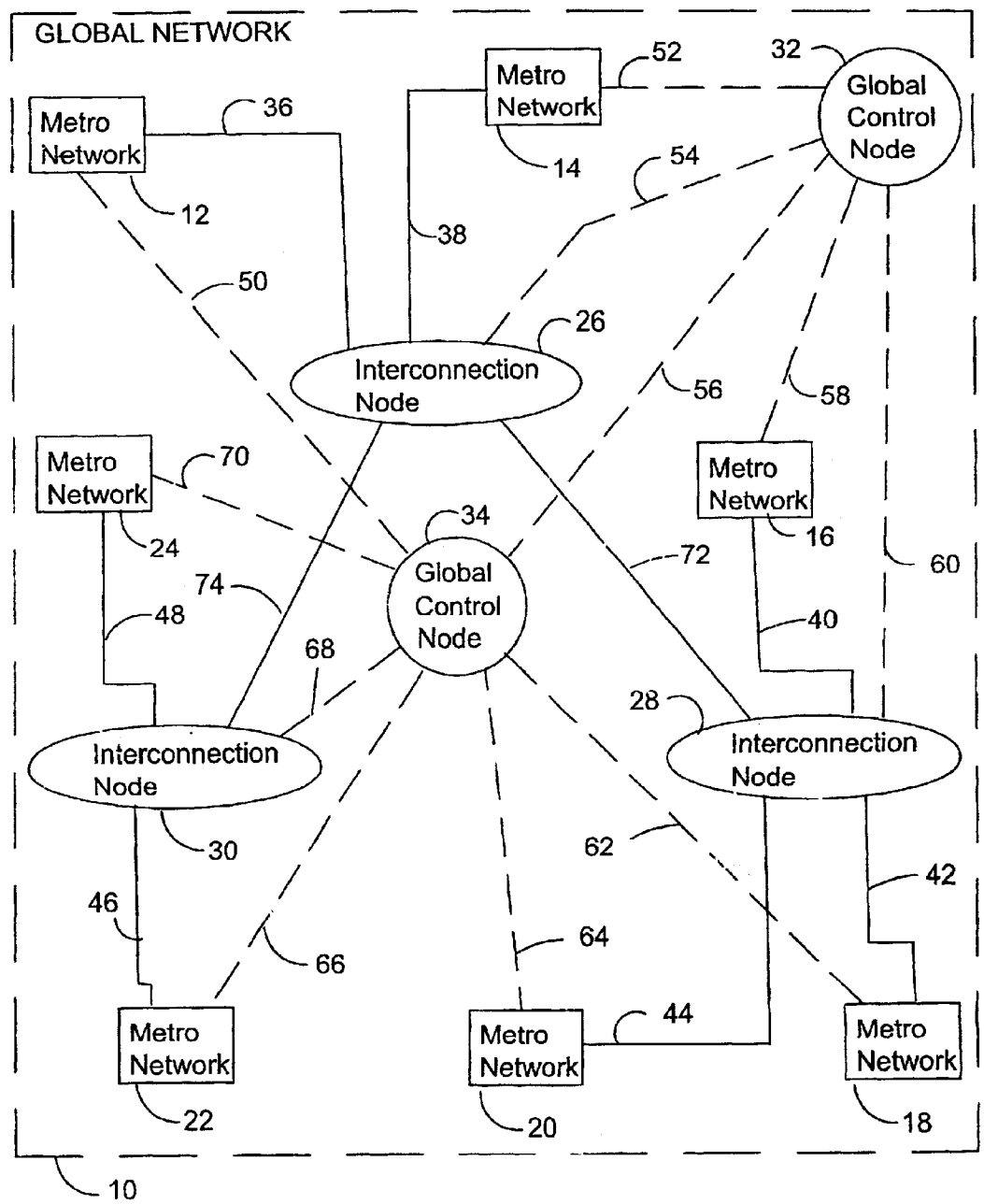
FIG. 1 is a block diagram of a global network which uses optical communications signals.

FIG. 1 shows a global network 10 in which optical communications signals are transferred between smaller metro networks 12, 14, 16, 18, 20, 22 and 24 and interconnection nodes 26, 28 and 30. The metro networks may be located in cities or communities or college campuses, for example. The interconnection nodes provide longer distance connections between the metro networks using fiber optic cables 72 and 74. Interconnection node 26 is connected to interconnection node 28 through the fiber optic cable 72, which preferably uses dense wavelength division multiplexing (DWDM) to transmit many individual wavelengths of light. The fiber optic cable 72 preferably comprises two or more separate optical fibers isolated from each other, so that separate uni-directional DWDM optical signals may be transmitted on each of the optical fibers. The fiber optic cable 74 connects the interconnection node 26 and the interconnection node 30. The fiber optic cable 74 preferably comprises two or more separate optical fibers isolated from each other, so that separate uni-directional DWDM optical signals may be transmitted on each of the optical fibers. The fiber optic cables 72 and 74 and interconnection nodes 26, 28 and 30 preferably provide a high speed concentrated pathway for high data volume communications over long distances. For example, if the global network 10 is used to provide telephone communications, the interconnection nodes 26, 28 and 30 and the fiber optic cables 72 and 74 provide long distance telephone trunk lines for sending many separate high speed telephone voice or data communication streams. As another example, if the global network is used to provide internet data communications, the interconnection nodes 26, 28 and 30 and the fiber optic cables 72 and 74 provide backbone internet communications, with the interconnection nodes acting as large routers for transcontinental or intercontinental transfers of optical data communications signals. The interconnection nodes 26, 28 and 30 are preferably of conventional construction, and may be made of optical-electronic-optical (known as o-e-o) circuitry. Alternatively, the nodes 26, 28 and 30 could be constructed using conventional micro-electro-mechanical systems (known as MEMS) optical switching devices or conventional oil containing optical switch elements. As a further alternative, the interconnection nodes 26, 28 and 30 could be constructed using the solid state TIR optical switching elements, as described below. Because the interconnection nodes 26, 28 and 30 have a high volume of optical communications data flowing through them, and the metro networks 12, 14, 16, 18, 20, 22 and 24 rely on continuous error free operation of the interconnection nodes 26, 28 and 30, the highly reliable solid state TIR optical switching elements, as described below, can form an important part of the construction of the interconnection nodes 26, 28 and 30. The fiber optic cables 72 and 74 may be made using conventional optical fibers.

The interconnection node 26 is connected by fiber optic cable 36 to metro network 12 and by fiber optic cable 38 to metro network 38. The interconnection node 28 is connected by fiber optic cable 40 to metro network 16, by fiber optic cable 42 to metro network 18, and by fiber optic cable 44 to metro network 20. The interconnection node 30 is connected by fiber optic cable 46 to metro network 22 and by fiber optic cable 48 to metro network 24. The fiber optic cables 36, 38, 40, 42, 44, 46 and 48 preferably use DWDM to transmit many individual wavelengths of light, and preferably each comprise two or more separate optical fibers isolated from each other, so that separate uni-directional DWDM optical signals may be transmitted on each of the optical fibers.

Global control nodes 32 and 34 control the operation of the interconnection nodes 26, 28 and 30, and the interaction of the interconnection nodes with the metro networks 12, 14, 16, 18, 20, 22 and 24. Global control node 32 is connected by linkage 52 to metro network 14, by linkage 54 to interconnection node 26, by linkage 56 to global control node 34, by linkage 58 to metro network 16, and by linkage 60 to interconnection node 28. The linkages 52, 54, 56, 58 and 60 may comprise fiber optic cables, electronic cables, wireless radio or microwave connections, or other conventional communications lines. Alternatively, one or more of the linkages 52, 54, 56, 58 and 60 may comprise virtual channels sent in-band as optical signals through one of the metro networks 14 or 16 or interconnection nodes 26 or 28, or the other global control node 34, so that the in-band signals may be directed by the global control node 32 to be switched appropriately by each metro network and interconnection node to arrive at the appropriate metro network or interconnection node to be controlled. A function of the global control node 32 is to provide directions for the setting the configuration of optical or o-e-o switches in each of the metro networks 14 and 16 and interconnection nodes 26 and 28. Global control node 34 is connected by linkage 50 to metro network 12, by linkage 56 to global control node 32, by linkage 62 to metro network 18, by linkage 64 to metro network 20, by linkage 66 to metro network 22, by linkage 68 to interconnection node 30, and by linkage 70 to metro network 24. The linkages 50, 56, 62, 64, 66, 68 and 70 may comprise fiber optic cables, electronic cables, wireless radio or microwave connections, or other conventional communications lines. Alternatively, one or more of the linkages 50, 56, 62, 64, 66, 68 and 70 may comprise virtual channels sent in-band as optical signals through one of the metro networks 12, 18, 20, 22 or 24 or interconnection node 30, or the other global control node 32, so that the in-band signals may be directed by the global control node 34 to be switched appropriately by each metro network and interconnection node to arrive at the appropriate metro network or interconnection node to be controlled. A function of the global control node 34 is to provide directions for the setting the configuration of optical or o-e-o switches in each of the metro networks 12, 18, 20, 22 or 24 and the interconnection node 30. The global control nodes 32 and 34 may be of conventional construction. For example, if the global network 10 is operated to transfer telephone voice and data optical signals, the global control nodes 32 and 34 may be conventionally operated by the telephone company to control the allocation of long distance telephone trunk lines. As a further example, if the global network 10 is operated to transfer internet data signals, the global control nodes 32 and 34 may be conventionally operated by an internet backbone company or internet service provider to control the allocation of data communications capacity.

FIG. 1 effectively represents the functional relationships of a voice telephone system as the global network 10, in which digitized voice optical signals are sent from city to city, and the global control nodes 32 and 34 are used by a telephone company to adjust the switching of connections in the interconnection nodes 26, 28 and 30 and the interaction of the metro networks 12, 14, 16, 18, 20 and 22 with the interconnection nodes. FIG. 1 also effectively represents the functional relationships of a computer data communications system as the global network 10, in which computer data optical signals are sent from location to location. For example, SONET signals, ATM signals, or internet protocol signals can be sent through the interconnection nodes as optical communication signals.

Although the global network 10 of FIG. 1 is shown as having two global control nodes 32 and 34, three interconnection nodes 26, 28 and 30, and seven metro networks 12, 14, 16, 18, 20, 22 and 24, the number of global control and interconnect nodes and metro networks is not to be limited. A global network could be made with a reduced number of metro networks, with one or more global control nodes, and as few interconnection nodes as are needed; and alternatively, the global network could be made with thousands of metro networks, as many global control nodes as are needed, and as many interconnection nodes as are needed.

Figure 2:
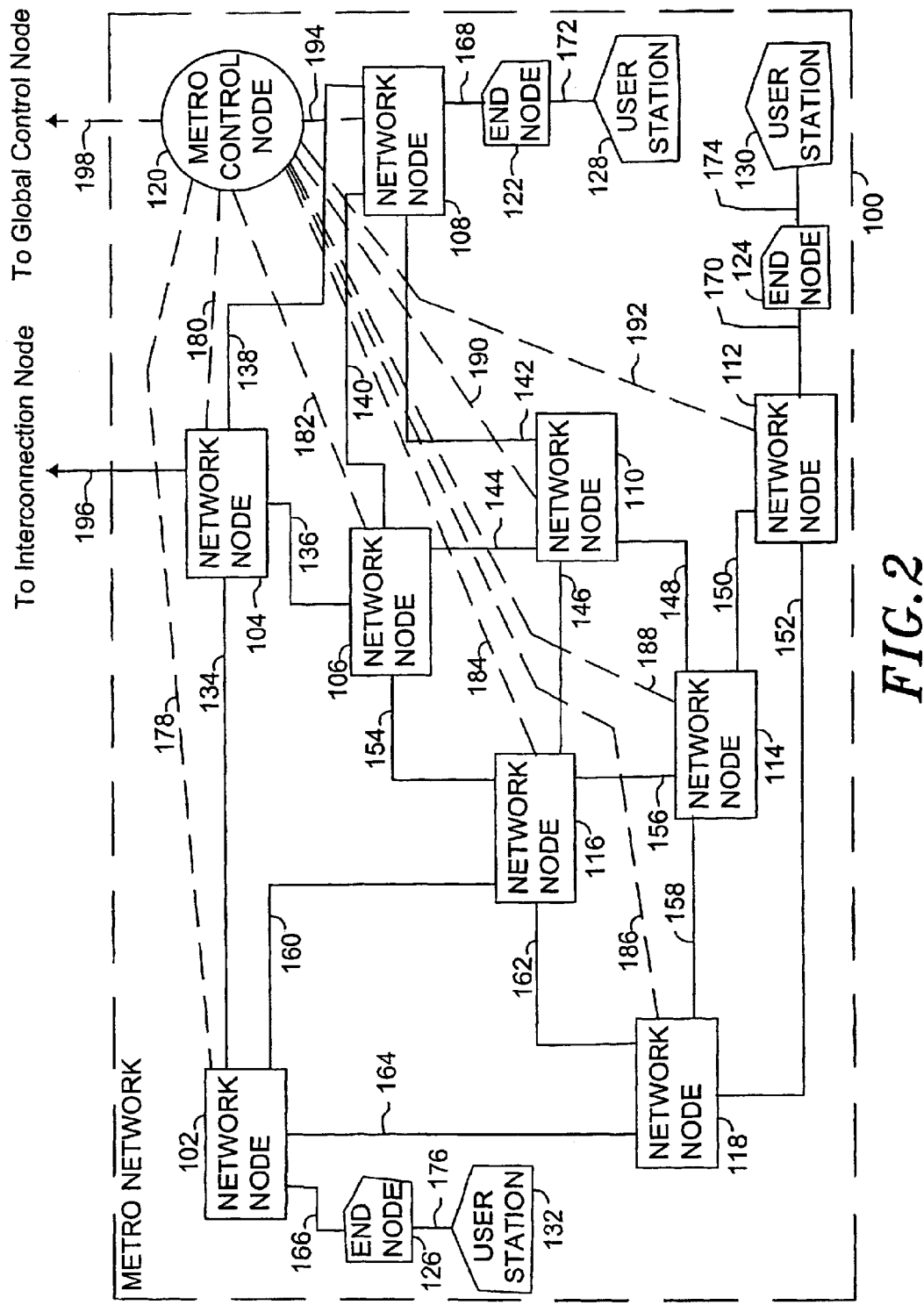
FIG. 2 is a block diagram of a metro network of the type used in the global network of FIG. 1.

FIG. 2 shows an example of a metro network 100 of the type included in the global network 10 of FIG. 1, as shown in the metro networks 12, 14, 16, 18, 20, 22 and 24 of FIG. 1. The metro network 100 has network nodes 102, 104, 106, 108, 110, 112, 114, 116 and 118 that are interconnected with each other using fiber optic cables to transfer optical communications signals between the network nodes. The network node 102 is connected to network node 104 through fiber optic cable 134, and to network node 116 through fiber optic cable 160, and to network node 118 through 164. The network node 104 is also connected to the network node 106 through fiber optic cable 136, and to network node 108 through fiber optic cable 138. The network node 106 is also connected to the network node the network node 108 through fiber optic cable 140, and to network node 110 through fiber optic cable 144, and to network node 116 through fiber optic cable 154. The network node 108 is also connected to network node 110 through fiber optic cable 142. The network node 110 is also connected to network node 114 through fiber optic cable 148, and to network node 116 through fiber optic cable 146. The network node 112 is connected to network node 114 through fiber optic cable 150, and to network node 118 through fiber optic cable 152. The network node 114 is also connected to network node 116 through fiber optic cable 156, and to network node 118 through fiber optic cable 158. The network node 116 is also connected to the network node 118 through fiber optic cable 162. The fiber optic cables 134, 136, 138, 140, 142, 144, 146, 148, 150, 152, 154, 156, 158, 160, 162 and 164 preferably use DWDM to transmit many individual wavelengths of light, and preferably each comprise two or more separate optical fibers isolated from each other, so that separate uni-directional DWDM optical signals may be transmitted on each of the optical fibers.

The network node 108 is connected to an end node 122 through a fiber optic cable 168, and end node 122 is connected to a user station 128 through a cable 172. The network node 112 is connected to an end node 124 through a fiber optic cable 170, and end node 124 is connected to a user station 130 through a cable 174. The network node 102 is connected to an end node 126 through a fiber optic cable 166, and end node 126 is connected to a user station 132 through a cable 176. The end nodes 122, 124 and 126 may be of conventional construction, and function to convert optical signals to electronic signals for use by user stations. The fiber optic cables 166, 168 and 170 preferably use DWDM to transmit many individual wavelengths of light, and preferably each comprise two or more separate optical fibers isolated from each other, so that separate uni-directional DWDM optical signals may be transmitted on each of the optical fibers. The user stations 128, 130 and 132 are the initiation points and final destination points for data communications signals to be transferred on the metro network 100 and which may be communicated for long distances over the global network 10 of FIG. 1. The cables 172, 174 and 176 are preferably conventional electronic cables. For example, if the metro network 100 is operated to transfer telephone voice and data optical signals, the user stations 128, 130 and 132 may be individual telephones, facsimile machines, computers using modems, or office telephone systems. As a further example, if the metro network 100 is operated to transfer internet data signals, the user stations 128, 130 and 132 may be any of various types of electronic computer equipment, such as servers, local area networks, personal computers or terminals.

The network nodes 102, 104, 106, 108, 110, 112, 114, 116 and 118 operate under the control of a metro control node 120, in order to adjust the switching of connections in the network nodes. Metro control node 120 is connected by linkage 178 to network node 102, by linkage 180 to network node 104, by linkage 182 to network node 106, by linkage 184 to network node 116, by linkage 186 to network node 118, by linkage 188 to network node 114, by linkage 190 to network node 110, by linkage 192 to network node 112, and by linkage 194 to network node 108. The linkages 178, 180, 182, 184, 186, 188, 190, 192 and 194 may comprise fiber optic cables, electronic cables, wireless radio or microwave connections, or other conventional communications lines. Alternatively, one or more of the linkages 178, 180, 182, 184, 186, 188, 190, 192 and 194 may comprise virtual channels sent in-band as optical signals through one of the network nodes 102, 104, 106, 108, 110, 112, 114, 116 and 118, so that the in-band signals may be directed by the metro control node 120 to be switched appropriately by each network node to arrive at the appropriate network node to be controlled. A function of the metro control node 120 is to provide directions for the setting the configuration of optical switches in each of the network nodes 102, 104, 106, 108, 110, 112, 114, 116 and 118. The metro control nodes 120 may be of conventional construction. For example, if the metro network 100 is operated to transfer telephone voice and data optical signals, the metro control node 120 is conventionally operated by the telephone company to control the allocation of metropolitan telephone trunk lines. As a further example, if the metro network 100 is operated to transfer internet data signals, the metro control node 120 is conventionally operated by an internet backbone company or internet service provider to control the allocation of data communications capacity.

The network node 104 is connected to a fiber optic cable 196 for connection to an interconnection node of the type shown as interconnection nodes 26, 28 and 30 of the global network 10 of FIG. 1. The function of the fiber optic cable 196 is to transfer optical communications signals coming to and leaving from the metro network 100. The metro control node 120 is connected to a linkage 198 for connection to a global control node of the type shown as global control nodes 32 and 34 of the global network 10 of FIG. 1. The function of the linkage 198 is to transfer status information from, and to transfer control information to, the metro control node 120. The linkage 198 may comprise fiber optic cables, electronic cables, wireless radio or microwave connections, or other conventional communications lines.

Because the network nodes 102, 104, 106, 108, 110, 112, 114, 116 and 118 have a significant volume of optical communications data flowing through them, and the user stations 128, 130 and 132 rely on continuous error free operation of the network nodes 102, 104, 106, 108, 110, 112, 114, 116 and 118, the highly reliable solid state TIR optical switching elements, as described herein, preferably form an important part of the construction of the network nodes 102, 104, 106, 108, 110, 112, 114, 116 and 118. In order to provide high rates of switching the interconnections inside the network nodes 102, 104, 106, 108, 110, 112, 114, 116 and 118, each network node is constructed using the solid state TIR optical switching elements, as described below, which provide for fast switching of the optical communications signals passing through each network node.

The metro network 120 may be used, for example, as the metro network 12 of FIG. 1, in which case the fiber optic cable 196 and linkage 198 correspond, respectively, to the fiber optic cable 36 and linkage 50 of FIG. 1. The metro network 120 is representative of the construction of the metro networks 12, 14, 16, 18, 20, 22 and 24 of FIG. 1.

Although the metro network 100 of FIG. 2 is shown as having a metro control node 120, three end nodes 122, 124 and 126, three user stations 128, 130 and 132, and nine network nodes 102, 104, 106, 108, 110, 112, 114, 116 and 118, the size, number nodes and user station and the arrangement is not to be considered limited. For example, a metro network could be made with a reduced number of network nodes, a reduced number of end nodes and user stations, and with one or more metro control nodes; and alternatively, the metro network could be made with hundreds of network nodes, thousands of end nodes and user stations, and as many metro control nodes as are desired. Although the end nodes 122, 124 and 126 are each shown with a single user station 128, 130 and 132, many additional user stations may be connected to a single end node.

Figure 3:
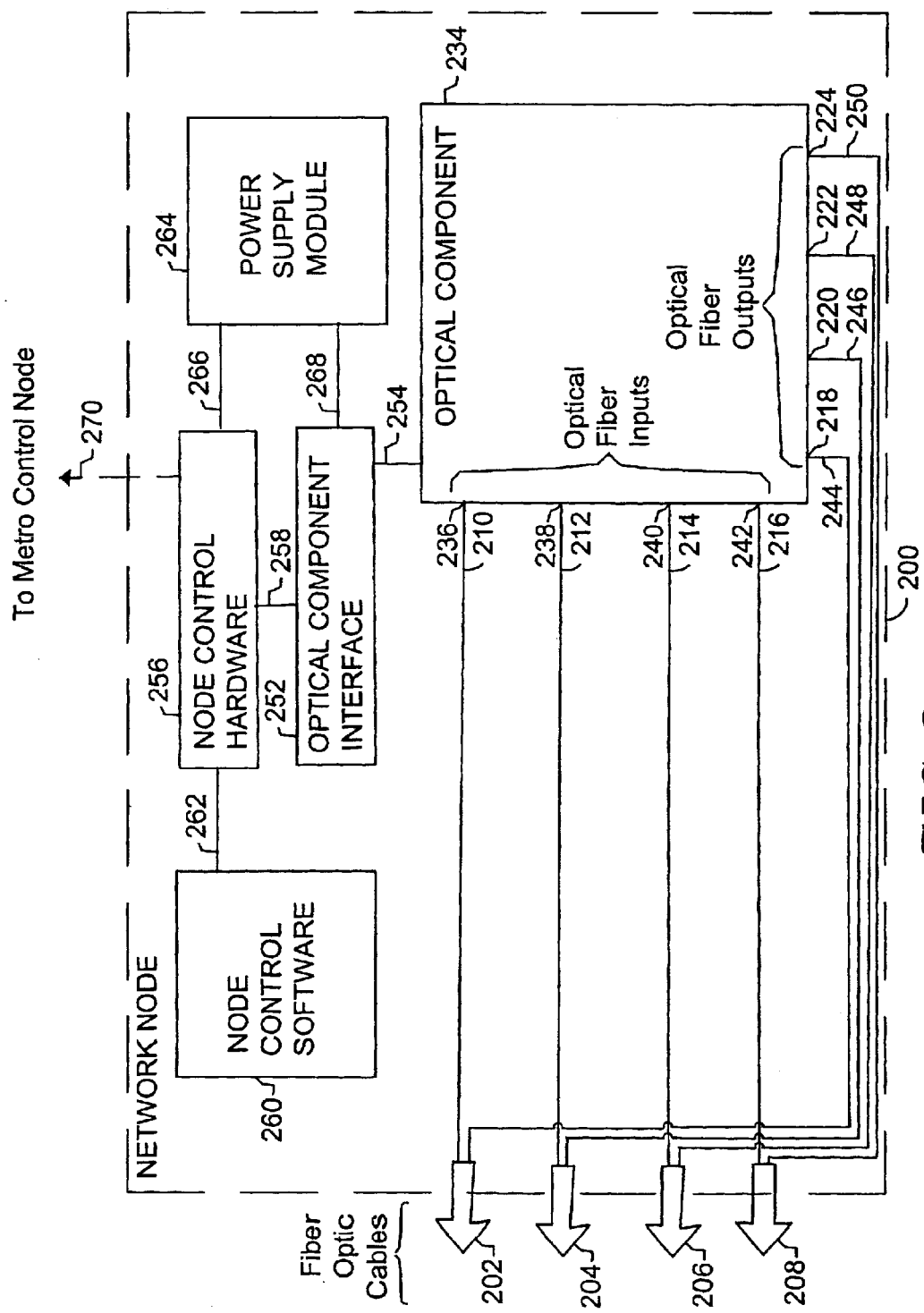
FIG. 3 is a block diagram of a network node of the type used in the metro network of FIG. 2.

FIG. 3 shows a network node 200 which is connected to fiber optic cables 202, 204, 206 and 208. The fiber optic cables 202, 204, 206 and 208 preferably each comprise two separate optical fibers isolated from each other, so that separate uni-directional DWDM optical signals may be transmitted on each of the optical fibers. Fiber optic cables 202, 204, 206 and 208 have optical fibers 210, 212, 214 and 216, respectively, which are connected to the respective optical fiber inputs 236, 238, 240 and 242 of the optical component 234. The function of the optical fibers 210, 212, 214 and 216 is to bring optical data communications signals from the respective fiber optic cables 202, 204, 206 and 208 into the network node 200 and into the optical component 234. Fiber optic cables 202, 204, 206 and 208 have optical fibers 244, 246, 248 and 250, respectively, which are connected to the respective optical fiber outputs 218, 220, 222 and 224 of the optical component 234. The function of the optical fibers 244, 246, 248 and 250 is to output optical data communications signals from the optical component 234 and from the network node 200 to the respective fiber optic cables 202, 204, 206 and 208. Although the block diagram shown in FIG. 3 depicts the optical fibers 210, 212, 214, 216, 244, 246, 248 and 250 laid out using sharp right angles and multiple bends, such angles and bends are only for purposes of simplification of the block diagram, and such sharp angles and bends are not used for actual optical fibers, which are preferably laid out in conventional gradual angles and bends.

The function of the optical component 234 of the network node 200 is to optically switch the optical communications signals received from the optical fibers 210, 212, 214 and 216 to produce the optical communications signals for propagation on the optical fibers 244, 246, 248 and 250. It is important that the optical component 234 perform its switching functions reliably, without errors, over long time periods, and with low power consumption; and thus, it is preferable that the optical component 234 be constructed using the solid state TIR optical switching elements, as described below.

The optical component 234 is connected to an optical component interface 252 through a cable 254. The optical component interface is preferably an electronic hardware circuit for producing switch activation voltage signals which turn on and off the solid state TIR optical switching elements, as described below, contained in the optical component 234. The optical component interface 252 is preferably constructed using conventional digital electronic logic integrated circuits to produce the switch activation voltage signals needed by the optical component 234. The cable 234 may be a conventional electronic cable.

The optical component interface 252 is connected to the node control hardware 256 through a cable 258. The node control hardware 256 may be constructed of electronic circuitry conventionally used in o-e-o nodes, suitably modified to provide signals used by the optical component interface 252. The cable 258 may be a conventional electronic cable. Alternatively, the network node 200 could be constructed with the optical component interface 252 and node control hardware 256 being combined into a single unit. The node control hardware 256 is connected to a node control software unit 260 through a cable 262. The node control software unit 260 may be constructed of node control software conventionally used in o-e-o nodes, suitably modified to provide controls used by the optical component interface 252. The cable 262 may be a conventional electronic cable. Alternatively, the node control software unit 260 and node control hardware 256, and further alternatively the optical component interface 252, could be combined into a single unit.

The power supply module 264 is connected to the node control hardware 256 through a cable 266, and to the optical component interface 252 through a cable 268. The power supply module 264 may be a conventional voltage source, and its function is to provide electrical voltages used by the node control hardware 256 and optical component interface 252. The total electrical power supplied by the power supply module 264 includes the electrical power used by the optical component interface 252 to produce switch activation voltage signals for use by the optical component 234. The construction of the optical component 234 preferably uses the solid state TIR optical switching elements described below, since such construction requires only small amounts of electrical power for such switch activation voltage signals. It is preferred that the total electrical power supplied by the power supply module 264 be minimized, so that the physical size of the power supply module 264 is kept small, and so that the waste heat produced by the power supply module 264 is also small. Because the network node 200 may require installation in small, poorly air conditioned existing network facilities, it is preferred that the waste heat produced by the network node 200, and the physical size of network node 200, be reduced.

The node control hardware is connected to a linkage 270 for connection to a metro control node of the type shown as the metro control node 120 of the metro network 100 of FIG. 2. The function of the linkage 270 is to transfer status information from, and to transfer control information to the node control hardware 256 and the network node 200. The linkage 270 may comprise fiber optic cables, electronic cables, wireless radio or microwave connections, or other conventional communications lines The network node 200 may be used, for example, as the network node 104 of FIG. 2, in which case the fiber optic cables 202, 204, 206 and 208 and linkage 270 correspond, respectively, to the fiber optic cables 134, 136, 138 and 196 and linkage 180 of FIG. 2. The network node 200 is representative of the construction of the network nodes 102, 104, 106, 108, 110, 112, 114, 116 and 118 of FIG. 2.

Figure 4:
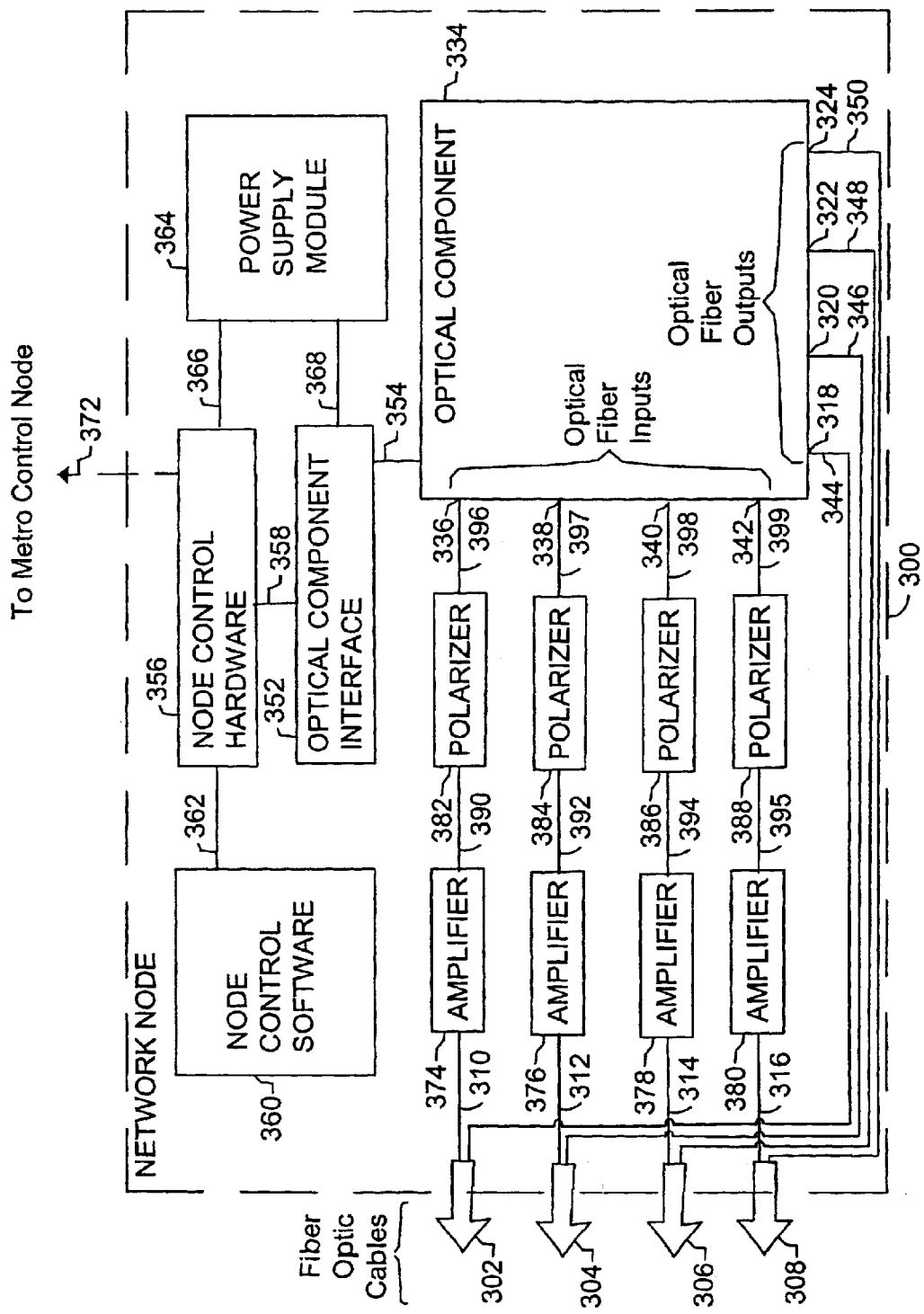
FIG. 4 is a block diagram of an alternative embodiment of a network node, using internal optical amplification and polarization elements, of the type which may be used in the metro network of FIG. 2.

FIG. 4 shows a network node 300 which is in many ways the same as network node 200 of FIG. 3; including having fiber optic cables 302, 304, 306 and 308, an optical component interface 352, node control hardware 356, node control software 360, power supply module 364 and cables 354, 358, 362, 366 and 368 which are the same, respectively, as the fiber optic cables 202, 204, 206 and 208, optical component interface 252, node control hardware 256, node control software 260, power supply module 264 and cables 254, 258, 262, 266 and 268 of FIG. 3. Fiber optic cables 302, 304, 306 and 308 have optical fibers 310, 312, 314 and 316, respectively, which are connected to the respective optical amplifiers 374, 376, 378 and 380. The function of the optical fibers 310, 312, 314 and 316 is to bring unpolarized optical communications signals, or polarized light having a vector orientation that changes with time, from the respective fiber optic cables 302, 304, 306 and 308 into the network node 300 and into the optical amplifiers 374, 376, 378 and 380. The optical amplifiers 374, 376, 378 and 380 are respectively connected to optical polarizing devices 382, 384, 386 and 388 through respective optical fibers 390, 392, 394 and 395. The optical polarizing devices 382, 384, 386 and 388 are respectively connected to the optical fiber inputs 336, 338, 340 and 342 of the optical component 334 through respective optical fibers 396, 397, 398 and 399. The optical amplifiers 374, 376, 378 and 380 may be conventional optical amplifiers which increase the intensity of the optical communications signals passing through each of the optical amplifiers. The optical polarizing devices 382, 384, 386 and 388 may be conventional optical polarizers which convert unpolarized optical communications signals into optical communications signals with a specific polarization state. Other polarization controlling devices can also be employed. For example, an active polarization controller may convert an arbitrary polarization into a known polarization or transform an arbitrary polarization that changes in time into a fixed and known polarization. Preferably, this conversion can be completed without significant loss, e.g., with only about 3 dB loss. The function of the optical amplifiers 374, 376, 378 and 380 is to boost the signal strength of optical communications signals passing through such optical amplifiers to compensate for attenuation to such signals occurring in the optical polarizers 382, 384, 386 and 388. The function of the optical polarizers 382, 384, 386 and 388 is to produce optical communications signals which are optically polarized so that such signals may be readily used by the optical component 334.

The optical component 334 has optical fiber inputs 336, 338, 340 and 342 which are adapted to receive incoming polarized optical communications signals. The function of the optical component 334 of the network node 300 is to optically switch the polarized optical communications signals received from the optical fibers 396, 397, 398 and 399 to produce the optical communications signals for propagation on the optical fibers 344, 346, 348 and 350. It is important that the optical component 334 perform its switching functions reliably, without errors, over long time periods, and with low power consumption; and thus, it is preferable that the optical component 334 be constructed using the solid state TIR optical switching elements, as described below.

Alternatively, the optical component 334, optical amplifiers 374, 376, 378 and 380, optical polarizing devices 382, 384, 386 and 388, and optical fibers 390, 392, 394, 395, 396, 397, 398 and 399 maybe constructed as a single unit.

The network node of FIG. 4 differs in function from the network node 200 of FIG. 3, in that the network node 300 is especially adapted to handle unpolarized optical communications signals from the fiber optic cables 302, 304, 306 and 308 when the optical component 334 is not polarization independent, and the special adaptation is provided by the optical amplifiers 374, 376, 378 and 380, and the optical polarizers 382, 384, 386 and 388.

Figure 5:
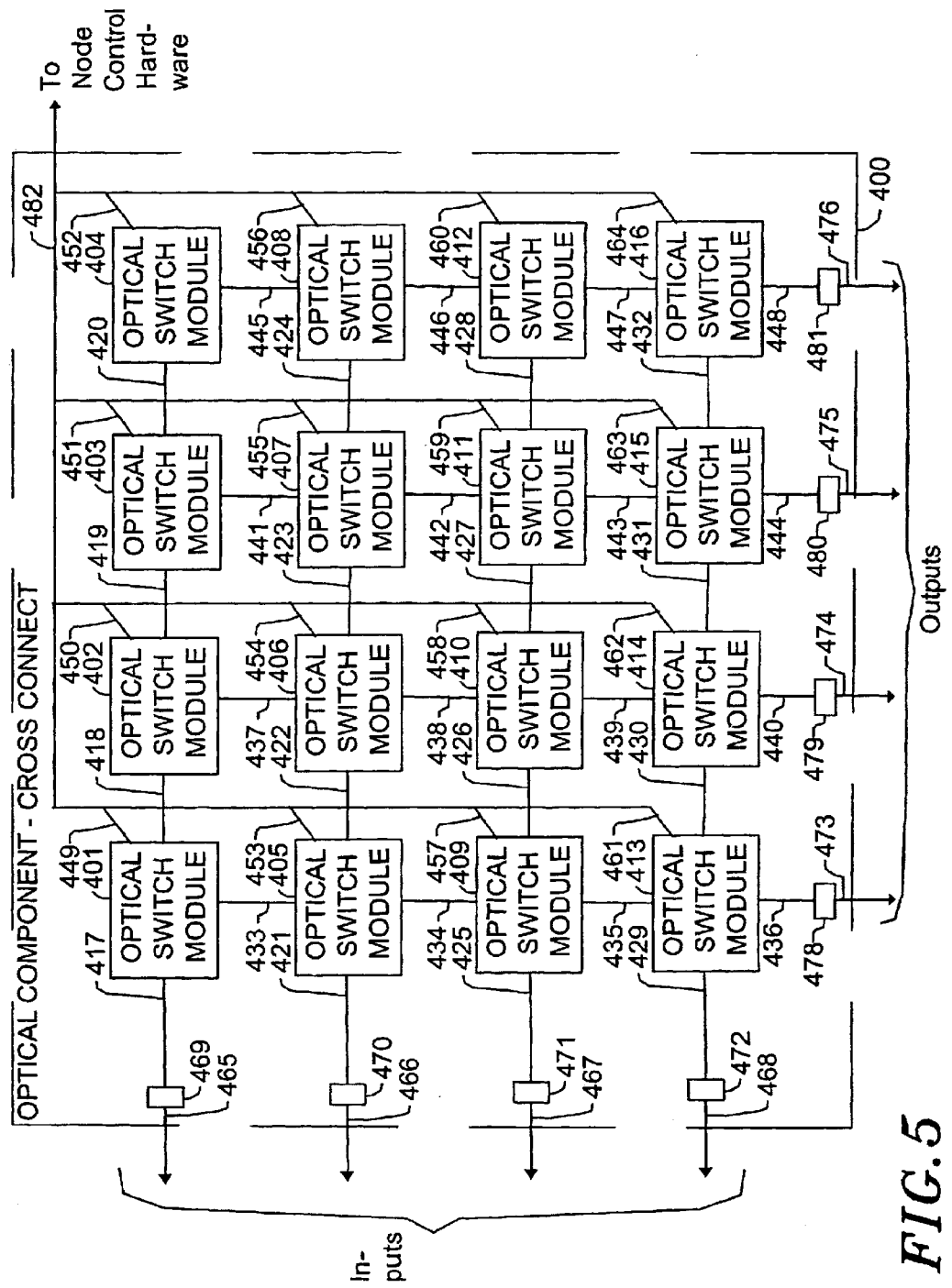
FIG. 5 is a block diagram of an optical component of the cross connect type which may be used in the network node of FIG. 3 or in the network node of FIG. 4.

FIG. 5 shows an optical component 400 which includes sixteen optical switch modules 401 through 416, optical waveguides 417 through 448, and electronic switch control conductors 449 through 464. The optical waveguides 417 through 448 preferably are planar single mode waveguides embedded in a planar substrate to provide optical pathways for optical communications signals. The electronic switch control conductors 449 through 464 preferably are each a pair of electrical conductors for providing electrical switch activation signals to the respective optical switch modules 401 through 416. The electronic switch control conductors 449 through 464 are combined together in the cable 482. Input optical fibers 465, 466, 467 and 468 are connected to optical pigtail couplers 469, 470, 471, and 472, respectively, which are in turn connected to the waveguides 417, 421, 425, and 429, respectively. Input optical fibers 465, 466, 467 and 468 are preferably single mode optical fibers for sending optical communications signals into the optical component 400. The optical pigtail couplers 469, 470, 471, and 472 are preferably of conventional construction and provide optical coupling between the optical fibers 465, 466, 467 and 468 and the waveguides 417, 421, 425 and 429, respectively. Output optical fibers 473, 474, 475, and 476 are preferably single mode optical fibers for receiving optical communications from the optical component 400. The optical pigtail couplers 478, 479, 480, and 481 may be of conventional construction and provide optical coupling between the optical fibers 473, 474, 475, and 476 and the waveguides 417, 421, 425 and 429, respectively.

The optical component 400 is referred to as a cross connect, since it is designed to provide optical pathways for DWDM optical communications signals which remain multiplexed inside the component, and are switched in bulk without demultiplexing or adding or dropping any of the optical signal wavelength components. The optical switch modules 401 through 416 are shown in FIG. 5 as a square matrix of four rows by four columns, with a first column containing optical switch modules 401, 405, 409 and 413. The depiction in FIG. 5 of a square matrix is for simplicity of description, and the relative physical positions of optical switch modules 401 through 416 on a waveguide substrate need not be in a square.

The optical switch modules 401 through 416 are configured to switch optical communications signals coming from optical fibers 465 through 468 if such signals have a predetermined polarization (referred to herein as the preferred polarization). For example, if the preferred polarization is used, optical switch module 405 produces an optical communications signal output on waveguide 434 which (a) is equal to the input from waveguide 433 when the optical switch module 405 is not activated by electronic switch control signals on conductors 453 (the module 405 is "off"); and (b) is equal to the sum of the input from waveguide 433 and the input from waveguide 421 when the optical switch module 405 is activated by electronic switch control signals on conductors 453 (the module 405 is "on"). Also, if the preferred polarization is used, optical switch module 405 produces an optical communications signal on waveguide 422 which (c) is equal to the input from waveguide 421 when the module 405 is off; and (d) is null when the module 405 is on. The optical switch modules 401 through 416 operate in the same way as in the example of optical switch module 405, each with corresponding inputs and outputs connected to the respective waveguides as shown in FIG. 5, with the exception that optical switch modules 401 through 404 do not receive inputs from any waveguides corresponding to waveguide 433, and with the exception that optical switch modules 404, 408, 412, and 416 do not produce outputs on any waveguides corresponding to waveguide 422.

The matrix of optical switch modules 401 through 416, and the interconnections of waveguides 417 through 448 allow pathways for optical communications signals through optical component 400 to be created by selectively activating the optical switch modules 401 through 416. For example, if an optical pathway for optical communications signals using the preferred polarization is to be created between optical fiber 465 as an input and optical fiber 475 as an output, then optical switch module 403 should be turned on, and the other switch modules kept off. As a further example using the preferred polarity, if a first optical pathway between fiber 466 and fiber 476 is needed, and if a second optical pathway between fiber 468 and fiber 473 is needed; then modules 408 and 413 should be turned on, and the other modules kept off.

The optical component 400 may be used, for example, as the optical component 234 of FIG. 3 when optical communications signals have the preferred polarization, in which case the optical fibers 465 through 468, optical fibers 473 through 476, and cable 482 correspond, respectively, to the optical fibers 210, 212, 214 and 216, optical fibers 244, 246, 248 and 250, and cable 254 of FIG. 3.

The optical component 400 may be used, for example, as the optical component 334 of FIG. 4 when optical communications signals do not have the preferred polarization, in which case the optical fibers 465 through 468, optical fibers 473 through 476, and cable 482 correspond, respectively, to the optical fibers 310, 312, 314 and 316, optical fibers 344, 346, 348 and 350, and cable 354 of FIG. 4.

Although the optical component 400 of FIG. 5 is shown as having sixteen optical switch modules 401 through 416; an optical component could be made with a reduced or increased number of optical switch modules depending on the desired numbers of input and output optical fibers. As a further alternative, although the optical component 400 is shown in FIG. 5 as having an equal number of rows and columns of optical switch modules, the numbers of rows and columns may be different if the number of input optical fibers is different from the number of output optical fibers. A further alternative is to include supplementary optical fiber inputs connected to modules 401 through 404 and outputs connected to modules 404, 408, 412 and 416 allowing a group of the optical components 400 to be interconnected with each other to form a combined optical component assembly having a larger number of inputs and outputs than the optical component 400.

A significant advantage of the optical component 400 is the electrical and optical isolation of the optical switch modules 401 through 416, which allows the optical switch modules 401 through 416 to operate independently without undesirable crosstalk in the form of light leakage between or among the switch modules 401 through 416, and without inadvertent undesirable stray electrical activation or turning on of nearby switch modules (which are desired to be kept off) when one desired switch module of the switch modules 401 through 416 is electrically activated (the desired switch module BEING desired to be turned on).

Figure 6:
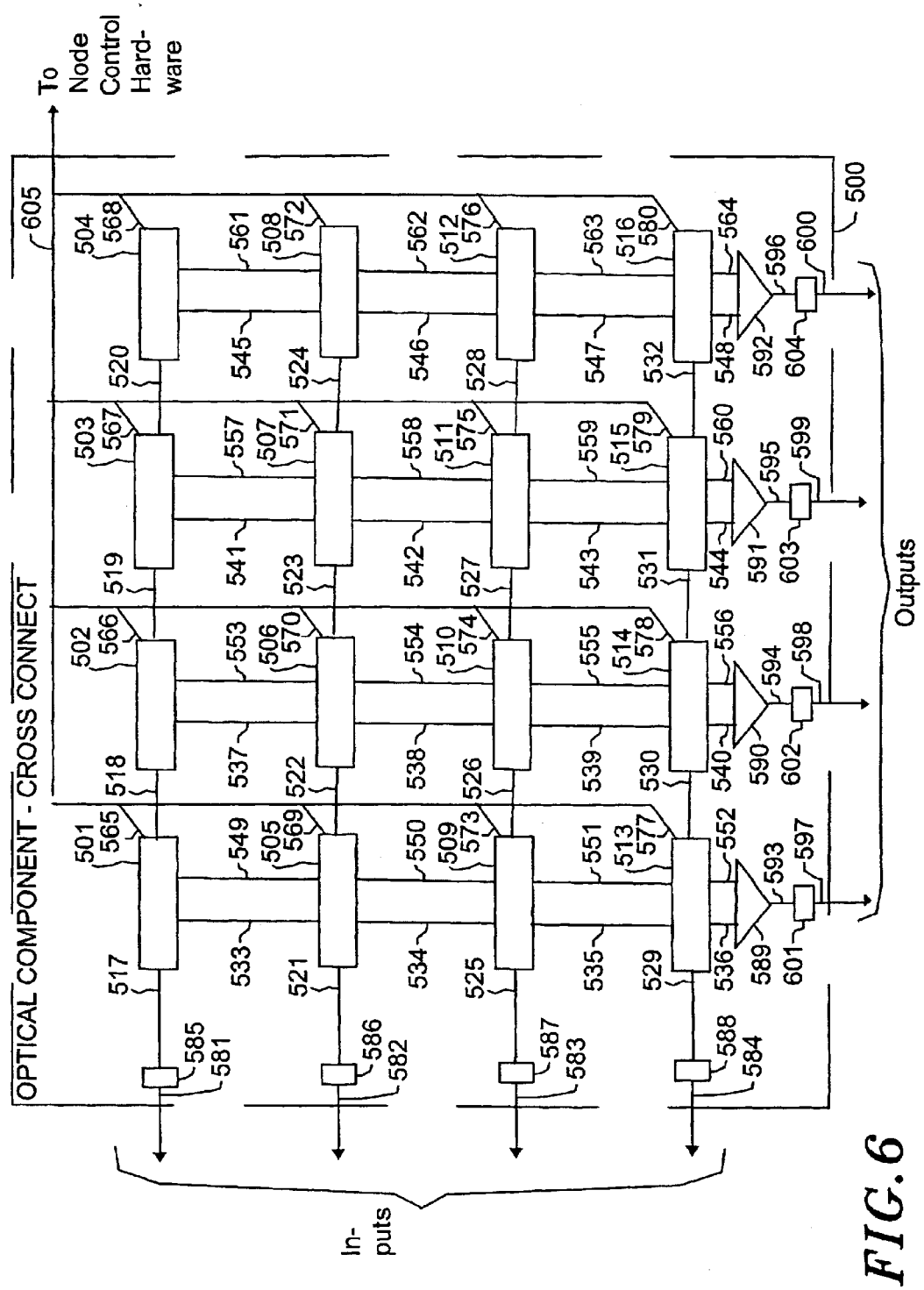
FIG. 6 is a block diagram of an optical component of the cross connect which is polarization independent and which may be used in the network node of FIG. 3.

FIG. 6 shows an optical component 500 with sixteen optical switch modules 501 through 516, optical waveguides 517 through 564 and 593 through 596, and electronic switch control conductors 565 through 580. The optical waveguides 517 through 564 and 593 through 596 preferably are planar single mode waveguides embedded in a planar substrate to provide optical pathways for optical communications signals. The electronic switch control conductors 565 through 580 preferably are each a group of electrical conductors for providing electrical switch activation voltage signals to the respective optical switch modules 501 through 516. The electronic switch control conductors 565 through 580 are combined together in the cable 605. Input optical fibers 581, 582, 583 and 584 are connected to optical pigtail couplers 585, 586, 587 and 588, respectively, which are in turn connected to the waveguides 517, 521, 525, and 529, respectively. Input optical fibers 581, 582, 583 and 584 are preferably single mode optical fibers for sending optical communications signals into the optical component 500. The optical pigtail couplers 585, 586, 587 and 588 are may be of conventional construction and provide optical coupling between the optical fibers 581, 582, 583 and 584 and the waveguides 517, 521, 525 and 529, respectively. Output optical fibers 597, 598, 599 and 600 are preferably single mode optical fibers for receiving optical communications from the optical component 500. The optical pigtail couplers 601, 602, 603 and 604 may be of conventional construction and provide optical coupling between the optical fibers 597, 598, 599 and 600 and the waveguides 593, 594, 595 and 596, respectively.

The optical component 500 also has optical combiners 589, 590, 591 and 592 having outputs connected to waveguides 593, 594, 595 and 596. Each of the optical combiners 589, 590, 591 and 592 has two inputs, a first input of each is connected to waveguides 536, 540, 544 and 548, respectively; and a second input of each is connected to waveguides 552, 556, 560 and 564, respectively.

The optical component 500 is referred to as an optical cross connect, since it is designed to provide optical pathways for DWDM optical communications signals which remain multiplexed inside the component, and are switched in bulk without demultiplexing or adding or dropping any of the optical signal wavelength components and is also protocol independent. The optical switch modules 501 through 516 are shown in FIG. 6 as a square matrix of four rows by four columns, with a first column containing optical switch modules 501, 505, 509 and 513. The depiction in FIG. 6 of a square matrix is for simplicity of description, and the relative physical positions of optical switch modules 501 through 516 on a waveguide substrate need not be in a square.

The optical switch modules 501 through 516 are configured to switch optical communications signals coming from optical fibers 581 through 584 if such signals have a polarization which is not predetermined, and such signals may be of arbitrary polarization, and such signals may have a polarization that changes over time. The optical switch modules 501 through 516 are configured to switch optical communications signals independent of the polarization of such signals by separately switching first and second orthogonal polarization components of such signals. For example, optical switch module 505 produces an optical communications signal output on waveguide 534 which (a) is equal to the input from waveguide 533 when the optical switch module 405 is not activated by electronic switch control signals on conductors 569 (the module 505 is "off"); and (b) is equal to the sum of the input from waveguide 533 and a first orthogonal polarization component of the input from waveguide 521 when the optical switch module 505 is activated by electronic switch control signals on conductors 569 (the module 405 is "on"). Further, optical switch module 505 produces an optical communications signal output on waveguide 550 which (a) is equal to the input from waveguide 549 when the optical switch module 405 is not activated by electronic switch control signals on conductors 569 (the module 505 is "off"); and (b) is equal to the sum of the input from waveguide 549 and a second orthogonal polarization component of the input from waveguide 521 when the optical switch module 505 is activated by electronic switch control signals on conductors 569 (the module 405 is "on"). Also optical switch module 505 produces an optical communications signal on waveguide 522 which (c) is equal to the input from waveguide 521 when the module 505 is off; and (d) is null when the module 505 is on. The optical switch modules 501 through 516 operate in the same way as in the example of optical switch module 505, each with corresponding inputs and outputs connected to the respective waveguides as shown in FIG. 6, with the exception that optical switch modules 501 through 504 do not receive inputs from any waveguides corresponding to waveguides 533 and 549, and with the exception that optical switch modules 504, 508, 512, and 516 do not produce outputs on any waveguides corresponding to waveguide 422.

The function of each of the optical combiners 589 through 592 is to combine orthogonal polarization components of input optical communications signals to produce an output which contains both orthogonal polarization components. For example, optical combiner 589 has a first input connected to waveguide 536 for receiving a first orthogonal polarization component signal from waveguide 536, and a second input connected to waveguide 552 for receiving a second orthogonal polarization component signal from waveguide 552, and an output connected to waveguide 593 for producing a combined optical communications signal on waveguide 593 equal to the sum of the first and second orthogonal polarization component signals from waveguides 536 and 552. The optical combiners 590, 591 and 592 function in the same way as combiner 589, each with their respective waveguide inputs and outputs.

The matrix of optical switch modules 501 through 516, and the interconnections of waveguides 517 through 564 allow pathways for optical communications signals through optical component 500 to be created by selectively activating the optical switch modules 501 through 516. For example, if an optical pathway for optical communications signals is to be created between optical fiber 581 as an input and optical fiber 599 as an output, then optical switch module 503 should be turned on, and the other switch modules kept off. As a further example, if a first optical pathway between fiber 582 and fiber 600 is selected, and if a second optical pathway between fiber 584 and fiber 597 is selected, then modules 508 and 513 should be turned on, and the other modules kept off.

The optical component 500 may be used, for example, as the optical component 234 of FIG. 3 when optical communications signals have any polarization, or polarization which changes with time, in which case the optical fibers 581 through 584, optical fibers 597 through 600, and cable 605 correspond, respectively, to the optical fibers 210, 212, 214 and 216, optical fibers 244, 246, 248 and 250, and cable 254 of FIG. 3.

Although the optical component 500 of FIG. 6 is shown as having sixteen optical switch modules 501 through 516; an optical component could be made with a reduced or increased number of optical switch modules depending on the needed numbers of input and output optical fibers. As a further alternative, although the optical component 500 is shown in FIG. 6 as having an equal number of rows and columns of optical switch modules, the numbers of rows and columns may be different if the number of input optical fibers is different from the number of output optical fibers. A further alternative is to include supplementary optical fiber inputs connected to modules 501 through 504 and outputs connected to modules 504, 508, 512 and 516 allowing a group of the optical components 500 to be interconnected with each other to form a combined optical component assembly having a larger number of inputs and outputs than the optical component 500.

A significant advantage of the optical component 500 is the electrical and optical isolation of the optical switch modules 501 through 516, which allows the optical switch modules 501 through 516 to operate independently without undesirable crosstalk in the form of light leakage between or among the switch modules 501 through 516, and without inadvertent undesirable stray electrical activation or turning on of nearby switch modules (which are desired to be kept off) when one desired switch module of the switch modules 501 through 516 is electrically activated (the desired switch module is desired to be turned on).

Figure 7:
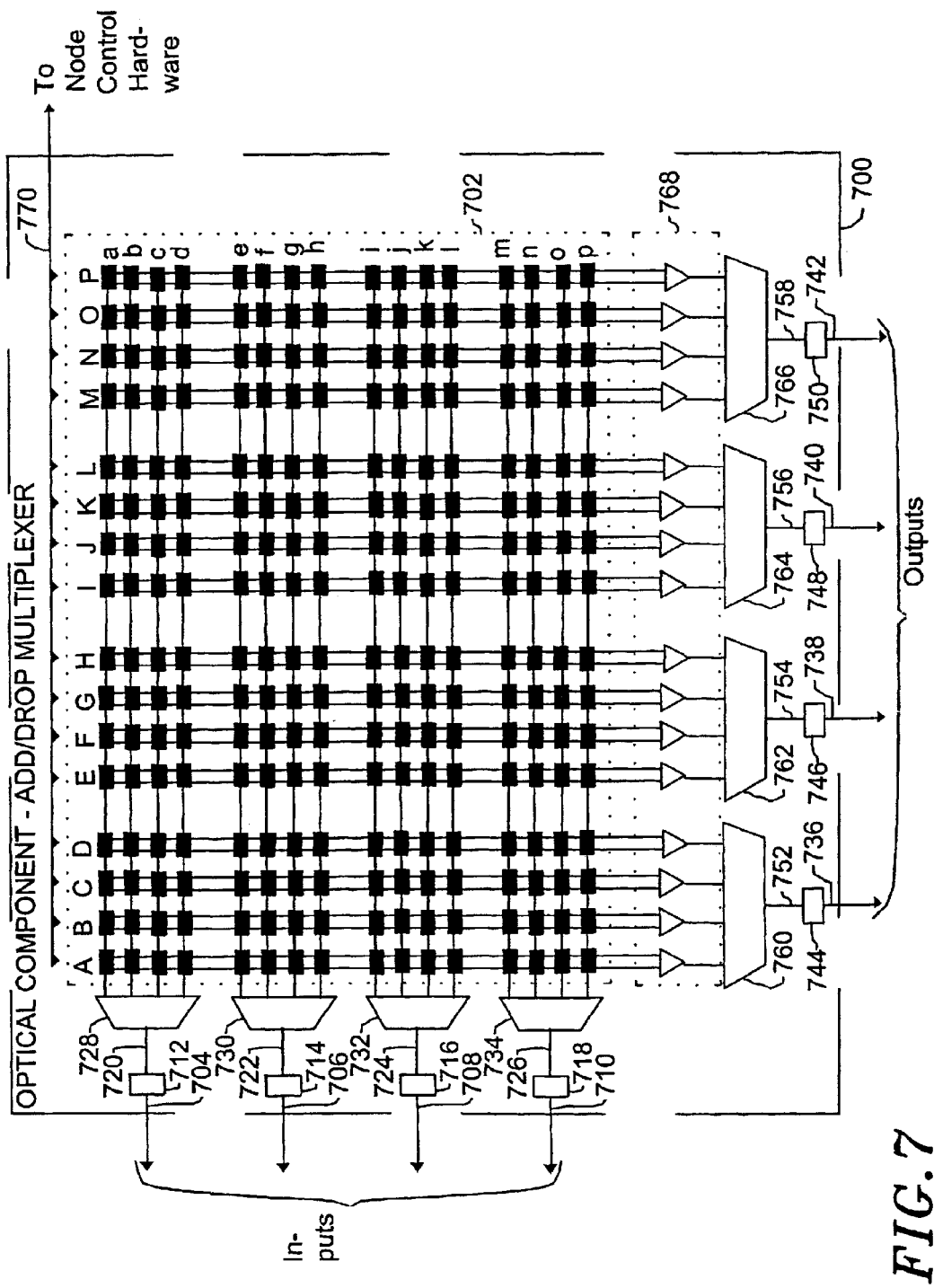
FIG. 7 is a block diagram of an optical component of the add/drop multiplexer which is polarization independent and which may be used in the network node of FIG. 3.

FIG. 7 shows an optical component 700 with two hundred fifty six optical switch modules and associated optical waveguides in an optical switching matrix 702, which is shown having such switch modules as black rectangles arranged in sixteen columns labeled as upper-case A through P and sixteen rows labeled as lower-case a through p. The optical waveguides in the switching matrix 702 preferably are planar single mode waveguides embedded in a planar substrate to provide optical pathways for optical communications signals. The optical component 700 has electronic switch control conductors combined in a cable 770, such switch control conductors being connected to each switch module in each row and column of the switching matrix 702. The electronic switch control conductors in the cable 770 preferably are each a group of electrical conductors for providing electrical switch activation voltage signals to the individual optical switch modules in the switching matrix 702. Input optical fibers 704, 706, 708 and 710 are connected to optical pigtail couplers 712, 714, 716 and 718, respectively, which are in turn connected to the waveguides 720, 722, 724 and 726, respectively. Input optical fibers 704, 706, 708 and 710 are preferably single mode optical fibers for sending optical communications signals into the optical component 700. The optical pigtail couplers 712, 714, 716 and 718 may be of conventional construction and provide optical coupling between the optical fibers 704, 706, 708 and 710 and the waveguides 720, 722, 724 and 726, respectively. Output optical fibers 736, 738, 740 and 742 are preferably single mode optical fibers for receiving optical communications from the optical component 700. The optical pigtail couplers 744, 746, 748 and 750 may be of conventional construction and provide optical coupling between the optical fibers 736, 738, 740 and 742 and the waveguides 752, 754, 756 and 758, respectively.

The optical component 700 also has optical demultiplexers 728, 730, 732 and 734 having inputs connected to the waveguides 720, 722, 724 and 726. The optical demultiplexers 728, 730, 732 and 734 may be of conventional construction and may use an arrayed waveguide grating of conventional design. The optical demultiplexers 728, 730, 732 and 734 each have four outputs which are connected to waveguides in the respective rows of the switching matrix 702. The function of the optical demultiplexers 728, 730, 732 and 734 is to separate the wavelength components of incoming DWDM optical communications signals from the fiber optic cables 704, 706, 708 and 710, so that such wavelength components may be separately switched and combined in the switching matrix 702.

Each of the columns A through P of the switching matrix 702 has first and second separate sets of optical waveguides, for carrying the respective first and second orthogonal polarization components of optical communications signals along said columns A though P.

The optical component 700 also has an optical combiner array 768 with sixteen optical combiners connected to the respective outputs of respective sixteen columns A through P of the switching matrix 702, and with sixteen optical waveguide outputs. Each combiner of the combiner array 768 has two inputs, a first input connected to a first waveguide for receiving the first orthogonal polarization component of signals from the output of a column of switching matrix 702, and a second input connected to a second waveguide for receiving the second component of signals from the output of such column of switching matrix 702.

The optical component 700 also has optical multiplexers 760, 762, 764 and 766 which have inputs connected to waveguide outputs of the combiner array 768, and with respective outputs connected to the waveguides 752, 754, 756 and 758. The multiplexers 760, 762, 764 and 766 are preferably of conventional construction.

The optical component 700 is referred to as an add/drop multiplexer, since it is designed to provide optical pathways for DWDM optical communications signals which are de-multiplexed inside the component, and are switched by adding or dropping any of the optical signal wavelength components, and re-mulitplexed before being sent out of the optical component 700. The optical switch modules in the switching matrix 702 are shown in FIG. 7 as a square matrix of sixteen rows by sixteen columns. The depiction in FIG. 7 of a square matrix is for simplicity of description, and the relative physical positions of optical switch modules in the switching array 702 on a waveguide substrate need not be in a square.

The optical switch modules in the switching array 702 are configured to switch optical communications signals coming from optical fibers 704, 706, 708 and 710 if such signals have a polarization which is not predetermined, and such signals may be of arbitrary polarization, and such signals may have a polarization that changes over time. The optical switch modules in the switching array 702 are configured to switch optical communications signals independent of the polarity of such signals by separately switching first and second orthogonal polarization components of such signals. The function of each of the optical combiner array 768 is to combine orthogonal polarization components of input optical communications signals to produce an output which contains both orthogonal polarization components. For example, the optical combiner array 768 has a combiner with a first input connected to a first waveguide in the matrix 702 column A for receiving a first orthogonal polarization component signal from such first waveguide, and a second input connected to a second waveguide in the matrix 702 column A for receiving a second orthogonal polarization component signal from such second waveguide, and an output connected through a waveguide to an input of mulitplexer 760 for producing a combined optical communications signal at such input to multiplexer 760 equal to the sum of the first and second orthogonal polarization component signals from such first and second waveguides in the matrix 702 column A. The optical combiners in the combiner array 768 function in the same way as combiner connected to matrix 702 column A, each with their respective waveguide inputs and outputs.

The switching matrix 702 of optical switch modules, and the interconnections of waveguides inside the matrix 702, allow pathways for optical communications signals through optical component 700 to be created by selectively activating the optical switch modules in desired rows and columns of the switching matrix 702.

The optical component 700 of FIG. 7 may be used, for example, as the optical component 234 of FIG. 3 when optical communications signals have any polarization, or polarization which changes with time, in which case the optical fibers 704, 706, 708 and 710, optical fibers 736, 738, 740 and 742, and cable 770 correspond, respectively, to the optical fibers 210, 212, 214 and 216, optical fibers 244, 246, 248 and 250, and cable 254 of FIG. 3.

Although the optical component 700 of FIG. 7 is shown as having two hundred fifty six optical switch modules in the switching array 702; an optical component could be made with a reduced or increased number of optical switch modules depending on the desired numbers of input and output optical fibers and wavelength components of the optical communications signals used on such optical fibers. As a further alternative, although the optical component 700 is shown in FIG. 7 as having an equal number of rows and columns of optical switch modules in the switching matrix 702, the numbers of rows and columns may be different if the number of input optical fibers is different from the number of output optical fibers. A further alternative is to include supplementary optical fiber inputs connected to modules in row a of switching matrix 702 and outputs connected to modules column P of switching matrix 702 allowing a group of the optical components 700 to be interconnected with each other to form a combined optical component assembly having a larger number of inputs and outputs than the optical component 700.

A significant advantage of the optical component 700 is the electrical and optical isolation of the optical switch modules in the switching matrix 702 from each other, which allows the optical switch modules to operate independently without undesirable crosstalk in the form of light leakage between or among the switch modules, and without inadvertent undesirable stray electrical activation or turning on of nearby switch modules (which are desired to be kept off) when one desired switch module of the switch modules in the switching matrix 702 is electrically activated (the desired switch module is desired to be turned on).

The switching functions of the optical switch modules in the switching array 702 depicted in FIG. 7 may be implemented by using conventional switching technology such as bubbles switches or MEMS as well as switching technologies yet to be developed. Preferably, however, these devices and systems are based on total internal reflection (TIR) switches such as those described in U.S. Pat. No. 6,310,712, entitled "Discrete Element Light Modulating Microstructure Devices" issued to Romanovsky on Oct. 30, 2001, U.S. Pat. No. 6,381,060, entitled "Total Internal Reflection Light Modulating Microstructure Devices" issued to Romanovsky on Apr. 30, 2002, as well as U.S. patent application Ser. No. 10/013336 entitled "Electro-Optic Switching Assembly and Method", filed on Nov. 5, 2001, published as U.S. Publication No. 2002-0181067 on Dec. 5, 2002, which are incorporated herein by reference in their entirety, as well as those discussed below.

Figure 18:
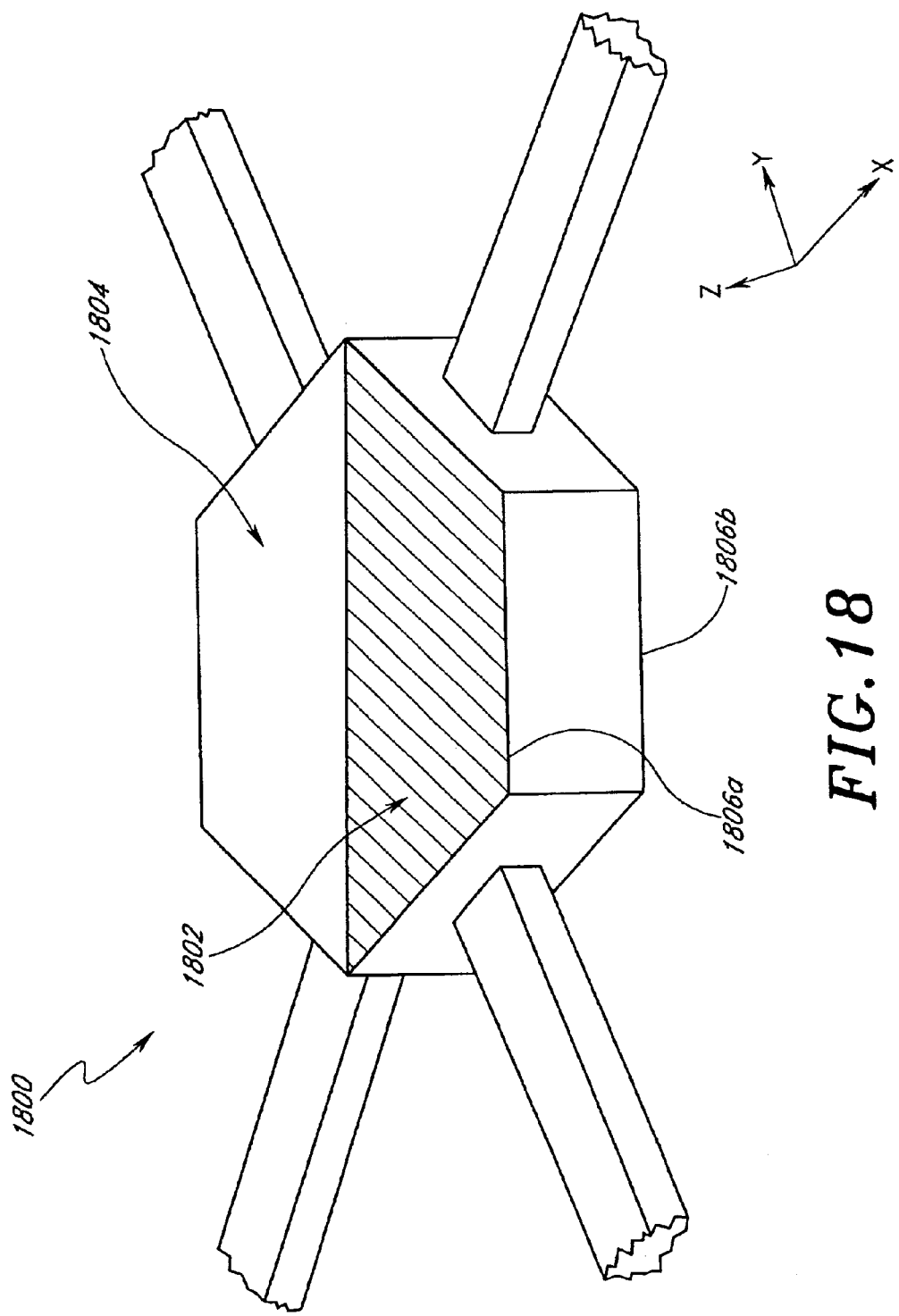
FIG. 18 illustrates one embodiment of a free space total internal reflection switch having two input waveguides and two output waveguide.
Figure 19:
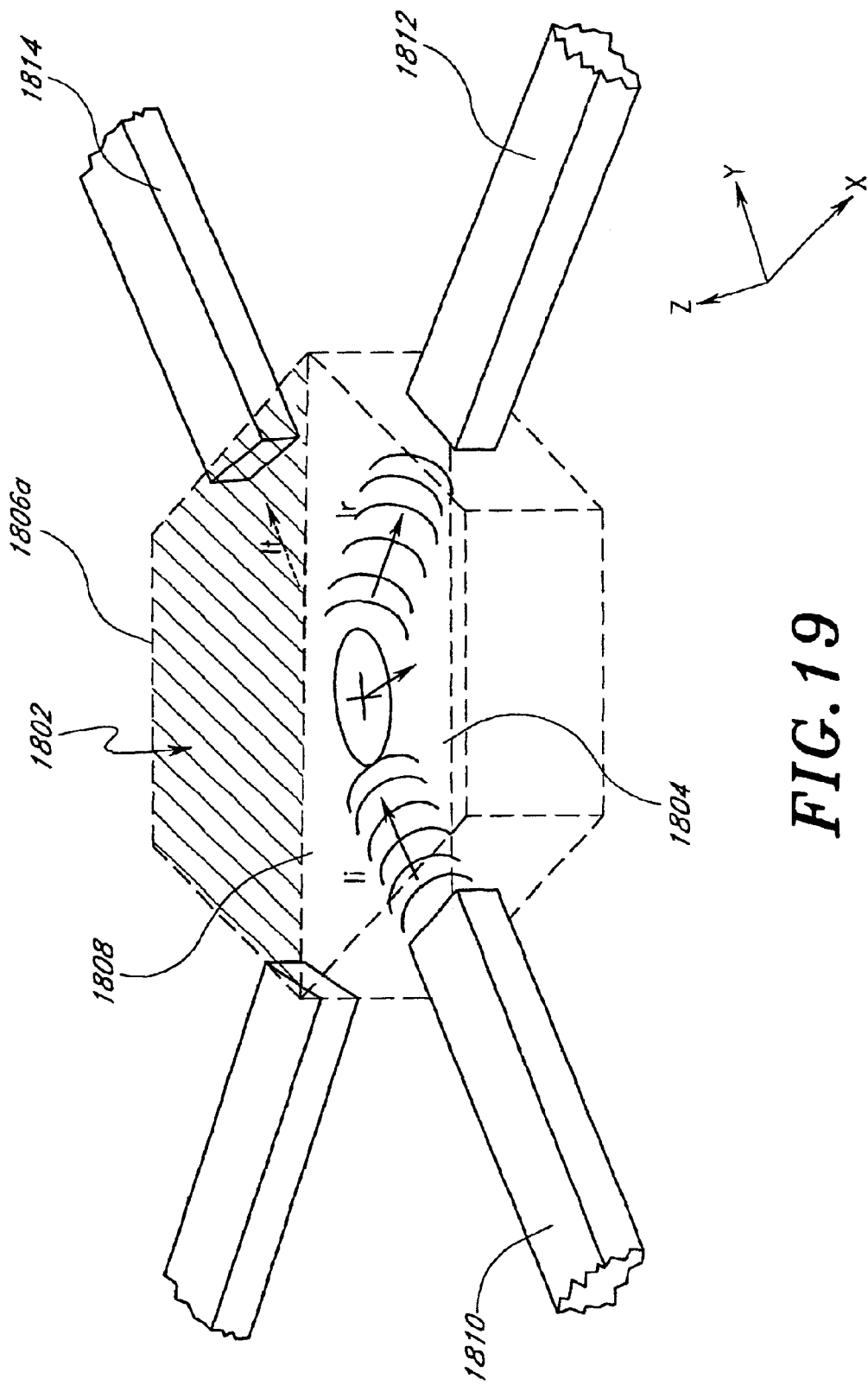
FIG. 19 illustrates an optical signal in free space mode being reflected from a total internal reflection boundary within the free space total internal reflection switch of FIG. 18.

FIGS. 18 and 19 schematically illustrate one preferred embodiment of an optical switch 1800 that may be employed, for example, in the optical switch module 401 of FIG. 5. As shown in FIGS. 18 and 19, the optical switch 1800 generally comprises two portions, a first portion 1802 having an index of refraction that varies with applied field, and a second portion 1804 having an index of refraction that preferably remains substantially constant. The first and second portions 1802 and 1804 preferably have such dimensions that light propagating therein is unguided and propagates as if in free space, i.e., the light propagation is unaffected by the side surfaces of the first and second portions. A pair of electrodes 1806a, 1806b are disposed on opposite sides of the first portion 1802, which preferably comprises electro-optically active material. The first and second portions 1802, 1804 of the optical switch 1800 are adjacent to each other such that a boundary 1808 formed between the two portions 1802, 1804 is inclined at an angle greater than a critical angle for total internal reflection with respect to an incident light beam $I_i$. This boundary 1808 is depicted in FIG. 19, which displays the switch 1800 with the second portion in the foreground, in contrast to the view shown in FIG. 18.

In one preferred embodiment, the first portion 1802 comprises material having an index of refraction that varies in response to application of an electric field and the second portion 1804 comprises a deactivated electro-optic material having an index of refraction that is insensitive to electric fields. Such a design is disclosed in U.S. patent application Ser. No. 09/891,689, entitled "Deactivated Electro-Optic Material and Method of Forming the Same", filed Jun. 26, 2001, published as U.S. Publication No. 2002-0163706 on Nov. 7, 2002, which is incorporated herein by reference in its entirety.

Preferably, the refractive index of the first portion 1802 matches that of the second portion 1804 in the absence of an electric field so as to permit the incident light beam $I_i$ to propagate through the boundary 1808 without substantial Fresnel reflection. However, when the switch 1800 is exposed to an electric field, in one preferred embodiment the refractive index of the first portion 1802 is substantially lowered while the refractive index of the second portion 1804 remains substantially unchanged. As such, the resulting difference in refractive indices between the two portions 1802, 1804 creates a refractive index interface coincident with the boundary 1808 that causes total internal reflection of the light beam $I_i$ incident on the boundary 1808.

The refractive index interface is generated by applying a voltage between the electrodes 1806a, 1806b. As shown in FIG. 19, the electrodes 1806a, 1806b are disposed on opposite sides of the active portion 1802 so as to generate an electric field that is parallel to the boundary 1808. Orthogonally directed electric fields may be created depending on whether the pair of electrodes 1806 are on top and bottom of the electro-optically active material or laterally disposed on opposite sides of the first portion 1802. For some electro-optically active material, the orientation of the electric field through the material controls the direction and/or magnitude of the induced index of refraction variation. For example, for electro-optically active lead lanthanum zirconate titanate (PLZT), the index of refraction is reduced for light linearly polarized parallel to the electric field and increases for light with a perpendicular polarization. This reduction in refractive index for the parallel polarization is about three time the increase for perpendicular polarizations in some formulations of electro-optically active PLZT The optical switch 1800 functions to switch an incident light signal $I_i$ between first and second outputs 1812, 1814.

In one preferred configuration, the application of the electric field lowers the refractive index of the first portion 1802 relative to the second portion 1804. The incident light beam $I_i$ entering the second portion 1804 at an input 1810 and striking the boundary 1808 at an angle greater than the critical angle (approximately 80°) is total internally reflected and travels to the first output 1812 where it is output as a reflected signal $I_r$. When it is desirable to switch the light signal to the second output 1814, the electric field is removed so that the refractive index of the first portion 1802 is restored to its original value, thus permitting the incident light beam $I_i$ to pass unreflected through the boundary 1808 and reach the second output 1814, where it is output as a transmitted signal $I_t$. Preferably, the materials comprising the first and second portions 1802, 1804 have substantially the same refractive index in the absence of the electric field so that the incident light beam $I_i$ can travel through the boundary 1808 with reduced reflection and thus reach the second output 1814 with reduced signal loss.

As discussed above, for a switch 1800 comprising certain formulations of electro-optically active polycrystalline PLZT, the refractive index is reduced for incident light polarized parallel to the applied electric field. Linearly polarized light can be totally internally reflected therefore by applying an electric field parallel to the polarization direction. For example, if the electrodes are disposed above and below the switch, vertically polarized entering through the second portion and incident on the boundary at an angle greater than the critical angle may be reflected via total internal reflection.

Figure 8:
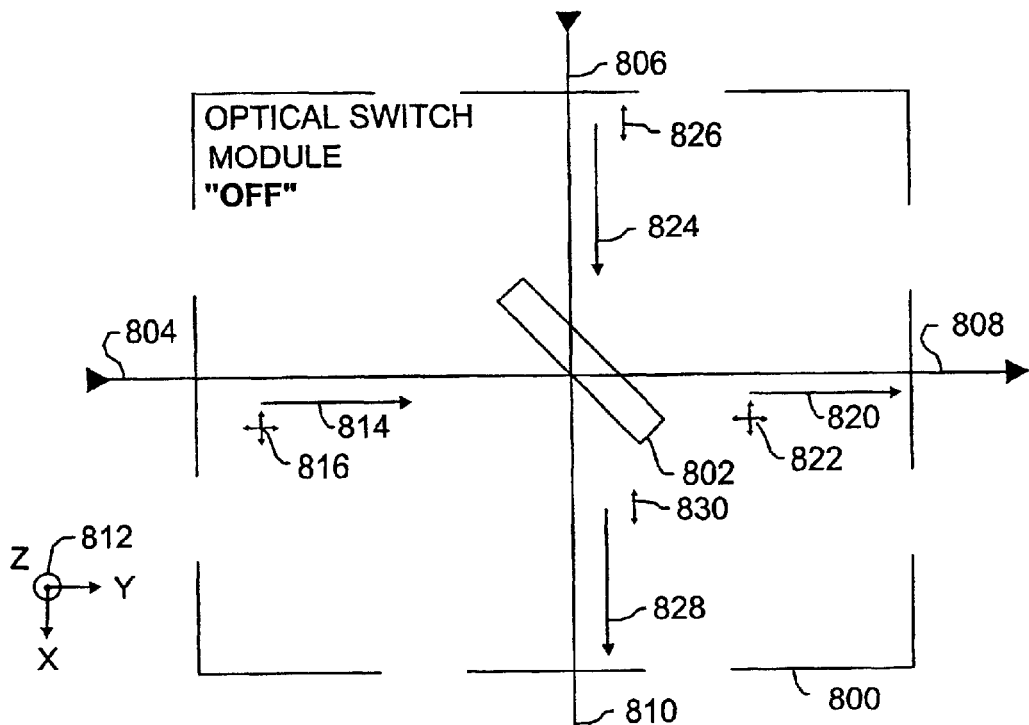
FIG. 8 is a schematic diagram of one example of an optical switch module in its "off" state, wherein input optical signals are transmitted through substantially unaltered.
Figure 9:
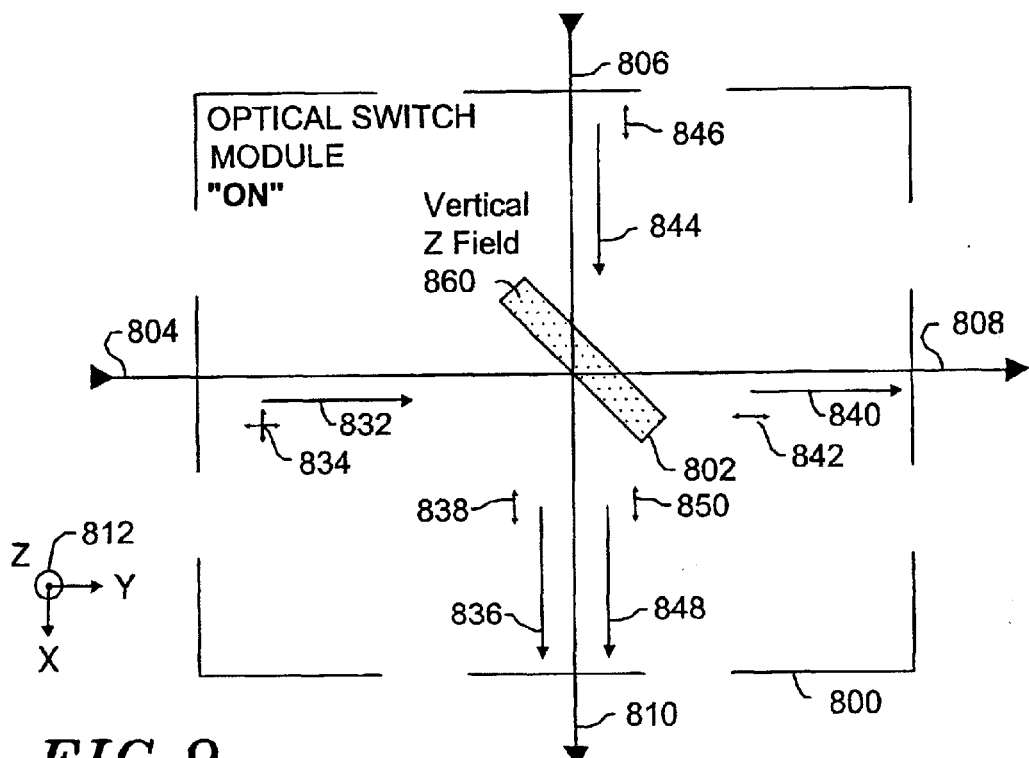
FIG. 9 is a schematic diagram of the optical switch module of FIG. 8 in its "on" state, wherein electric field is applied in a Z direction in an electro-optic switching element so as to cause a total internal reflection (TIR) of a vertical polarization component of an input optical signal.

FIGS. 8 and 9 demonstrate how such polarization dependencies can be integrated into the design of the optical switching module 401 for some of optical components described above. FIG. 8 is a block diagram of an optical switch module 800 shown in the "off" condition. FIG. 9 is a block diagram of the same optical switch module 800 as shown in FIG. 8, but in the "on" condition. This optical switch module 800 comprises a switch element 802, input optical waveguides 804 and 806, and output optical waveguides 808 and 810. The optical switch module 800 may be used as any of the optical switch modules 401 through 416 of FIG. 5. For example, optical switch module 800 could be used as the optical switch module 406 of FIG. 5, in which case waveguides 804, 806, 808 and 810 correspond to the waveguides 422, 437, 423 and 438 of FIG. 5.

The switch element 802 preferably contains an electro-optic material, which changes its optical index of refraction in response to an applied electric field. In one preferred configuration, application of an electric field across the electro-optical material induces the formation of a total internal reflection boundary. The optical switch module 800 is shown in the "off" condition in FIG. 8 when no electric field is applied to the switch element 802.

Coordinate axes 812 provide a reference for the X, Y and Z directions in FIG. 8. The Z axis corresponds to the vertical direction and is orthogonal to the X-Y plane defined by the X and Y axes, which corresponds to the horizontal. A first incoming optical communications signal may propagate along the optical pathway 814 in the Y direction through the waveguide 804, and such signal may have optical polarization components 816 in the horizontal and vertical directions, i.e., which are parallel to the X and Z axes, respectively. The components 816 are marked with horizontal and vertical arrows, indicating the horizontal and vertical polarization components, but such arrows are not referenced to the coordinate axes 812.

As the switch is "off", the first incoming optical communications signal proceeds along pathway 814, through the switch element 802 and along the optical pathway 820 to the output waveguide 808. Such signal on pathway 814 may have optical polarization components 822 which are marked with horizontal and vertical arrows indicating the horizontal and vertical components.

A second incoming optical communications signal may travel along the optical pathway 824 in the X direction through the waveguide 806, and such signal is expected to have an optical polarization component 826 only including a component in the vertical direction. The reason that the component 826 is only vertical is that in some preferred embodiments of the module 800 used in an array of modules 401 through 416 as shown in FIG. 5, the waveguide 806 is expected to have only vertical polarization light components as a plurality of similar modules are connected in series, one above the other with optical paths containing vertically polarized components properly aligned. In other embodiments, the second incoming signal through the optical pathway 824 may include non-vertical polarization components. The second incoming optical communications signal proceeds along pathway 824, through the switch element 802 and along the optical pathway 828 to the output waveguide 810. Such signal on pathway 828 is expected to have the polarization component 830 which is the same as the polarization component 826, and which are expected to only include a component in the vertical direction.

The switch module 800 allows the first optical communications signal and the second optical communications signal to proceed through the switch element 802 independently of each other, without substantially impeding or interacting with each other as the first optical communications signal proceeds along pathways 814 and 820, and the second optical communications signal proceeds along pathways 824 and 828.

The block diagram of FIG. 8 shows the pathways 814 and 820 at a right angle to the pathways 824 and 828, but such right angle is only for simplicity in the diagram, and the physical relationship between such pathways is preferably at an acute angle. In one preferred embodiment wherein the module 800 is used as one of the modules 401 through 416 of FIG. 5, it is preferable that the first incoming optical communications signal on the waveguide 804 only have a vertical polarization component, in which case the components 816 and 822 would be only vertical.

FIG. 9 shows the switch module 800 in the "on" condition caused when an electric field is applied to the switch element 802 in the vertical (Z) direction. The element 802 is shown in FIG. 9 marked with small dots to indicate that the electric field is pointing upwards out of the page or downward into the page, in the vertical (Z) direction. A third incoming optical communications signal proceeds on the waveguide 804 along the optical pathway 832, and may have polarization components 834 in both the vertical and horizontal directions. The third incoming optical communications signal proceeds along pathway 832 to the switch element 802, where the element 802 contains a total internal reflection (TIR) boundary that reflects the vertical polarization component of the third incoming optical communications signal to the waveguide 810 along the optical pathway 836. The third incoming optical communications signal on the pathway 836 has a polarization component 838 that is only in the vertical direction. The element 802 reflects only the vertical component of the third incoming optical communications signal because the electric field inside the element 802 in the "on" condition is vertical, in the Z direction. Also, as the third incoming optical communications signal proceeds along pathway 832 to the switch element 802, the horizontal polarization component of the third incoming optical communications signal is transmitted through the switch element 802 to the waveguide 808 along the optical pathway 840. The third incoming optical communications signal on the pathway 840 has a polarization component 842 that is only in the horizontal direction.

This TIR boundary can be created using a variety of configurations. As discussed above, for example, when an sufficiently large electric field is passed through PLZT, the index of refraction of the PLZT may be reduced for light polarized parallel to the electric field and may increase for perpendicular polarization components. Accordingly, for a polarization component parallel to the applied electric field, a TIR boundary can be created for appropriate configurations such as when the medium through which the light passes just prior to reaching the PLZT has an index of refraction that is higher than the PLZT when the device is switched is "on". Numerous other configurations, however, are possible.

With continued reference to FIG. 9, a fourth incoming optical communications signal may travel along the optical pathway 844 through the waveguide 806, and such signal is expected, if such a signal is present at all, to have an optical polarization component 846 only including a component in the vertical direction. The fourth incoming optical communications signal is preferably not present at all when the switch element 802 is "on", if the module 800 is used as a module in an array of modules 401 through 416 as shown in FIG. 5, since it is preferable that only one switch module in each column of such an array be "on" at any time. The reason that the component 846 is expected to be only vertical, if the fourth incoming optical communications signal is present at all, in some embodiments wherein the module 800 is used in an array of modules 401 through 416 such as shown in FIG. 5, the waveguide 806 is expected to have only vertical polarization light components as a plurality of similar modules are connected in series, one above the other with optical paths containing vertically polarized components properly aligned. In other embodiments, the component 846 may comprise horizontal components. The fourth incoming optical communications signal proceeds along pathway 844, through the switch element 802 and along the optical pathway 848 to the output waveguide 810. Such signal on pathway 848 is expected to have the polarization component 850 which is the same as the polarization component 846, and which are expected to only include a component in the vertical direction.

The switch module 800 allows the third optical communications signal and the fourth optical communications signal to proceed through the switch element 802 independently of each other, without substantially impeding or interacting with each other as the third optical communications signal proceeds along pathways 832, 836 and 840, and the fourth optical communications signal proceeds along pathways 844 and 848. However, the pathways 836 and 848 are coextensive on the output waveguide 810, and signals on such pathways 836 and 848 are combined together inside the electric field induced birefringent portion of the switch element 802.

The block diagram of FIG. 9 shows the pathways 832 and 840 at a right angle to the pathways 836, 844 and 848, but such right angle is only for simplicity in the diagram, and the physical relationship between such pathways is preferably at an acute angle. In one preferred embodiment wherein the module 800 is used as one of the modules 401 through 416 of FIG. 5, it is preferable that the third incoming optical communications signal on the waveguide 804 only have a vertical polarization component, in which case the components 834 would be only vertical, and there would be no horizontal component of the third incoming optical communications signal to be present on the pathway 840.

Figure 10:
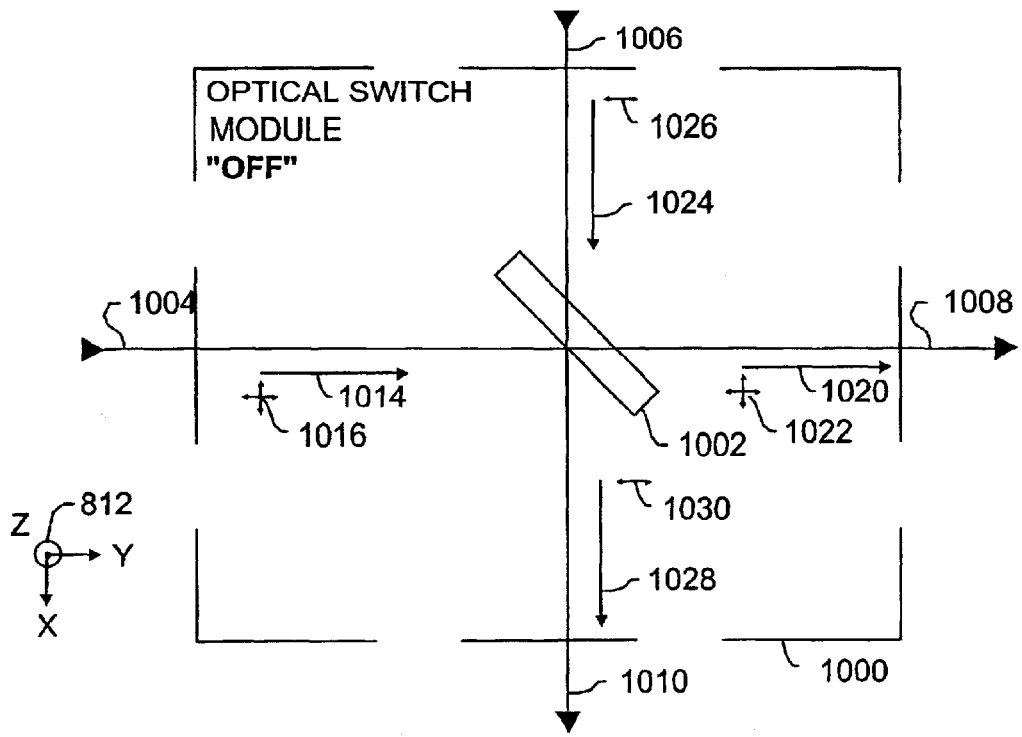
FIG. 10 is a schematic diagram of another optical switch module in its "off" state, wherein input optical signals are transmitted through substantially unaltered.
Figure 11:
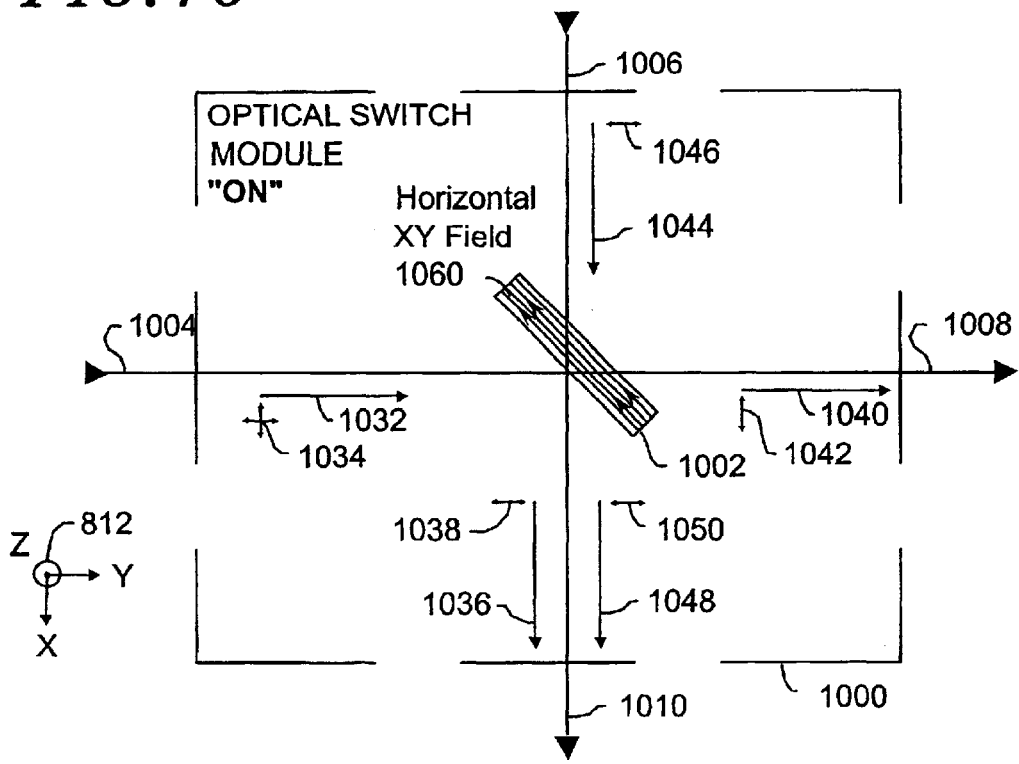
FIG. 11 is a schematic diagram of one configuration of the optical switch module of FIG. 10 in its "on" state, wherein electric field is applied in an XY direction in the electro-optic switching element so as to cause TIR of a horizontal polarization component of an input optical signal.

FIGS. 10 and 11 demonstrate how switching modules can be configured to operate for an orthogonal polarization state, e.g., to switch the horizontal polarization component. FIG. 10 is a block diagram of an optical switch module 1000 shown in the "off" condition. FIG. 11 is a block diagram of the same optical switch module 1000 as shown in FIG. 10, but in the "on" condition. This optical switch module 1000 comprises a switch element 1002, input optical waveguides 1004 and 1006, and output optical waveguides 1008 and 1010. The optical switch module 1000 may be used as any of the optical switch modules 401 through 416 of FIG. 5. For example, optical switch module 1000 could be used as the optical switch module 406 of FIG. 5, in which case waveguides 1004, 1006, 1008 and 1010 correspond to the waveguides 422, 437, 423 and 438 of FIG. 5.

The switch element 1002 preferably contains an electro-optic material, which changes its optical index of refraction in response to an applied electric field. In one preferred configuration, application of an electric field across the electro-optical material induces the formation of a total internal reflection boundary. The optical switch module 1000 is shown in the "off" condition in FIG. 10 when no electric field is applied to the switch element 1002.

Similar coordinate axes 812 as used in FIG. 8 are provided for reference. As described above, the Z axis corresponds to the vertical direction and is orthogonal to the X-Y plane defined by the X and Y plane, which corresponds to the horizontal. A first incoming optical communications signal may propagate along the optical pathway 1014 in the Y direction through the waveguide 1004, and such signal may have optical polarization components 1016 in the horizontal and vertical directions, i.e., which are parallel to the X and Z axes, respectively.

As the switch is "off", the first incoming optical communications signal proceeds along pathway 1014, through the switch element 1002 and along the optical pathway 1020 to the output waveguide 1008. Such signal on pathway 1014 may have optical polarization components 1022 which are marked with horizontal and vertical arrows indicating the horizontal and vertical components.

second incoming optical communications signal may travel along the optical pathway 1024 in the X direction through the waveguide 1006, and such signal is expected to have an optical polarization component 1026 only including a component in the horizontal direction. The reason that the component 1026 is only horizontal is that in some other preferred embodiments wherein the module 1000 is used in an array of modules 401 through 416 as shown in FIG. 5, the waveguide 1006 is expected to have only horizontal polarization light components as a plurality of similar modules are connected in series, one above the other with optical paths containing horizontally polarized components properly aligned. In other embodiments, the second incoming signal through the optical pathway 1024 may include non-horizontal polarization components. The second incoming optical communications signal proceeds along pathway 1024, through the switch element 1002 and along the optical pathway 1028 to the output waveguide 1010. Such signal on pathway 1028 is expected to have the polarization component 1030 which is the same as the polarization component 1026, and which are expected to only include a component in the horizontal direction.

The switch module 1000 allows the first optical communications signal and the second optical communications signal to proceed through the switch element 1002 independently of each other, without substantially impeding or interacting with each other as the first optical communications signal proceeds along pathways 1014 and 1020, and the second optical communications signal proceeds along pathways 1024 and 1028.

The block diagram of FIG. 10 shows the pathways 1014 and 1020 at a right angle to the pathways 1024 and 1028, but as discussed above, such right angle is only for simplicity in the diagram, and the physical relationship between such pathways is preferably at an acute angle. Also, in one embodiment where the module 1000 is used as one of the modules 401 through 416 of FIG. 5, it is preferable that the first incoming optical communications signal on the waveguide 1004 only have a horizontal polarization component, in which case the components 1016 and 1022 would be only horizontal.

FIG. 11 shows the switch module 1000 in the "on" condition caused when an electric field is applied to the switch element 1002 in the horizontal direction, i.e., in the X-Y plane. The element 1002 is shown in FIG. 10 marked with small arrows to indicate that the electric field is in the plane of the page, i.e., in the horizontal or X-Y plane. A third incoming optical communications signal proceeds on the waveguide 1004 along the optical pathway 1032, and may have polarization components 1034 in both the vertical and horizontal directions. The third incoming optical communications signal proceeds along pathway 1032 to the switch element 1002, where the element 1002 contains a total internal reflection (TIR) boundary that reflects the horizontal polarization component of the third incoming optical communications signal to the waveguide 1010 along the optical pathway 1036. The third incoming optical communications signal on the pathway 1036 has a polarization component 1038 that is only in the horizontal direction. The element 1002 reflects only the horizontal component of the third incoming optical communications signal because the electric field inside the element 1002 in the "on" condition is horizontally directed, i.e., in the X-Y plane. Also, as the third incoming optical communications signal proceeds along pathway 1032 to the switch element 1002, the vertical polarization component of the third incoming optical communications signal is transmitted through the switch element 1002 to the waveguide 1008 along the optical pathway 1040. The third incoming optical communications signal on the pathway 1040 has a polarization component 1042 that is only in the vertical direction.

A fourth incoming optical communications signal may travel along the optical pathway 1044 through the waveguide 1006, and such signal is expected, if such a signal is present at all, to have an optical polarization component 1046 only including a component in the horizontal direction. The fourth incoming optical communications signal is preferably not present at all when the switch element 1002 is "on", if the module 1000 is used as a module in an array of modules 401 through 416 as shown in FIG. 5, since it is preferable that only one switch module in each column of such an array be "on" at any time. The reason that the component 1046 is expected to be only horizontal, if the fourth incoming optical communications signal is present at all, is that in some preferred embodiments wherein the module 1000 is used in an array of modules 401 through 416 as shown in FIG. 5, the waveguide 1006 is expected to have only horizontal polarization light components as a plurality of similar modules are connected in series, one above the other with optical paths containing horizontally polarized components properly aligned. In some embodiments, however, the component 1046 may comprise vertical components. The fourth incoming optical communications signal proceeds along pathway 1044, through the switch element 1002 and along the optical pathway 1048 to the output waveguide 1010. Such signal on pathway 1048 is expected to have the polarization component 1050 which is the same as the polarization component 1046, and which are expected to only include a component in the horizontal direction.

The switch module 1000 allows the third optical communications signal and the fourth optical communications signal to proceed through the switch element 1002 independently of each other, without substantially impeding or interacting with each other as the third optical communications signal proceeds along pathways 1032, 1036 and 1040, and the fourth optical communications signal proceeds along pathways 1044 and 1048. However, the pathways 1036 and 1048 are coextensive on the output waveguide 1010, and signals on such pathways 1036 and 1048 are combined together inside the electric field induced birefringent portion of the switch element 1002.

As discussed above, although the block diagrams of FIGS. 9 and 10 show the pathways 1032 and 1040 at a right angle to the pathways 1036, 1044 and 1048, such right angle is only for simplicity in the diagram, and the physical relationship between such pathways is preferably at an acute angle. Also, as discussed above, in one embodiment where the module 1000 is used as one of the modules 401 through 416 of FIG. 5, it is preferable that the third incoming optical communications signal on the waveguide 1004 only have a horizontal polarization component, in which case the components 834 would be only horizontal, and there would be no horizontal component of the third incoming optical communications signal to be present on the pathway 840.

Figure 12:
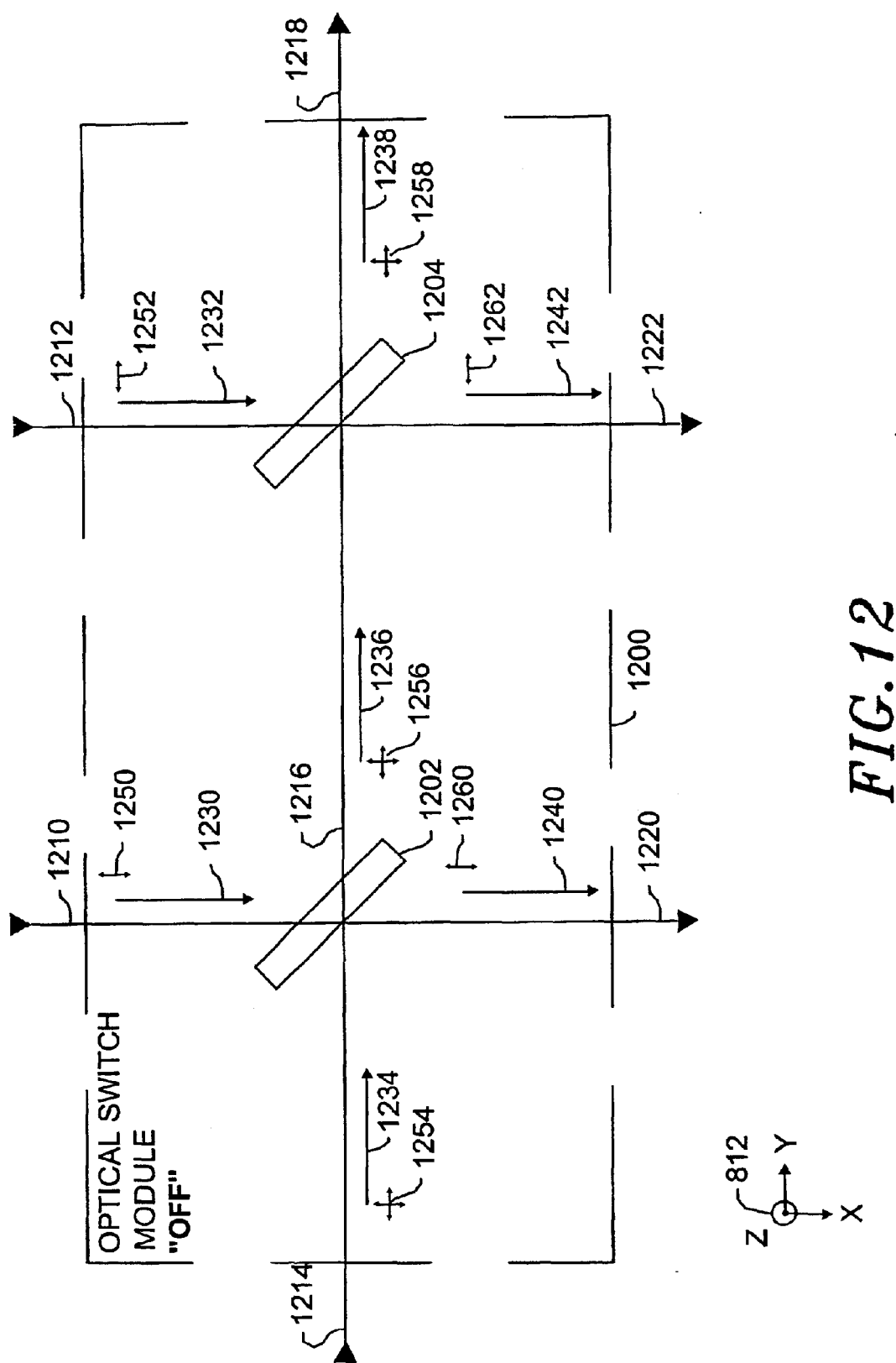
FIG. 12 is a schematic diagram of another optical switch module with two electro-optic switching elements in "off" states, wherein input optical signals are transmitted through substantially unaltered.
Figure 13:
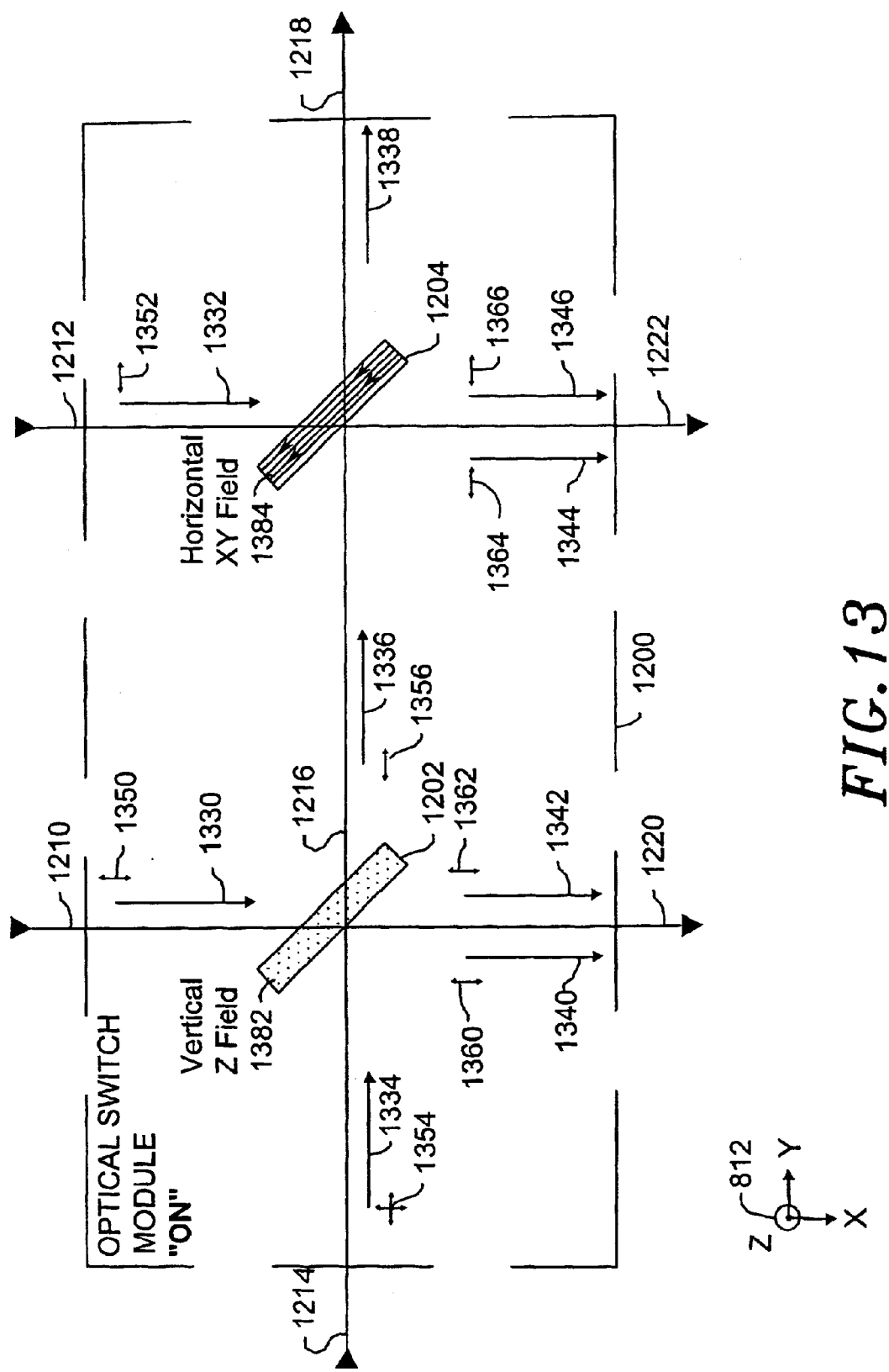
FIG. 13 is a schematic diagram of the optical switch module of FIG. 12 with two electro-optical switching elements in "on" states, wherein one electro-optic switching element has electric field directed in Z direction and the other electro-optic switching element has electric field directed in XY direction so as to switch vertical and horizontal components of an incoming optical signal.

FIGS. 12 and 13 illustrate a configuration for switching optical communications signals if such signals have a polarization state which is not fixed and/or predetermined. Such signals may be of arbitrary polarization or may have a polarization that changes over time. The optical switch module 1200 is configured to switch optical communications signals independent of the polarization of such signals by separately switching first and second orthogonal polarization components of such signals. This configuration is formed by combining the switching modules 8000 and 1000 depicted in FIGS. 8–9 and 10–11, respectively.

FIG. 12 is a block diagram of an optical switch module 1200 shown in the "off" condition. FIG. 13 is a block diagram of the same optical switch module 1200 as shown in FIG. 13, but in the "on" condition. This optical switch module 1200 comprises two switch element 1202 and 1204, input optical waveguides 1210, 1212, and 1214, and output optical waveguides 1218, 1220, and 1222. The optical switch module 1200 may be used as any of the optical switch modules 501 through 516 of FIG. 6. For example, optical switch module 1200 could be used as the optical switch module 506 of FIG. 6, in which case waveguides 1214, 1210, 1212, 1218, 1220, and 1222 correspond to the waveguides 522, 537, 553, 523, 538, and 554 of FIG. 6.

The switch elements 1202 and 1204 preferably contains an electro-optic material, which changes its optical index of refraction in response to an applied electric field. In one preferred configuration, application of an electric field across the electro-optical material induces the formation of a total internal reflection boundary. The optical switch module 1200 is shown in the "off" condition in FIG. 12 when no electric field is applied to the switch elements 1202 and 1204.

Coordinate axes 812 provide a reference for the X, Y and Z directions in FIG. 8. A first incoming optical communications signal may propagate along the optical pathway 1234 in the Y direction through the waveguide 1214, and such signal may have optical polarization components 1254 in the horizontal and vertical directions, i.e., which are parallel to the X and Z axes, respectively. As the switch is "off", the first incoming optical communications signal proceeds along pathway 1234, through the first switch element 1202 and along the optical pathway 1216 through the second switch element 1204 to the output waveguide 1218.

A second incoming optical communications signal may travel along the optical pathway 1230 in the X direction through the waveguide 1210, and such signal is expected to have an optical polarization component 1250 only including a component in the vertical direction. The reason that the component 1250 is only vertical is that in some embodiments if the module 1200 is used in an array of modules 501 through 516 as shown in FIG. 6, the waveguide 1210 is expected to have only vertical polarization light components as a plurality of similar modules are connected in series, one above the other with optical paths containing vertically polarized components properly aligned. In other embodiments, the second incoming signal through the optical pathway 1230, however, may comprise horizontal components. The second incoming optical communications signal proceeds along pathway 1230, through the switch element 1202 and along the optical pathway 1240 to the output waveguide 1220. Such signal on pathway 1240 is expected to have the polarization component 1260 which is the same as the polarization component 1250, and which are expected to only include a component in the vertical direction.

A third incoming optical communications signal may travel along the optical pathway 1232 in the X direction through the waveguide 1212, and such signal is expected to have an optical polarization component 1252 only including a component in the horizontal direction. The reason that the component 1250 is only horizontal is that in some preferred embodiments if the module 1200 is used in an array of modules 501 through 516 as shown in FIG. 6, the waveguide 1210 is expected to have only vertical polarization light components as a plurality of similar modules are connected in series, one above the other with optical paths containing vertically polarized components properly aligned. In other embodiments, the third incoming signal through the optical pathway 1232, however, may comprise vertical components. The second incoming optical communications signal proceeds along pathway 1232, through the switch element 1204 and along the optical pathway 1242 to the output waveguide 1222. Such signal on pathway 1242 is expected to have the polarization component 1262 which is the same as the polarization component 1252, and which are expected to only include a component in the horizontal direction.

The block diagram of FIG. 12 shows the pathways 1234 and 1238 at a right angle to the pathways 1230, 1232, 1240, and 1242, but such right angle is only for simplicity in the diagram, and the physical relationship between such pathways is preferably at an acute angle. If the module 1200 is used as one of the modules 501 through 516 of FIG. 6, the first incoming optical communications signal on the waveguide 1214 may comprise arbitrary polarization. Preferably, however, the second incoming optical communication signal on wavegnide 1210 comprises vertically polarized light and the third incoming optical communication signal on waveguide 1212 comprises horizontally polarized light. The inputs and their respective polarization, however, may be interchanged on other embodiments.

FIG. 13 shows the switch module 1200 in the "on" condition caused when an electric field is applied to the first switch element 1202 in the vertical (Z) direction and an electric field is applied to the second switch element 1204 in the horizontal direction (i.e., in the X-Y plane). The first switch element 1202 is shown in FIG. 13 marked with small dots to indicate that the electric field is pointing upwards out of the page, in the vertical (Z) direction. The second switch element 1202 is shown in FIG. 13 marked with small arrows to indicate that the electric field is pointing within the page, in the horizontal direction and in the in the X-Y plane. A fourth incoming optical communications signal proceeds on the waveguide 1214 along the optical pathway 1334, and may have polarization components 1354 in both the vertical and horizontal directions. The fourth incoming optical communications signal proceeds along pathway 1334 to the switch element 1202, where the element 1202 contains a total internal reflection (TIR) boundary that reflects the vertical polarization component of the fourth incoming optical communications signal to the waveguide 1214 along the optical pathway 1334. The fourth incoming optical communications signal on the pathway 1340 has a polarization component 1360 that is only in the vertical direction. In one embodiment, the first element 1202 reflects only the vertical component of the fourth incoming optical communications signal because the electric field inside the first element 1202 in the "on" condition is vertically directed, i.e., in the Z direction.

As the fourth incoming optical communications signal proceeds along pathway 1334 to the second switch element 1202, the horizontal polarization component of the fourth incoming optical communications signal is transmitted through the switch element 1202 to the second switch element 1204 along the optical pathway 1336. The switch element 1204 contains a total internal reflection (TIR) boundary that reflects the horizontal polarization component of the fourth incoming optical communications signal to the waveguide 1222 along the optical pathway 1344. The fourth incoming optical communications signal on the pathway 1344 has a polarization component 1364 that is only in the horizontal direction. In one embodiment, the second element 1204 reflects only the horizontal component of the fourth incoming optical communications signal because the electric field inside the second element 1204 in the "on" condition is horizontally directed, i.e., in the X-Y plane.

A fifth incoming optical communications signal may travel along the optical pathway 1330 through the waveguide 1210, and such signal is expected, if such a signal is present at all, to have an optical polarization component 1350 only including a component in the vertical direction. The fifth incoming optical communications signal is preferably not present at all when the first switch element 1202 is "on", in one preferred embodiment wherein the module 1200 is used as a module in an array of modules 501 through 516 as shown in FIG. 6, since it is preferable that only one switch module in each column of such an array be "on" at any time. The reason that the component 1350 is expected to be only vertical, if the fifth incoming optical communications signal is present at all, is that in some preferred embodiments wherein the module 1200 is used in an array of modules 501 through 516 as shown in FIG. 6, the waveguide 1210 is expected to have only vertical polarization light components as a plurality of similar modules are connected in series, one above the other with optical paths containing vertically polarized components properly aligned. In other embodiments, the component 1350 may comprise horizontal components. The fifth incoming optical communications signal proceeds along pathway 1330, through the first switch element 1202 and along the optical pathway 1342 to the output waveguide 1220. Such signal on pathway 1342 is expected to have the polarization component 1362 which are is same as the polarization component 1350, and which are expected to only include a component in the vertical direction.

A sixth incoming optical communications signal may travel along the optical pathway 1332 through the waveguide 1212, and such signal is expected, if such a signal is present at all, to have an optical polarization component 1352 only including a component in the horizontal direction. The sixth incoming optical communications signal is preferably not present at all when the second switch element 1204 is "on", if the module 1200 is used as a module in an array of modules 501 through 516 as shown in FIG. 6, since it is preferable that only one switch module in each column of such an array be "on" at any time. The reason that the component 1350 is expected to be only horizontal, if the fifth incoming optical communications signal is present at all, is that in some preferred embodiments wherein the module 1200 is used in an array of modules 501 through 516 as shown in FIG. 6, the waveguide 1212 is expected to have only horizontal polarization light components as a plurality of similar modules are connected in series, one above the other with optical paths containing horizontally polarized components properly aligned. In other embodiments, the polarization 1352 may comprise horizontal components. The sixth incoming optical communications signal proceeds along pathway 1332, through the second switch element 1204 and along the optical pathway 1346 to the output waveguide 1222. Such signal on pathway 1346 is expected to have the polarization component 1366 which are is same as the polarization component 1352, and which are expected to only include a component in the horizontal direction.

The block diagram of FIG. 13 shows the pathways 1334, 1336, and 1338 at a right angle to the pathways 1330, 1332, 1340, and 1344, but such right angle is only for simplicity in the diagram, and the physical relationship between such pathways is preferably at an acute angle. If the module 1200 is used as one of the modules 501 through 516 of FIG. 6, the first incoming optical communications signal on the waveguide 1214 may comprise arbitrary polarization. Preferably, however, the second incoming optical communication signal on waveguide 1210 comprises vertically polarized light and the third incoming optical communication signal on waveguide 1212 comprises horizontally polarized light. The inputs and their respective polarization, however, may be interchanged on other embodiments.

Figure 14:
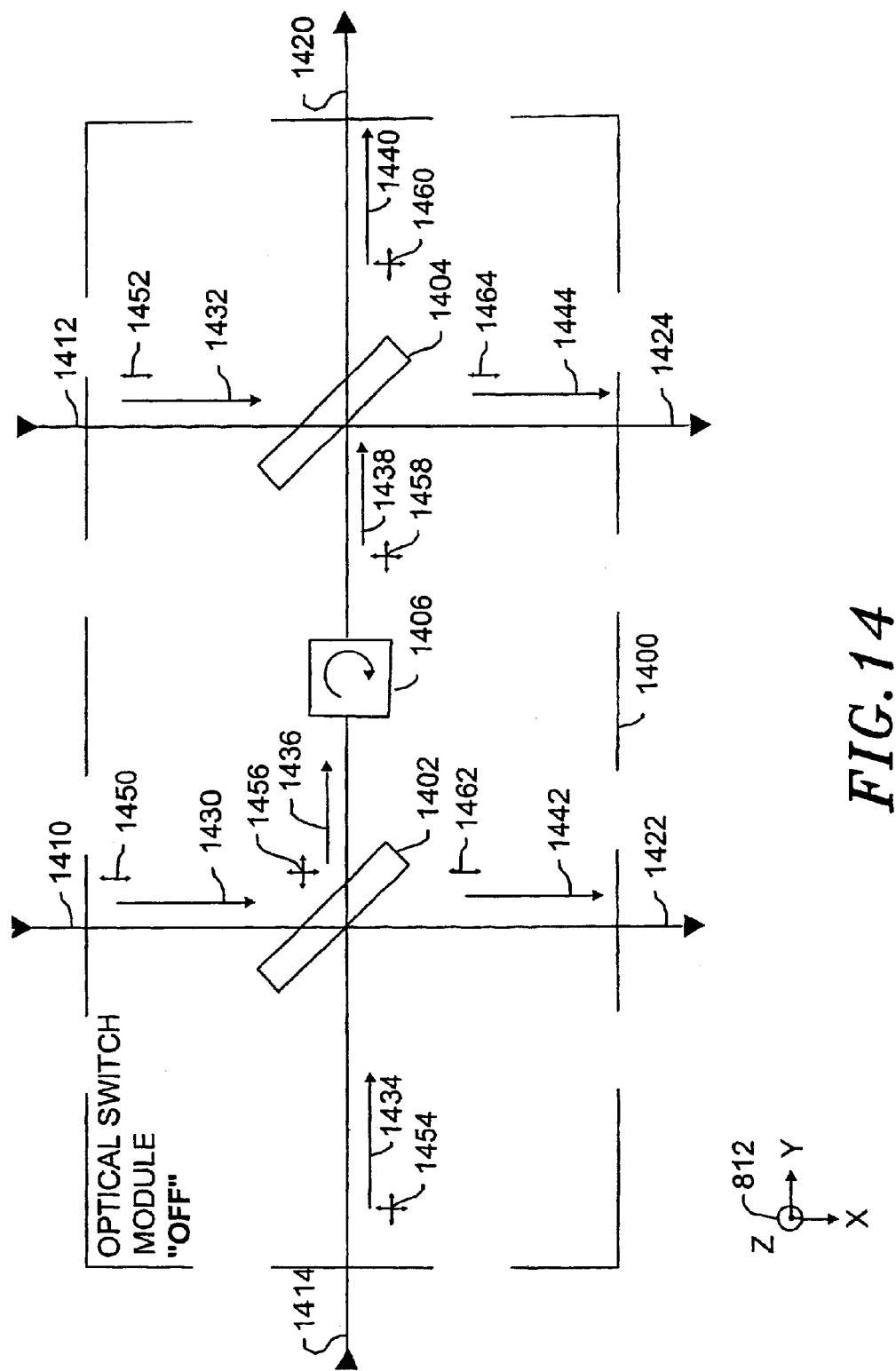
FIG. 14 is a schematic diagram of another optical switch module with two electro-optic switching elements and a polarization rotator, wherein the two electro-optic switching elements are in "off" states such that input optical signals are transmitted through substantially unaltered.
Figure 15:
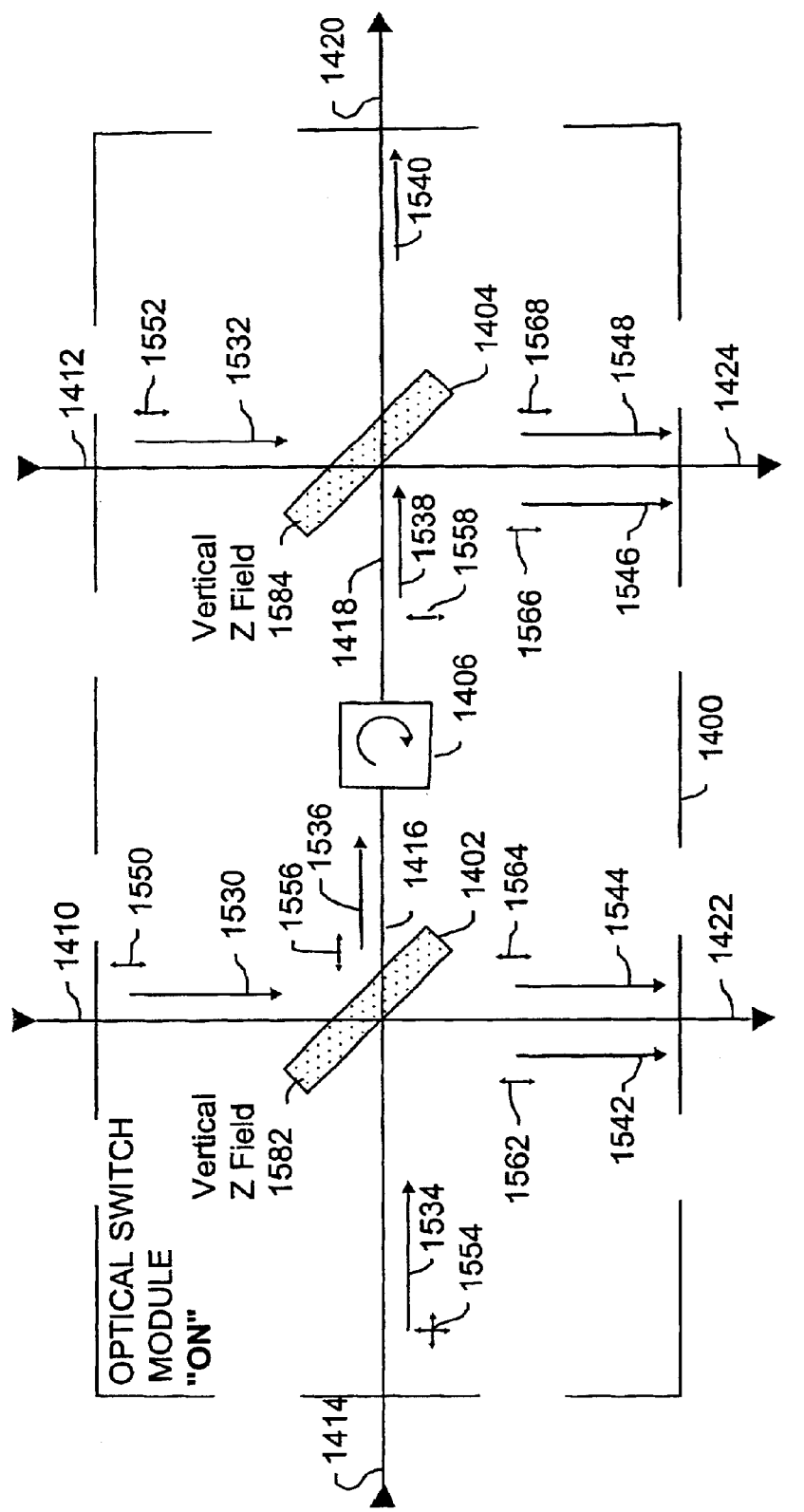
FIG. 15 is a schematic diagram of the optical switch module of FIG. 14 with the two electro-optic switching elements in "on" states, wherein both electro-optic switching elements have electric fields directed in Z-direction so as to switch so as to switch vertical and horizontal components of an incoming optical signal.

FIGS. 14 and 15 illustrate another configuration for switching incoming optical communications signals that have a polarization state which is not predetermined and/or not fixed. Such signals may be of arbitrary polarization or such signals may have a polarization that changes over time. The optical switch module 1200 is configured to switch optical communications signals independent of the polarization of such signals by separately switching first and second orthogonal polarization components of such signals. This configuration is formed by replicating the switching module 800 depicted in FIGS. 8–9, respectively and including a polarization rotator between the two modules.

FIG. 14 is a block diagram of an optical switch module 1200 shown in the "off" condition. FIG. 15 is a block diagram of the same optical switch module 1200 as shown in FIG. 14, but in the "on" condition. This optical switch module 1200 comprises two switch element 1402 and 1404, a polarization rotator 1406, input optical waveguides 1410, 1412, and 1414, and output optical waveguides 1420, 1222, and 1224. The optical switch module 1400 may be used as any of the optical switch modules 501 through 516 of FIG. 6. For example, optical switch module 1200 could be used as the optical switch module 506 of FIG. 6, in which case waveguides 1414, 1410, 1412, 1220, 1222, and 1224 correspond to the waveguides 522, 537, 553, 523, 538, and 554 of FIG. 6.

The switch elements 1402 and 1404 preferably contains an electro-optic material, which changes its optical index of refraction in response to an applied electric field. In one preferred configuration, application of an electric field across the electro-optical material induces the formation of a total internal reflection boundary. The optical switch module 1200 is shown in the "off" condition in FIG. 12 when no electric field is applied to the switch elements 1202 and 1204.

The polarization rotator 1406 preferably rotates the polarization about 90° thereby converting an incoming polarization into an orthogonal polarization state. Accordingly, horizontal polarization components are converted into vertical polarization components and vice versa. The polarization rotator 1406 may comprise a half wave plate to rotate the linear polarization states by about 90°. Similarly, the polarization rotator 1406 may comprise a length of PLZT, which upon application of an appropriately directed electric field, is birefringent. Consequently, when properly oriented, orthogonal polarization states propagate through the PLZT at different phase velocities. A half wave phase shift (or integral multiples thereof) can thereby be produced with application of the appropriate electric field for a given length of material. This polarization rotator 1406 may comprise a free space or waveguide device.

A first incoming optical communications signal may propagate along the optical pathway 1434 in the Y direction through the waveguide 1414, and such signal may have optical polarization components 1254 in the horizontal and vertical directions, i.e., which are parallel to the X and Z axes, respectively. As the switch is "off", the first incoming optical communications signal proceeds along pathway 1434, through the first switch element 1402 and along the optical pathway 1436 through a polarization rotator 1406 then through the second switch element 1404 to the output waveguide 1418. The polarization rotator 1406 rotates the polarization by 90°. The horizontal polarization components become vertically directed and the vertical polarization components become horizontally directed. However, if the first incoming optical communications signal input to waveguide 1414 comprise both vertical and horizontal polarization components, this signal when output from waveguide 1420 will comprise both horizontal and vertical polarization components as well.

A second incoming optical communications signal may travel along the optical pathway 1430 in the X direction through the waveguide 1410, and such signal is expected to have an optical polarization component 1450 only including a component in the vertical direction. The reason that the component 1450 is only vertical is that in some embodiments wherein the module 1400 is used in an array of modules 501 through 516 as shown in FIG. 6, the waveguide 1410 is expected to have only vertical polarization light components as a plurality of similar modules are connected in series, one above the other with optical paths containing vertically polarized components properly aligned. In other embodiments, however, the second incoming signal through the optical pathway 1430, however, may comprise horizontal components. The second incoming optical communications signal proceeds along pathway 1430, through the first switch element 1402 and along the optical pathway 1442 to the output waveguide 1422. Such signal on pathway 1442 is expected to have the polarization component 1462 which is the same as the polarization component 1450, and which are expected to only include a component in the vertical direction.

A third incoming optical communications signal may travel along the optical pathway 1432 in the X direction through the waveguide 1412, and such signal is expected to have an optical polarization component 1452 only including a component also in the vertical horizontal direction. The reason that the component 1450 is only vertical is that in some embodiments wherein the module 1400 is used in an array of modules 501 through 516 as shown in FIG. 6, the waveguide 1410 is expected to have only vertical polarization light components, as a plurality of similar modules are connected in series, one above the other with optical paths containing vertically polarized components properly aligned. In other embodiments, however, the third incoming signal through the optical pathway 1432 may comprise horizontal components. The second incoming optical communications signal proceeds along pathway 1432, through the second switch element 1404 and along the optical pathway 1444 to the output waveguide 1424. Such signal on pathway 1444 is expected to have the polarization component 1464 which is the same as the polarization component 1452, and which are expected to only include a component in the vertical direction.

FIG. 15 shows the switch module 1400 in the "on" condition caused when an electric field is applied to the first and second switch elements 1402 and 1404 in the vertical (Z) direction. The switch elements 1402 and 1404 are shown in FIG. 15 marked with small dots to indicate that the electric field is pointing upwards out of the page or downwards into the page.

A fourth incoming optical communications signal proceeds on the waveguide 1414 along the optical pathway 1534, and may have polarization components 1554 in both the vertical and horizontal directions. The fourth incoming optical communications signal proceeds along pathway 1534 to the switch element 1402, where the element 1402 contains a total internal reflection (TIR) boundary that reflects the vertical polarization component of the fourth incoming optical communications signal to the waveguide 1422 along the optical pathway 1542. The fourth incoming optical communications signal on the pathway 1542 has a polarization component 1562 that is only in the vertical direction. In one embodiment, the first element 1402 reflects only the vertical component of the fourth incoming optical communications signal because the electric field inside the first element 1402 in the "on" condition is vertical, in the Z direction.

As the fourth incoming optical communications signal proceeds along pathway 1534 to the first switch element 1402, the horizontal polarization component of the fourth incoming optical communications signal is transmitted through the switch element 1402 to polarization rotator which rotates the polarization component about 90° converting it into a vertically polarized light. This vertically polarized light propagates along the optical path 1536 to the switch element 1402. The switch element 1404 contains a total internal reflection (TIR) boundary that reflects the remaining vertical polarized light to the waveguide 1424 along the optical pathway 1546. The remaining portion of the fourth incoming optical communications signal on the pathway 1546 has a polarization component 1566 that is polarized only in the vertical direction. In one embodiment, the second element 1404 reflects only vertically polarized portion of the fourth incoming optical communication signal because the electric field inside the second element 1404 in the "on" condition is horizontal, in the X-Y plane.

A fifth incoming optical communications signal may travel along the optical pathway 1530 through the waveguide 1410, and such signal is expected, if such a signal is present at all, to have an optical polarization component 1550 only including a component in the vertical direction. The fifth incoming optical communications signal is preferably not present at all when the first switch element 1402 is "on", if the module 1400 is used as a module in an array of modules 501 through 516 as shown in FIG. 6, since it is preferable that only one switch module in each column of such an array be "on" at any time. The reason that the component 1550 is expected to be only vertical, if the fifth incoming optical communications signal is present at all, is that in some embodiments wherein the module 1400 is used in an array of modules 501 through 516 as shown in FIG. 6, the waveguide 1410 is expected to be aligned with and connected to another waveguides that transports only vertical polarization light components. In other embodiments, the component 1550 may comprise horizontal components. The fifth incoming optical communications signal proceeds along pathway 1530, through the first switch element 1402 and along the optical pathway 1544 to the output waveguide 1422. Such signal on pathway 1544 is expected to have the polarization component 1564 which are is same as the polarization component 1550, and which are expected to only include a polarization component in the vertical direction.

A sixth incoming optical communications signal may travel along the optical pathway 1532 through the waveguide 1412, and such signal is expected, if such a signal is present at all, to have an optical polarization component 1552 only including a component in the vertical direction. The sixth incoming optical communications signal is preferably not present at all when the second switch element 1404 is "on", if the module 1400 is used as a module in an array of modules 501 through 516 as shown in FIG. 6, since it is preferable that only one switch module in each column of such an array be "on" at any time. The reason that the component 1552 is expected to be only horizontal, if the sixth incoming optical communications signal is present at all, is that in some preferred embodiments if the module 1400 is used in an array of modules 501 through 516 such as shown in FIG. 6, the waveguide 1412 is aligned with optical paths containing only vertical polarization light components as a plurality of similar modules are connected in series, one above the other with optical paths containing vertically polarized components properly aligned. In other embodiments, the polarization 1552 may comprise horizontal components. The sixth incoming optical communications signal proceeds along pathway 1532, through the second switch element 1404 and along the optical pathway 1548 to the output waveguide 1424. Such signal on pathway 1548 is expected to have the polarization component 1568 which is same as the polarization component 1552, and which are expected to only include a component in the vertical direction.

The block diagram of FIGS. 14 and 15 shows the pathways such as input pathways at a right angle to other pathways, such as output pathways, but such right angle is only for simplicity in the diagram, and the physical relationship between such pathways is preferably at an acute angle. Also, although the electric field in FIG. 15 is applied in the vertical directions in the switches 1402 and 1404, in other embodiments, the switches may be configured such that an electric field applied in the horizontal direction activates the electro-optic material and creates a total internal reflection boundary. Such switches may be employed reflect horizontally polarized light by total internal reflection.

If the module 1400 is used as one of the modules 501 through 516 of FIG. 6, the first and fourth incoming optical communications signal on the waveguide 1214 may comprise arbitrary polarization. Preferably, however, the second, third, fifth and sixth incoming optical communication signal comprises vertically polarized light. These incoming optical signals may however, comprise horizontally polarized light in other embodiments such as for example when the electric field applied to the optical switch elements is horizontally directed.

Figure 16:
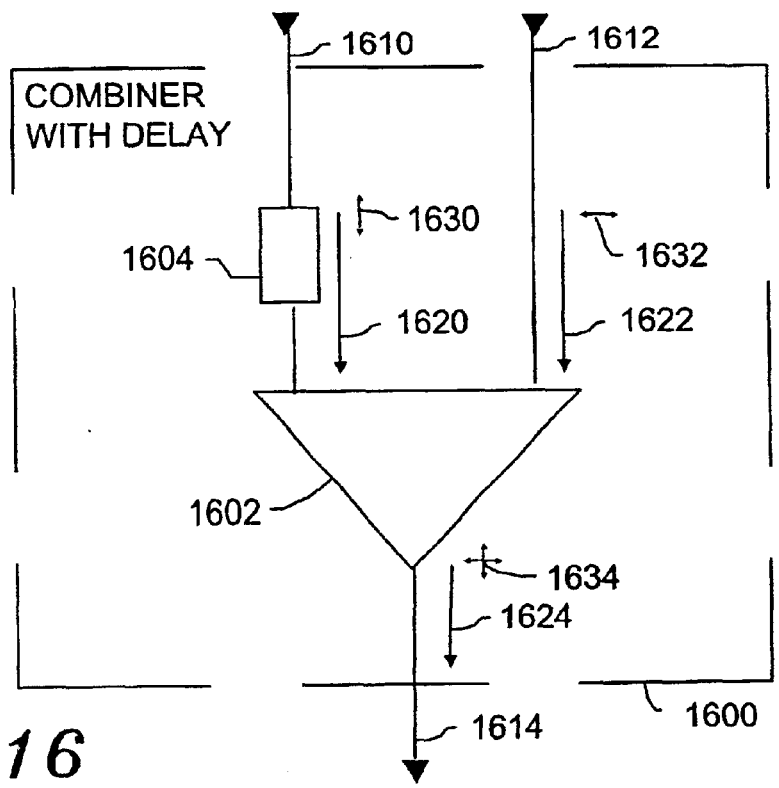
FIG. 16 is a schematic diagram of a combiner with a delay on one input such that two orthogonally polarized optical signals can be combined and the phase difference between the tow orthogonally polarized components can be adjusted as desired.
Figure 17:
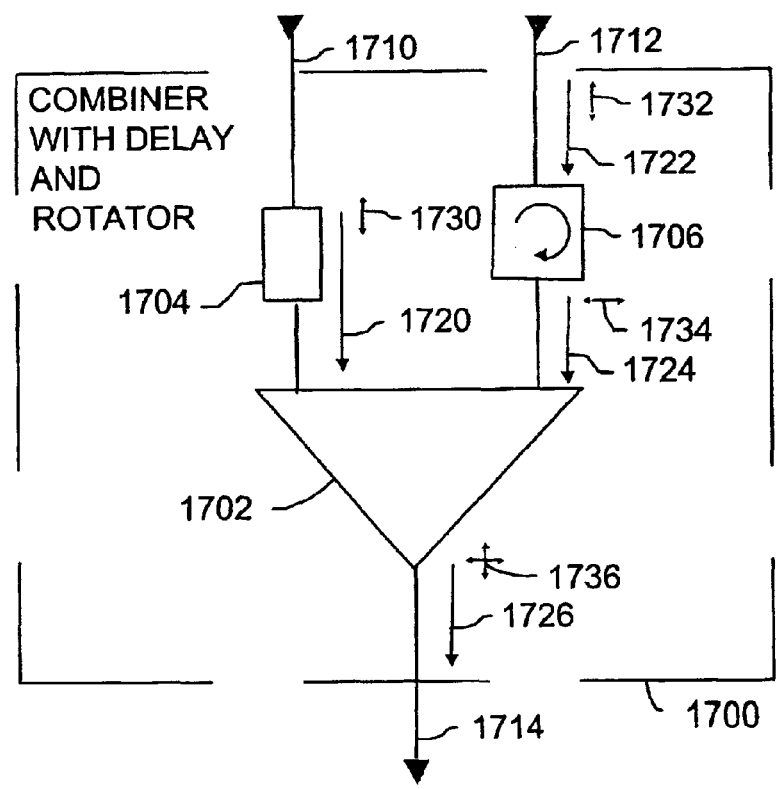
FIG. 17 is a schematic diagram of another combiner with a delay on one input and a rotator on another input such that two input optical signals with parallel polarization combine to yield a optical signal comprising both vertical and horizontally polarized components.

FIGS. 16 and 17 depict beam combiners such as may be employed as optical combiners 589, 590, 591 and 592 in the cross connect component of FIG. 6. A combiner with a delay is depicted in FIG. 16 while a combiner with a delay and polarization rotator is shown in FIG. 17. These combiners are useful for combining together two separate optical signals, which may contain different, possibly orthogonal, polarization states. The combiners both introduce phase delay in an effort to substantially reduce phase differences between the two optical signals.

In FIG. 16, a combiner 1600 comprises two input waveguides 1610 and 1612, which come together within a combining element 1602. An output waveguide 1614 extends from the combining element 1602 and serve as the output of the device. The combiner 1600 further includes a delay element 1604, which preferably comprises an active element that can introduce variable amounts of phase delay. This element may, for example, comprise electro-optically active material such as electro-optically active PLZT having an index of refraction, which varies with application of an appropriately oriented electric field. By altering the voltage applied to the element, the phase velocities, and consequently the phase of the optical signal passing therethrough, can be adjusted. Alternatively, this delay element 1604 may comprise a passive element that introduces a fixed phase delay depending on its length and index of refraction which define its optical path length and the associated phase delay. This polarization rotator may for example be a delay line comprising a waveguide or free space region.

A first and second optical signal input may be input into the first and second waveguides 1610 and 1612, respectively. The two optical signals may comprise orthogonal polarization components such as a vertical polarization component 1630 and a horizontal polarization component 1632, input into the first and second waveguides 1610 and 1612, respectively. The first optical signal propagates along a path 1620 within the first waveguide 1610 and second optical signal propagates along a path 1622 within the second waveguide 1612 toward the optical combining element 1602 where the two paths merge into one optical path 1624 within the output waveguide 1614. In this manner, the two optical signals are combined into a single output optical signal. This output signal has a polarization 1634 comprising the respective polarization states 1630 and 1632 of the first and second optical signals input into the combiner 1602. Accordingly, in this case, the output signal contains both horizontal and vertical polarization components.

The first optical signal may be delayed with respect to the second optical signal to substantially match the phases of the two optical signals in the combining element 1602. The delay element 1604 may introduce this delay.

The phase delay element may be included on either or both input waveguides 1610 and 1612. Similarly, the horizontally polarized component can be input into the first waveguide 1610 and the vertically polarized component can be input into the second waveguide 1612 or alternately any other polarization state can be input into the two input waveguides. Preferably, however, the polarization states comprise orthogonal, horizontal and vertical, polarization states.

FIG. 17 also depicts a combiner 1700 comprising two input waveguides 1710 and 1712 which come together within a combining element 1702. In similar fashion as the comber 1600 described above, an output waveguide 1714 extends from the combining element 1702 and serves as the output of the device. The combiner 1700 includes a delay element 1604, which preferably comprises an active element which can introduce variable amounts of phase delay. Alternatively, this delay element 1604 may comprise a passive element that introduces a fixed phase delay depending on its length and index of refraction which define its optical path length and the associated phase delay.

The combiner 1700 further includes a polarization rotator 1706 which preferably rotates an input polarization approximately 90°. Such a device 1706 rotates linearly polarized light about 90° and may convert horizontally polarization light into vertically polarized light and vice versa. This rotator 1706 may comprise a half-wave plate or an optical element which introduces a half wave ($\pi$ radian or 180°) relative phase shift between orthogonal horizontal and vertical polarization components to rotate the polarization by about 90°. In one preferred embodiment, this polarization rotator 1706 is an active element comprising electro-optically active material having an index of refraction that can be varied. This element, may for example, comprise electo-optically active PLZT. The polarization rotator 1706 may be a waveguide or comprise a non-waveguide or free space optical device.

A first and second optical signal input may be input into the first and second waveguides 1710 and 1712, respectively. The two optical signals may comprise substantially identical polarization components such as vertical polarization components 1730 and 1732 input into the first and second waveguides 1710 and 1712, respectively. The first optical signal propagates along a path 1720 within the first waveguide 1710 and second optical signal propagates along a path 1722 within the second waveguide 1712 toward the optical combining element 1702 where the two path merge into one optical path 1726 within the output waveguide 1714. In this manner, the two optical signals are combined into a single output optical signal. The second optical signal propagates through the polarization rotator 1706 which converts the vertical polarization component 1732 into the orthogonal, i.e., horizontal, polarization state 1734. This horizontally polarized signal propagates along the path 1724 into the combining element where it is combined with the first optical signal having a vertical polarization component. The output signal has a polarization 1736 comprising the respective polarization states 1730 and 1734 of the first and second optical signals input into the combiner 1700. Accordingly, in this case, the output signal contains both horizontal and vertical polarization components.

As shown, the combiner may also include a phase delay element 1704 to provide the appropriate phase difference between the two optical signals input into the combining element 1702. The phase delay element 1704 and the polarization rotator 1706 may be include on either or both input waveguides 1710 and 1712. Similarly, the horizontally polarized component can be input into the both input waveguides 1710 and 1712 or alternately any other polarization state can be input into the two input waveguides. Preferably, however, the polarization states comprise substantially identical, horizontal or vertical, polarization states.

Figure 20:
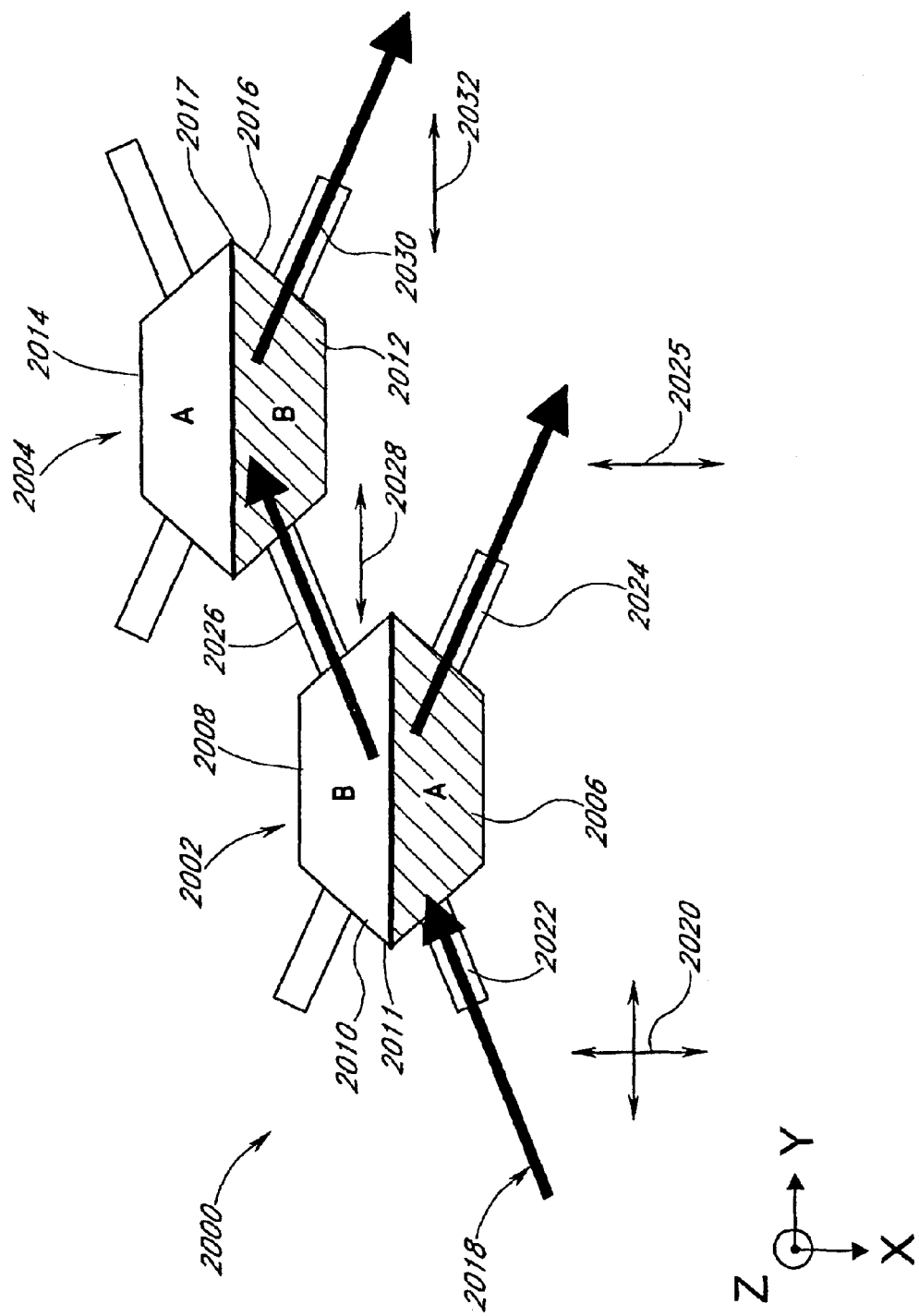
FIG. 20 depicts one preferred embodiment of a switching module comprising two switching element which together provide switching for an optical signal comprising orthogonal (vertical and horizontal) polarization components.

As describe above, the switching function can by implemented using total internal reflection switches comprising an electro-optically active material having an index of refraction that is reduced for one polarization component, and that increases for an orthogonal polarization component. A polarization independent switch 2000 can thus be created by combining two TIR switching elements, a first 2002 and a second 2004 as shown in FIG. 20.

The first switching element 2002 contains a first portion 2006 having a first refractive index and a second portion 2008 comprising a second variable refractive index. Preferably, this second portion 2008 comprises electro-optically active material and is disposed between a pair of electrodes 2010, for example, above and below the second portion 2008. One such electrode 2010, the top electrode, is visible in this top view of this first switch 2002. The first portion 2006 preferably comprising a material that is not electro-optically active or is otherwise configured such that its index of refraction does not vary. The first and second portion 2006 and 2008 are separated by a boundary 2011 therebetween.

The second switching element 2004 also contains a third portion 2012 having a third variable refractive index and a fourth portion 2014 having a fourth refractive index. Preferably, this third portion 2012 comprises electro-optically active material and is disposed between a pair of electrodes 2016, for example, above and below the second portion 2012. One such electrode 2016, the top electrode, is visible in this top view of this second switch 2004. The fourth portion preferably comprising a material that is not electro-optically active or is otherwise configured such that its index of refraction does not vary. The first and second portion 2012 and 2014 are separated by a boundary 2017 therebetween.

With electrodes 2010 and 2016 on top and bottom, an electric field can be produced in the vertical direction, i.e. into or out of the page, upon application of a voltage. This electric field will cause the index of the electro-optically active material comprising the second and third portions 2008 and 2012 to be altered with respect to index within the first and fourth portions 2006 and 2014. In one embodiment, such as when electro-optically active PLZT is employed as a variable refractive index material, the refractive index of the electro-optically active material is lowered for light having a polarization parallel to the applied electric field. In contrast, for this same material, the refractive index is higher for light having a perpendicular polarization.

FIG. 20 shows an optical signal 2018 having a polarization state 2020 comprising vertical and horizontal polarization components input into a first input waveguide 2022 connected to the first portion 2006 of the first switching element 2002. This optical signal 2018 enters the first portion 2006 having a fixed index and travels to the boundary 2011 of the second portion 2008 of the first switching element 2002. When the polarization independent switching module 2000 is "on" and a voltage is applied to the electrodes, for the vertically polarized component, the index of refraction of the second portion 2008 is lower than that of the first portion. Preferably, the index of refraction of the first portion 2006 is sufficiently higher than that of the second portion 2008 when the field is applied so that the vertically polarized light undergoes total internal reflection at the boundary 2011. This vertical component is coupled into an output waveguide 2024 attached to the first portion 2008. The polarization state 2023 of the optical output of this waveguide 2024 is thus linear and vertical.

In contrast, for the horizontally polarized component, the index of refraction of the second portion 2008 is higher than that of the first portion 2006. The horizontally polarized component is, thus, substantially entirely transmitted through the boundary 2011 into the second portion 2008 and exits the first optical switching element 2002 through optical waveguide 2026. This waveguide 2026 is connected to the third portion 2012 of the second switching element 2004. A portion of the optical signal having a polarization state 2028 comprising the horizontal component is directed into the second switch 2004. This horizontally polarized optical signal propagates through the third portion 2012 and is incident on the boundary 2017 formed with the fourth portion 2014 of the switching element 2004.

With the switching module 2000 "on" and a voltage is applied to the electrodes 2016 of the second switching element 2004, an electric field is induced therebetween. The index of refraction of the electro-optically active material in the third portion 2012 is thereby raised for the horizontal polarization component which is orthogonal to the electric field. Preferably, the refractive index in the third portion 2012 is increased sufficiently above the refractive index of the fourth portion 2014 to cause the horizontally polarized light incident thereon to exceed the critical angle and be totally internally reflected. An output waveguide 2030 is attached to the second optical switching element 2004 to receive horizontal component reflected from the boundary 2017. This waveguide outputs an optical signal having a polarization state 2030 that is linear and horizontal.

This switching module 2000 is termed polarization independent because both the vertical and horizontal polarization components are switched when the module is in one state. Thus, any given arbitrary polarization, which can be separated into orthogonal vertical and horizontal linear polarization components, can be switched using this module.

Figure 21:
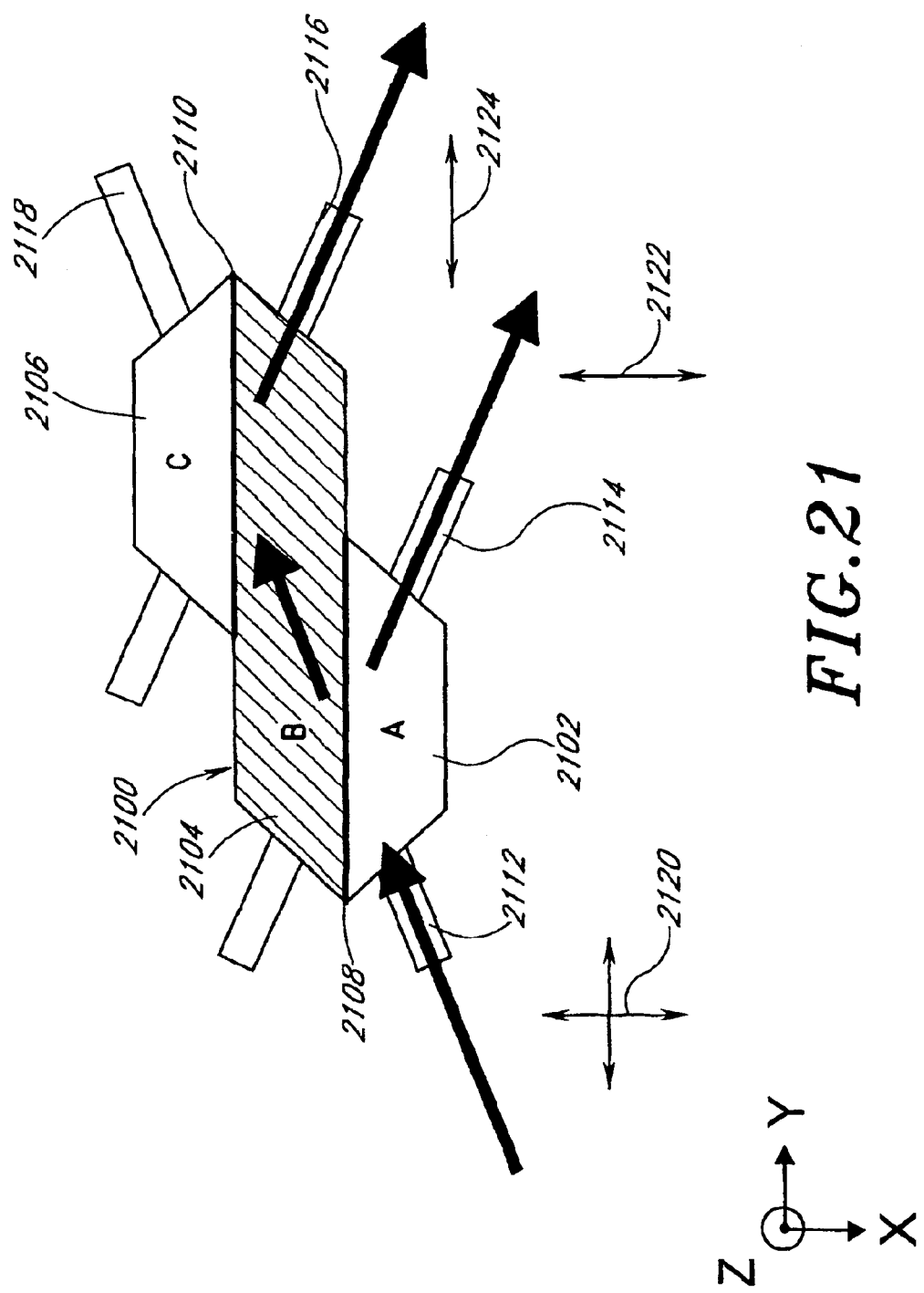
FIG. 21 depicts one preferred embodiment of a switching module comprising three portions separated by two total internal reflection boundaries for switching orthogonal (vertical and horizontal) polarization components.

The functionality of this polarization independent switch 2000 can be implemented in a somewhat simpler design as shown in FIG. 21. In this configuration, the waveguide 2026 separating the first and second switching elements 2002 and 2004 is removed. The optical switching module 2100 comprises a first, second, and third portion, 2102, 2104, 2106 with first, second, and third refractive indices, respectively. A first boundaries, 2108 separates the first and second portions 2102, 2104 and a second boundary 2110 separates the second and third portions 2102, 2106. Preferably, the first and third portions 2102 and 2106 have a fixed index of refraction while the second portion 2104 has an index of refraction that can be varied. The second portion 2104 preferably comprises electro-optically active material and includes electrodes on top and bottom for generating an electric field therein and altering the refractive index. In one preferred embodiment, this electro-optic material has an index of refraction that is reduced for light polarized parallel to the electric field and increases for light polarized perpendicular. The optical switching module 2100 includes an input port 2112 and three output ports 2114, 2116, and 2118. In one preferred embodiment, these ports may comprise waveguides while the first, second, and third portions 2102, 2104, and 2106 preferably correspond to free space regions where the light propagates unguided therein.

An incoming optical signal, entering the input port 2112 may have a polarization state 2120 that includes both vertical and horizontal polarization components. This optical signal propagates through the input port 2112 into the first portion 2102. When the switching module is "on" a voltage is applied to the electrodes and an electric field extends therebetween. This electric field is oriented vertically, into or out of the plane of the paper, i.e., in the Z direction. Accordingly, the index of refraction of the electro-optically active material within the second portion 2104 is reduced for light vertically polarized. Preferably, this index is sufficiently reduced cause vertical component of the incoming optical signal to be beyond the critical angle and to undergo total internal reflection. This portion of the input optical signal is thus reflected off the first boundary 2108 and exits the first portion 2102 through the first output port 2114. The light emanating from this output port 2114 has a polarization state 2122 that is vertical.

In contrast, for the portion 2102 of the incoming optical signal that is horizontally polarized, the index of refraction of the second region 2104 is increased higher than that of the first region 2102. This horizontal component, therefore, propagates through the boundary and into the second portion 2104 of the switch 2100. In additiona, with the application of the electric field and the increase of the index of the second portion 2104, the second index of refraction of the second region 2104 is higher than that of the third region 2106. Preferably, this index of refraction is increased sufficiently with respect to the third portion 2106 that a total internal reflection boundary 2110 may be created between the second and third portion 2104, 2106 of the switch 2100. The horizontal component is incident on this boundary 2120 between the second and third portion 2104, 2106 at an angle exceeding the critical angle and is totally internally reflected. This reflected light is directed through the second output port 2114. The polarization state 2124 of the light exiting this waveguide 2114 is therefore horizontal. The incoming optical signal, containing both vertical and horizontal components is switched, with separate vertical and horizontal components being output from the two waveguides 2114 and 2116. When the switch 2100 is in the "off" mode, the incoming optical signal will propagate through all three portions 2102, 2104, and 2108 exiting the switch through the output waveguide 2118.

In an alternate design, a device for switching an arbitrary polarization comprising orthogonal vertical and horizontal polarization components can be implemented by providing two switching elements each comprising electro-optically active material. In one switching element, an electric field is applied in the vertical direction through the electro-optically active material whereas in the other switching element the electric field is directed horizontally through the electro-optically active material. As discussed above, for certain electro-optically active materials, such as electro-optically active PLZT, the index of refraction is reduced for light polarized parallel to the applied electric field whereas the index of refraction is increased for light polarized perpendicular to the electric field. By applying both vertical and horizontally directed electric fields through PLZT, horizontal and vertical polarizations can be separately reflected in the two switching elements.

Figure 22:
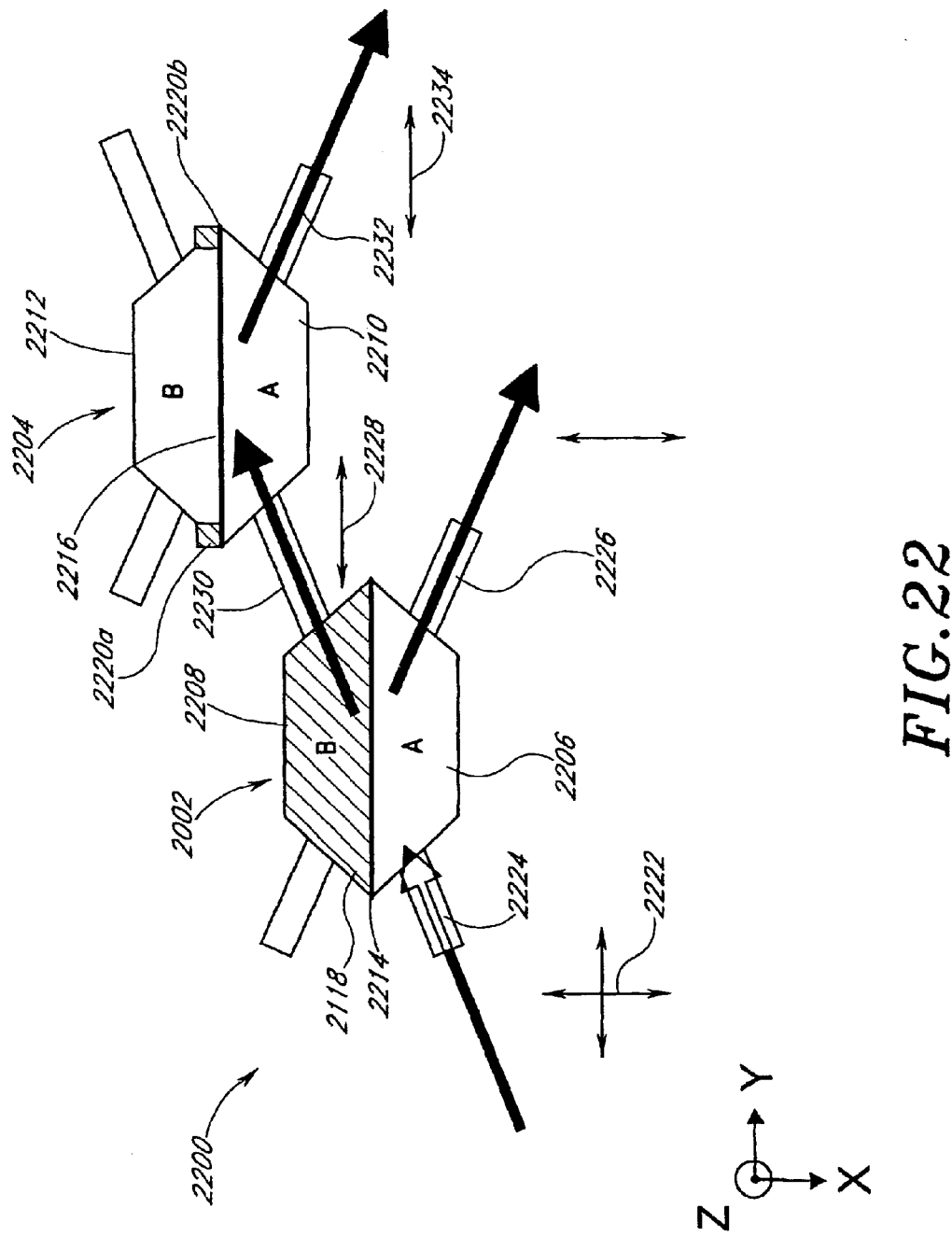
FIG. 22 depicts one preferred embodiment of a switching module comprising two switching elements having electrodes for producing orthogonally directed electric fields to enable switching of vertical and horizontal polarization components.

As shown in FIG. 22, a polarization module 2200 may comprise two optical switching elements 2202 and 2204. The first switching element 2202 comprises first and second regions 2206 and 2208 and the second switching element 2202 comprises third and fourth regions 2210 and 2212. Preferably, the index of refraction of the respective second regions 2206 of the first switching element 2202 and the fourth region 2212 in the second switching element 2204 comprise material having an index of refraction that is variable. More preferably, this these regions comprises electro-optically active material, such as for example PLZT. As shown, the two regions 2206, 2208 and 2210, 2212 of each switching element 2202 and 2204 are separated by respective first and second boundaries 2214 and 2216 therebetween.

A pair of electrodes 2218 are space apart in the Z direction and located above and below the second region 2208 of the first switching element 2202. These electrodes 2218 produce an electric field vertically directed, i.e., out of or into the plane of the paper. Only the top electrode 2218 is visible in the top view shown in FIG. 22. A pair of electrodes 2220$a$ and 2220$b$ are spaced apart from each other in the Y direction and laterally disposed on opposite sides of the second region 2212 of the second switching element 2204 sandwiching the second region 2212 therebetween. These electrodes are oriented to produce a horizontally directed electric field that is within the plane of the paper, along the Y direction. The electrodes 2220$a$ and 2220$b$ are juxtaposed adjacent to and contact sidewalls on the second region 2212 of the switching element 2204, although such contact is not required. As shown in FIG. 22, these electrode comprise strips of conductive material such as metal or other conductors, however, these electrodes may take other shapes. Preferably, the electrodes have respective surfaces facing each other and the second region 2212 therebetween. This surface may be orthogonal to the boundary 2216 separating the first and second regions 2210 and 2212.

An incoming optical signal can be coupled into the first switching element 2202 through an input waveguide 2224 extending from the first portion 2206 of the first switching element 2202. This incoming optical signal may comprise an arbitrary polarization 2222, which can be separated into vertical and horizontal polarization components. In one embodiment, the application of a voltage across the electrodes 2118 above and below the first switching element 2202 causes the index of refraction of the second region 2208 to decrease for vertical polarization components, i.e., polarizations parallel to the vertically oriented electric field. In contrast, the index of refraction of the second region 2208 increases for horizontal polarization components, i.e., those perpendicular to the vertically directed electric field. For the vertical polarization component, the index of refraction of the first region 2206 of the first switch 2202 is preferably sufficiently higher than the index of refraction of the second portion 2208, and the incoming beam is incident on the boundary 2214 within a range of angles such that the vertical polarization component undergoes total internal reflection. The vertical polarization can thereby be reflected from the boundary 2214 of the first switching element 2202 and output from the optic switching module 2200 through output a first output waveguide 2226. For the horizontal polarization component, however, the index of refraction is higher in the second portion 2208. Light having a horizontal polarization state 2228 therefore does not undergo total internal reflection. Instead, this light propagates through a waveguide 2230 connecting the first and second switching elements 2202 and 2204 and into the second switching element 2204. This horizontal polarization component 2228 propagates through the third region 2210 in the second switching element 2204 and is incident on the boundary 2216 separating the third and fourth regions 2210 and 2212. With a voltage applied to the laterally disposed electrodes 2220$a$ and 220$b$ in the second switching element 2204, a horizontal electric field is induced which passes through the fourth portion 2212. This electric field is parallel to the boundary 2216 and aligned with the Y direction. This horizontally directed electric field lowers the refractive index of the electro-optically active material in the fourth section 2212 for the horizontally polarized light, as the horizontal polarization is parallel to the applied electric field. Preferably, the refractive index of the third portion 2210 is sufficiently higher than that of the fourth portion 2212 so as to induce total internal reflection at the interface 2216 between the third and fourth regions 2210 and 2212. The horizontal component 2228 can thereby be reflected within the second switching element 2204 and exits therefrom via an exit waveguide 2232. The reflected output from the second switching element 2204 has a polarization state 2234 corresponding to the horizontal polarization.

This switching module 2200, therefore, comprises two switching elements for switching orthogonal polarizations by applying orthogonally directed electric fields through electro-optically active portions of the respective switching elements. In the first optical switching element 2202 the electrodes 2118 are on top and bottom, above and below the incoming and outgoing optical beams and the plane of incidence they define. In this case, the plane of incidence is the X-Y plane, the plane of the paper. In this embodiment, the electric field in the first switching element 2202 is orthogonal to and passes through this plane of incidence. In the second optical switching element 2204, the electrodes 2220$a$ and 2220$b$ are on opposite sides of the fourth portion 2212, and are orthogonal to and pass through the plane of incidence. The electric field induced therebetween is parallel to the plane of incidence. This plane of incidence roughly corresponds to the plane defined by the input and output waveguides 2224, 2226, 2230, and 2234.

Arrays of switches like the first and second switching elements 2202, 2204 can be assembled along one or more planes with waveguides used to provide optical connection between the switching elements. In other embodiments, the switches can be separated by free space with light propagating through free-space regions from one switch to another switch. Lens such as collimating lenses may be employed in these embodiments to provide collimation of the beams. Such switching array configurations are disclosed in U.S. Pat. No. 6,381,060, entitled "Total Internal Reflection Light Modulating Microstructure Devices" filed on Nov. 5, 1999 and issued to Romanovsky on Apr. 30, 2002, which is incorporated herein by reference in its entirety.

As disclosed in U.S. Pat. No. 6,310,712, issued Oct. 30, 2001, U.S. Pat. No. 6,381,060, issued Apr. 30, 2002, as well as U.S. patent application Ser. No. 10/013336, filed on Nov. 5, 2001, published as U.S. Publication No. 2002-0181067 on Dec. 5, 2002, and shown in FIG. 23, the thickness of different sections of the switch are different so as to provide a sharper total internal reflection boundary in a 2300 switch. The optical switch 2300 in FIG. 23 includes a first section 2302, comprising electro-optically active material. An electrode 2304 is located on top of this first electro-optically active section 2302 and a ground plane substrate 2306 is beneath. The electrode 2304 and the ground plane 2306 allow application of an electric field through electro-optic material. A second section 2308 corresponds to a region where the index of refraction is not to be altered by the applied electric field in the first section 2302. The thickness of this second section 2308 is therefore reduced. The regions 2310 above and below the second section 2308 comprise air, vacuum, or dielectric material, preferably low-dielectric material. The reduced thickness allows for air, vacuum, or dielectric material to attenuate the electric field strength within the second section 2308. Accordingly, fringe fields emanating from the electrode 2304 and the portion of the ground plane 2306 associated with the first section 2302 which would otherwise extend into the second section 2308 can be minimized. Such fringe fields could possibly alter the index of refraction in the second section 2308 and create a more gradual index of refraction transition from the first section 2302 to the second section 2308. By reducing the thickness of the second section 2308, and including possibly a dielectric material above an below the second portion 2308, the fringe field can be reduced and a sharper total internal reflection boundary 2312 can be provided between the first and second sections 2302, 2308.

Figure 23:
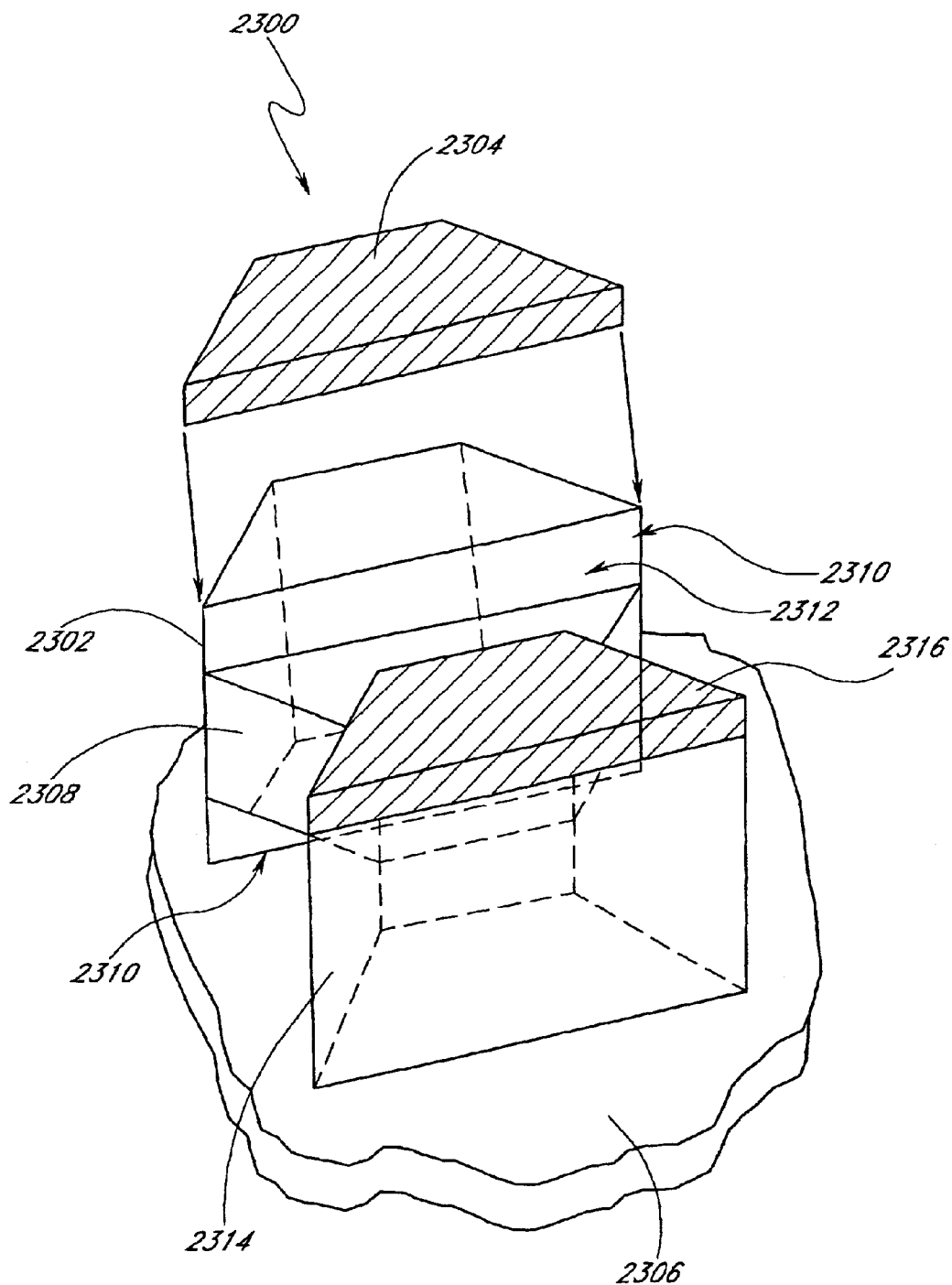
FIG. 23 illustrates one embodiment with an electro-optically active region with conductors above and below for producing a vertically electric field therein, further comprising additional conductors for producing an oppositely directed vertically electric field so as to further reduce fringing fields and provide a sharper total internal reflection boundary.

The optical switch depicted in FIG. 23, further includes a third section 2314, which together with the first section 2302 sandwich the second section 2308 therebetween. This third section 2314 also includes an electrode 2316 on top. A voltage is applied between the electrode 2316 and the ground plane 2306 to induce an electric field having an opposite polarity as the electric field within the first section 2302. The fringe fields within the second section 2308 caused by these two oppositely directed electric field will counteract each other and preferably cancel out.

Figure 24:
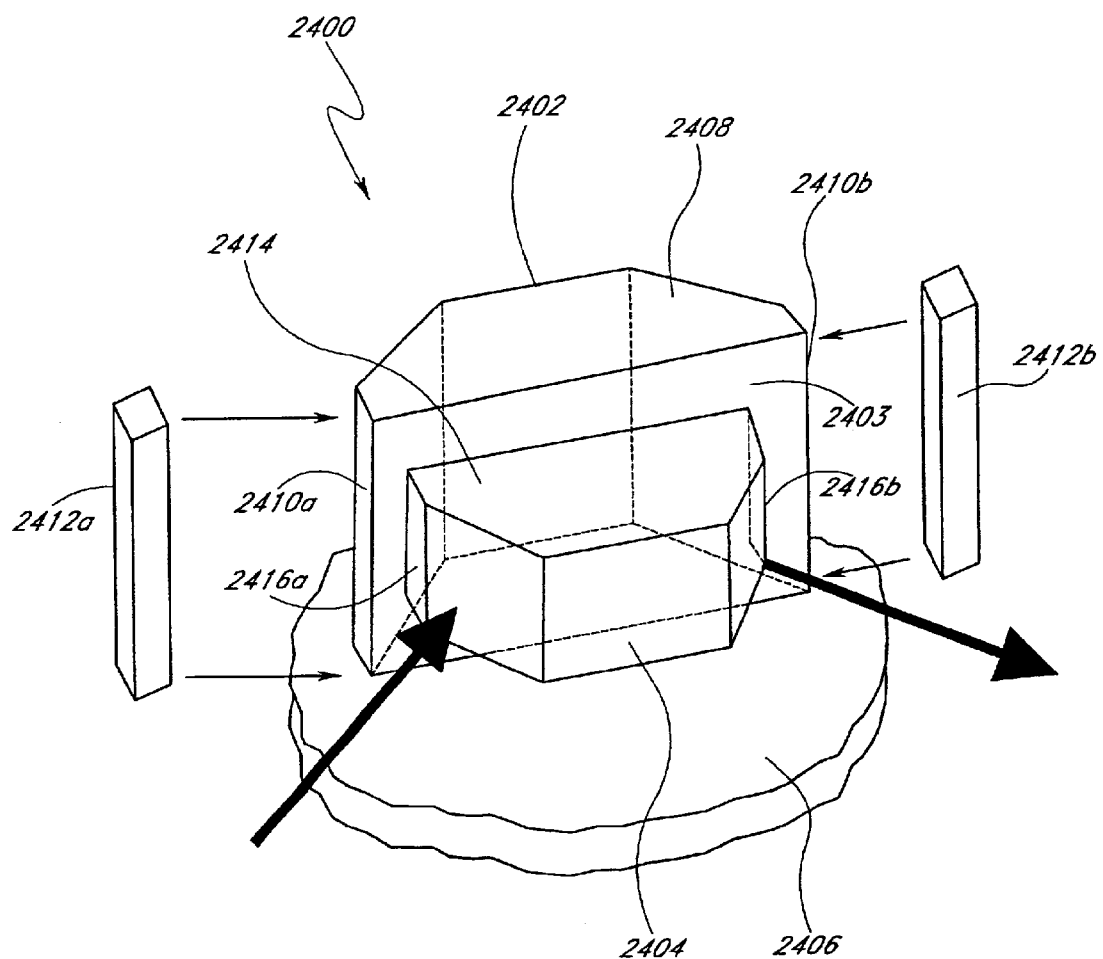
FIG. 24 illustrates an optical switching element comprising an electro-optically active region surrounded on two sides by electrodes that produce a horizontal electric field therebetween, wherein fringe electric fields are attenuated by decreasing the thickness of an adjacent region.

A similar design can be created wherein electrodes are laterally disposed on opposite sides of the electro-optically active material to produce a horizontally directed electric field as shown in FIG. 24. A switching element 2400 comprises first and second portions 2402 and 2404 separated by a boundary 2403 and formed on a substrate 2206. The first portion 2402 preferably comprising electro-optically active material and has a top 2408 and bottom (not shown) and at least two opposite sides 2410a, 2410b. The top 2408 is vertically spaced apart from the bottom and the two opposite sides 2410a, 2410b are horizontally space apart from each other. Electrodes 2412a and 2414b are laterally disposed adjacent the opposite sides 2410a and 2410b of the first portion 2402. A horizontally directed electric field through the first portion 2402 can be produced by applying a voltage across the electrodes 2412a and 2412b on opposite sides 2410a and 2410b of the first portion 2402. The second portion 2404 also has a top 2414 and bottom (not shown) and two sides 2416a and 2416b. The second portion 2404, however, has a smaller horizontal thickness compared to the first portion 2402. The distance between the two opposite sides 2416a and 2416b is smaller in the second portion 2404 than in the first portion 2402 at least at the boundary 2403 between the first and second portions 2402 and 2404. The second portion 2404 also preferably has smaller vertical thickness compared to the first portion 2402. The distance between the top 2414 and the bottom of the second portion 2404 is smaller than that of the first portion 2402 at least at the boundary 2403 between the first and second portions 2402 and 2404. The reduced thickness allows for air, vacuum, or dielectric material, possible low k dielectric material, to surround the second portion 2404 and attenuate fringe fields caused by the electrodes 2412a and 2412b associated with the first portion 2402.

The shape of the switch 2400 and the first and second portions 2402, 2404 may be other than that shown in FIG. 24. Although the first and second portions 2402, 2404 appear to be faceted to provide for surfaces normal to the propagation of incoming and outgoing beams, the switch 2400 can be outfitted with curved surfaces, possibly to provide a lensing effect, for example, to facilitate coupling of the beam into or out of the switch. In addition, waveguides, optical fibers or other conduits for directing optical energy into and out of the switch may be included. These waveguides may be located within a plane and similarly define a plane of incidence as described above. Alternatively, the switches may be separated by free space and the optical beams may propagate in free space from one switch to another. These features may also be included in the other switches, switching modules, and optical components described herein.

Also, as with the other switches described herein, the first and second portions 2402, 2404 comprises material substantially optically transmissive to the incoming light beam. They may comprise polycrystalline, crystalline or amorphous material, semiconductor or dielectric. The material, may for example comprise PLZT, glass, sapphire, silica, or polymer. These materials may be electro-optically active or inactive. Sol gels are preferred for fabrication as is fabrication by MOCVD and metal organic decomposition (MOD).

Figure 25:
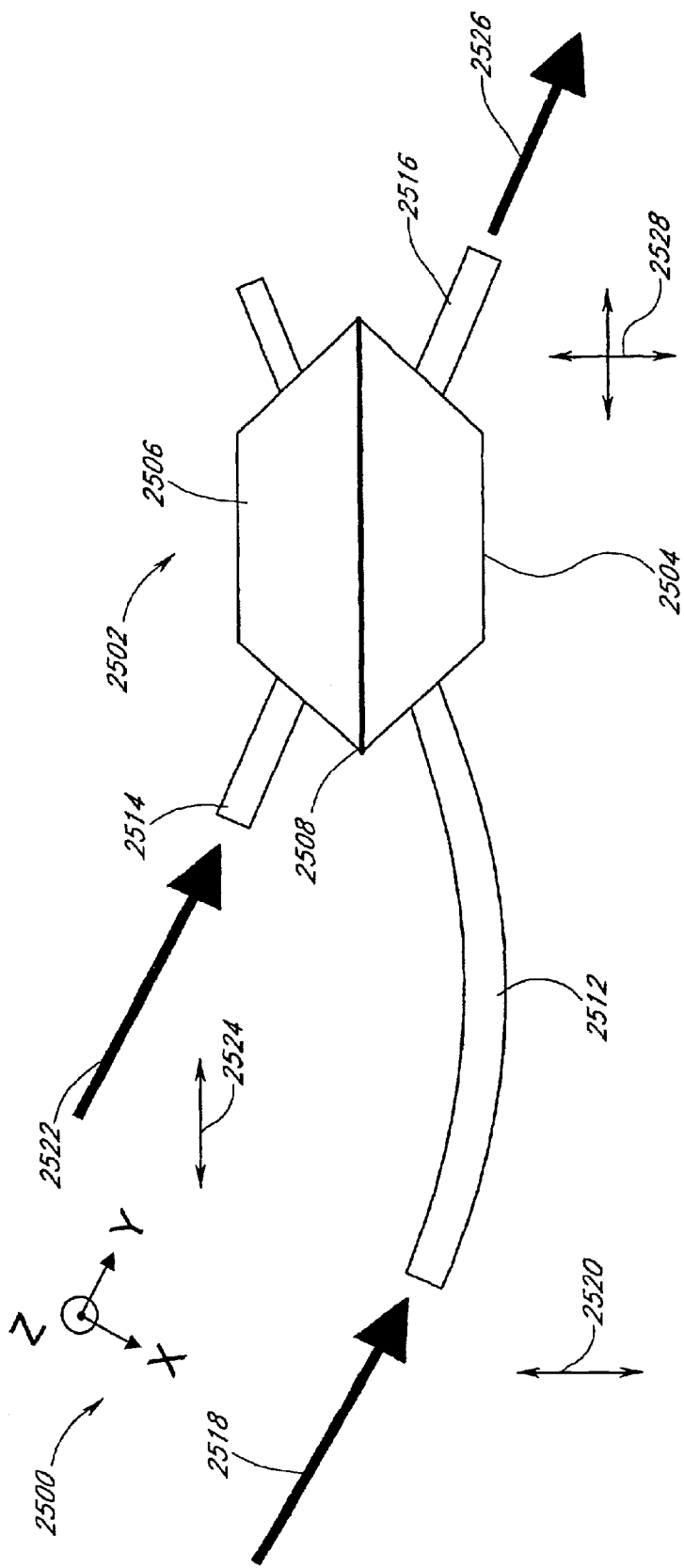
FIG. 25 shows a combiner comprising an optical switch.

These switches elements may be employed to combine separate optical signals in a similar fashion as the combining elements 1602 and 1702 in the combiners 1600 and 1700 discussed above in connection with FIGS. 16 and 17. A combiner 2500, for example, such as shown in FIG. 25 may include a switching element 2502 comprising first and second sections 2504, 2506 separated by a boundary 2508. The first section may comprise electro-optically active material and be electroded on opposite sides such as on top and bottom. In the top view shown in FIG. 25 a top electrode electrodes 2510 is spaced apart in the Z direction from a bottom electrode (not shown) with the electro-optically active material of the first portion located therebetween.

The switching element 2502 may be outfitted with first and second input waveguides 2512 and 2514, connected to the first and second portions 2504 and 2506 respectively. The first input waveguide 2512 is longer than the second 2514 so as to introduce phase delay in the optical beam propagating through the first waveguide 2512. The switching element 2500 further includes an output waveguide 2516 for outputting a combined beam corresponding to the inputs to the first and second input waveguides 2512 and 2514.

In one embodiment, a first light beam 2518 having a vertical polarization state 2520 is input into the first input waveguide 2512 and a second light beam 2522 having a horizontal polarization state 2524, i.e., in the Z-direction, is input into the second input waveguide 2514. Since the first input waveguide 2512 is longer than the second input waveguide 2514, the first light beam 2518 propagates a longer distance than the second input beam 2522. In this manner, the combiner 2500 introduces a phase shift between the first and second input light beams 2518, 2522.

The first input waveguide 2512 directs the first input beam 2518 into the first portion 2504 of the switching element 2502 and towards the interface 2508 between the two portions 2504 and 2506. Application of a voltage across the electrodes creates an electric field in the second portion 2506 that is oriented in the Z direction 2508. This electric field is therefore parallel to the vertical polarized light of the first input beam 2518. In one embodiment, the index of refraction in the second portion 2506 is reduced for the first input beam 2518. Preferably, the amount of reduction is such that the first input beam 2518 is totally internally reflected from the boundary 2508 and exits the first portion 2504 of the switching element 2502 through the output waveguide 2516.

The second input waveguide 2514 directs the second input beam 2522 into the second portion 2506 of the switching element 2502 and towards the interface 2508 between the two portions 2504 and 2506. Application of a voltage across the electrodes causes the index of refraction in the second portion 2506 to be increased for the second input beam 2522, however, this increase is preferably not sufficient to cause the second input beam 2522 to be totally internally reflected from the boundary 2508. Instead, the second input beam 2522 is transmitted through the boundary 2508 into the first portion 2504 of the switching element 2502 without substantial loss. This horizontally polarized second input beam 2522 exits the first portion 2504 of the switching element 2502 through the output waveguide 2516. The vertically polarized and horizontally polarized input beams 2518, 2422 are thereby combined in the switching element 2502 and exit together out of the output waveguide 2516 as an output beam 2526 comprising a polarization state 2528 that includes both vertical and horizontal polarization components.

As described above, phase delay may be introduced by a passive or active element. As illustrated in FIG. 25, the passive delay may simply involve providing an additional length of material through which the first optical signal 2518 travels. The path length traversed by the first optical signal 2518 will therefore be different than that of the second optical signal 2522. In one embodiment, the first optical waveguide 2512 may have an effective index of refraction that different from that of the second waveguide 2510. The delay introduced will be determined by the difference in optical path length, which depends on both distance (i.e., the respective lengths of the optical waveguides) and their refractive indices.

More preferably, the delay element comprises a variable delay element, having a delay which can be specifically tailored for the device to account, for example, for manufacturing tolerances and/or environmental conditions. As discussed above, a variable delay element may comprise an electo-optically active material having an index of refraction that can be altered upon application of an electric or magnetic field. The optical signal that passes through the delay element propagates at a higher or lower phase velocity through the delay element, depending on the index of refraction of this element. The relative phase or phase difference between the first and second optical signals can be adjusted by varying the optical path length of the delay element, which is determined in part by the distance the signal travels through the element and its index of refraction of the material.

Figure 26:
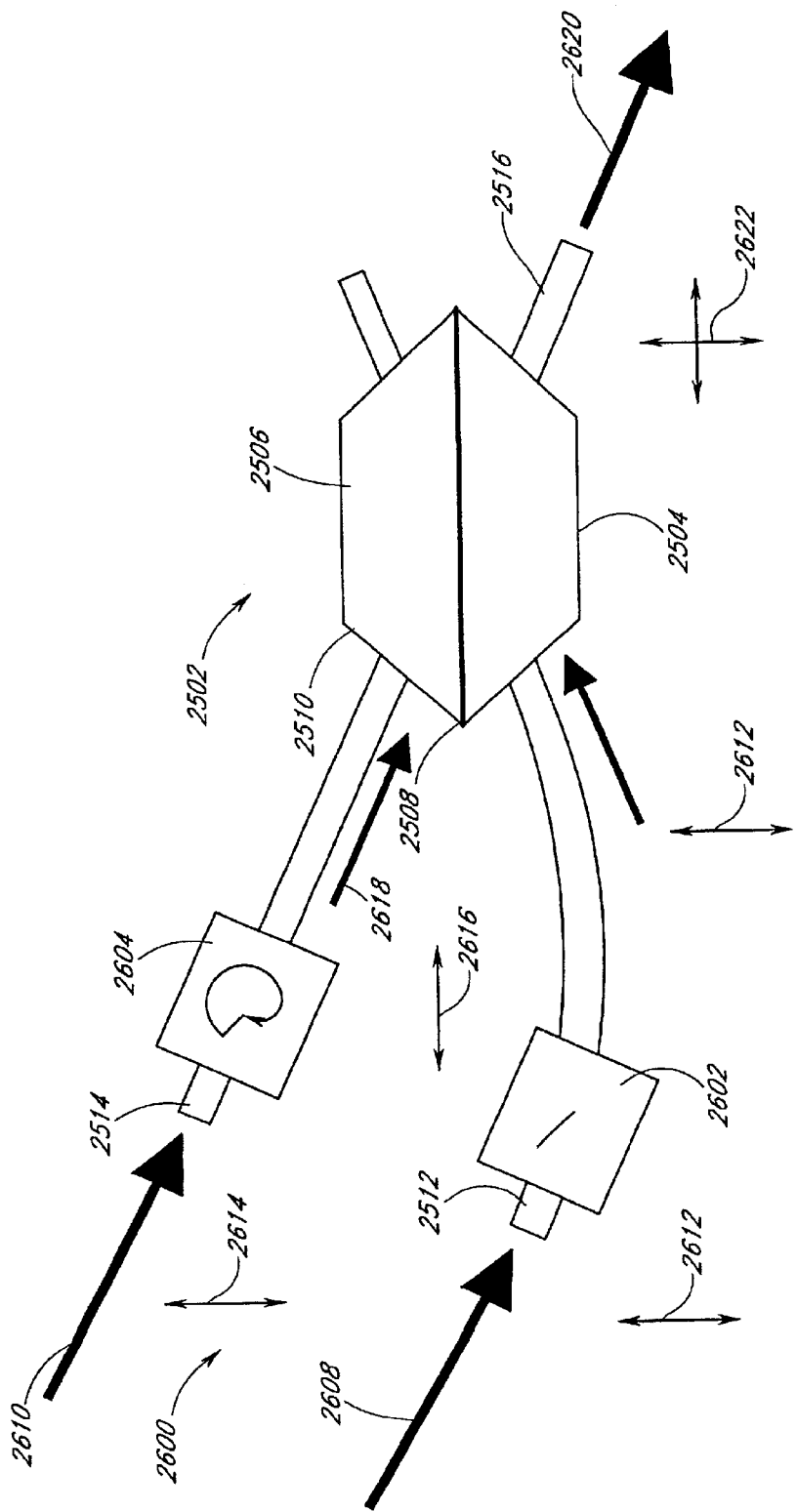
FIG. 26 depicts a combiner similar to that shown in FIG. 26 further comprising a polarization rotator and a delay element.

FIG. 26 depicts an alternate but similar embodiment to that shown in FIG. 25, wherein a combiner 2600 includes a delay element 2602 in one arm and a polarization rotator 2604 for rotating a linear polarization by approximately 90° in another arm. The delay element 2602 may enable the length of the first input waveguide 2512 to be reduced compared to the embodiment shown in FIG. 25.

With the polarization rotator 2604 in one of the arms 2512, 2514, a first and second optical input beams 2608 and 2610 may have like polarization states 2612 and 2614. In one embodiment, for example, the first and second optical input beams 2608 and 2610 may both have vertical polarizations 2612 and 2614. The first input beam 2608 propagates through the optical combiner 2600 in a similar manner as described above in connection with FIG. 25, however, the first input beam passes through the delay element 2602 in the first arm 2512. This delay element 2602 introduces a phase shift between the first and second input beams 2608 and 2610 increasing or decreasing the relative phase difference between these two signals 2610 and 2612.

In contrast, the second input beam 2610 input into the second input waveguide 2514 propagates through the polarization rotator 2604, which rotates its polarization by about 90°. Thus, the vertical polarization 2614 of the second beam 2610 is transformed into a horizontal polarization state 2616. The second, now horizontally polarized beam 2618, propagate on through the switching element 2502 as described above in connection with FIG. 26. The two beams 2608 and 2610 are combined together in the combining element 2502, the combination forming an output beam 2620 that is output from the output waveguide 2516. This output beam 2620 include both vertically polarized light from by the first input beam 2608 as well as horizontal polarization light from the rotated second input beam 2610. The result is a polarization state 2622 of the output beam 2620 comprising both vertical and horizontal polarization components. The two input beams 2608 and 2610 are therefore successfully combined together.

The phase delay element 2602 and the polarization rotator 2604 may be included on either or both input waveguides 2512 and 2514. Also, in other embodiments, horizontally polarized light can be can be input into the two input waveguides 2512 and 2514.

Figure 27:
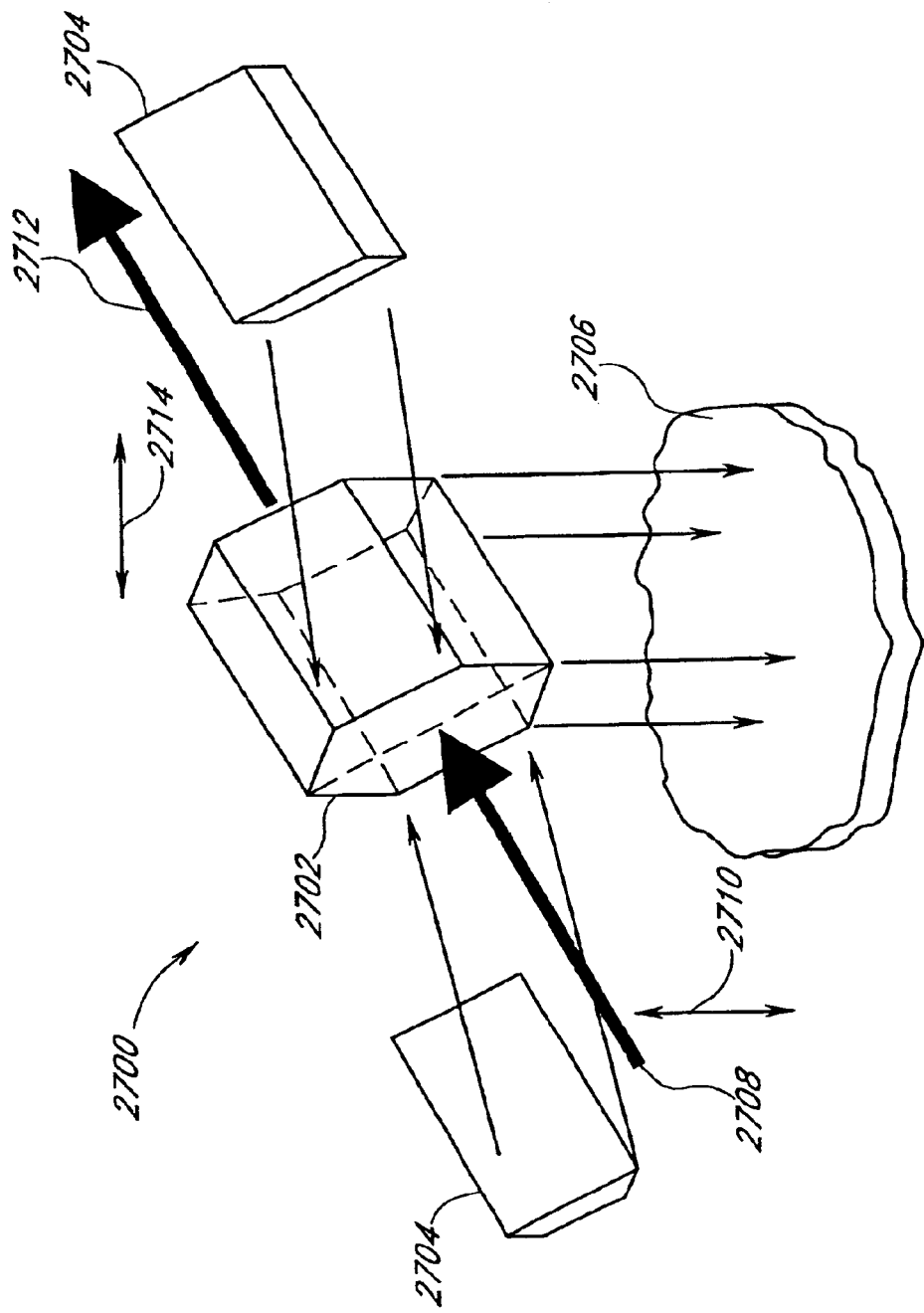
FIG. 27 shows a polarization rotator comprising electro-optically active material and a pair of electrodes for inducing birefringence in that material to cause a phase shift between orthogonal polarization components within an optical beam passing through the rotator.

An example of a polarization rotator 2700 is illustrated in FIG. 27. This polarization rotator 2700 has a body 2702 comprising electro-optically active material and a pair of spaced apart electrodes 2704. The polarization rotator may be formed in or on a substrate 2706.

The electro-opitcally active material, preferably comprises material having a different index of refraction for different, preferably orthogonal, polarization directions. These directions are conventionally referred to as axes. Light having a polarization aligned with one axis will propagate through the material at a different phase velocity than light having a linear polarization aligned with the orthogonal axis. This effect is referred to as birefringence and the two axes are conventionally known as fast and slow axes.

Birefringence may be induced in various electro-optically active materials by application of an appropriately oriented electric field. One such material in lead lanthanum zirconium titanate (PLZT). Accordingly, in one preferred embodiment, the body 2702 of the rotator 2700 comprises electro-optically active PLZT.

As shown in FIG. 27, an input light beam 2708 having a first polarization state 2710, such as a vertical polarization, may be directed into the body 2702 of the polarization rotator 2700. In one embodiment, the fast and slow axes are oriented 45° with respect to the vertical and horizontal polarization directions. The electrodes 2704 may need to be appropriately positioned about the body 2702 of the rotator 2700 and with respect to the polarization of the input beam 2708. In one preferred embodiment, for example, the electrodes 2704 are space apart along an axis so as to induce an electric field therebetween that is aligned with this axis. This axis will correspond to one of the fast or slow axes. Accordingly, in one embodiment the polarization of the input light beam 2702 is preferably oriented at an angle of about 45° with respect to this axis established by the electrodes 2704 and the electric field.

The vertically polarized input beam 2708 can be reduced to components aligned with each of the fast and slow axes. Light polarized parallel with the fast axis will propagate through the body 2702 at different phase velocity than light polarized parallel with the slow axis. A relative phase difference will result between the two components. If this relative phase difference is 180° or $\pi$ radians or a half-wave ($\lambda/2$) or integral multiples thereof, the vertical polarization 2710 of the incoming beam will be rotated by 90°. A beam output 2712 from the rotator will have a polarization state 2714 that is linear and horizontal. In this manner, vertically polarized light can be rotate by about 90° and converted into horizontally polarized light and vice versa.

The length of the body 2702 through which the beam travels as well as the amount of birefringence induced by the electrodes 2704 establishes the phase difference imparted on the polarization components parallel to the fast and slow axes. Preferably, the length and the amount of voltage applied to the electrodes 2704 are such that the phase difference is 180° or $\pi$ radians or a half-wave ($\lambda/2$) or integral multiples thereof so as to produce a 90° polarization rotator.

One advantage of such an active optical element, is that the voltage applied can be varied to set this phase shift to be 180° or $\pi$ radians or a half-wave ($\lambda/2$) or integral multiples to account for manufacturing tolerances and/or environmental factors which would otherwise limit a half-wave plate having a fixed birefringence that cannot be adjusted.

This polarization rotator 2700 can be integrated possibly on a substrate, with waveguides, optical switches, and other optical devices. Accordingly, systems such as the optical component depicted in FIGS. 6 and 7 can be constructed. The type of polarization rotator, however, is not limited to that shown in FIG. 27. Numerous other configurations are considered possible. For example, other materials may be employed, both electro-optically active and inactive, with same or different types of birefringence. Further, the shape of the body and the location of the electrodes may be altered.

As described above, the change in index of refraction with applied voltage may be both different in magnitude and direction (i.e., increase or decrease) for different polarization states. PLZT, for example, exhibits a decrease in refractive index for light polarized parallel to the applied electric field and an increase in refractive index for light polarized perpendicular to the field. This decrease for parallel polarized light is also about three times that of the increase for the perpendicular polarization. This feature of the electro-optic material can be exploited to obtain additional switching functions by applying the appropriate electrical signals to the device.

Figure 28:
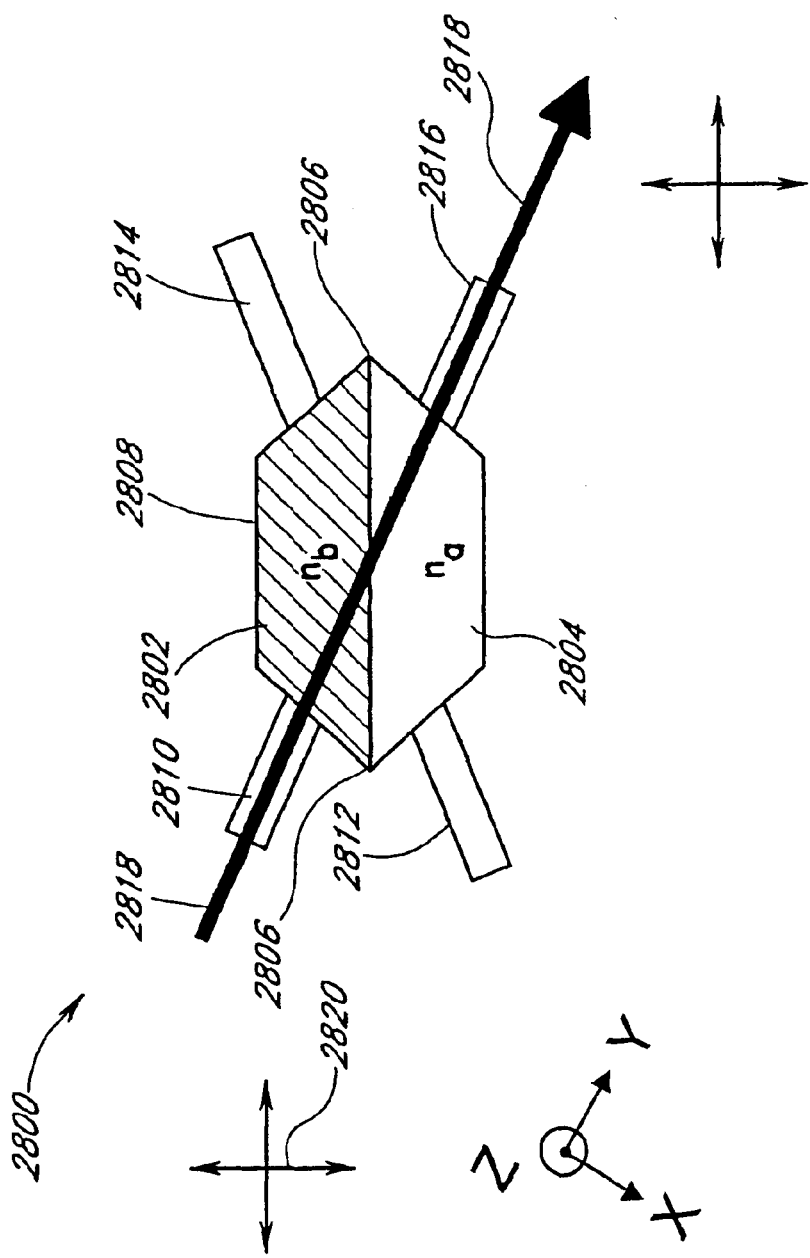
FIGS. 28–30 show the switch of FIG. 18 in three different states.
Figure 29:
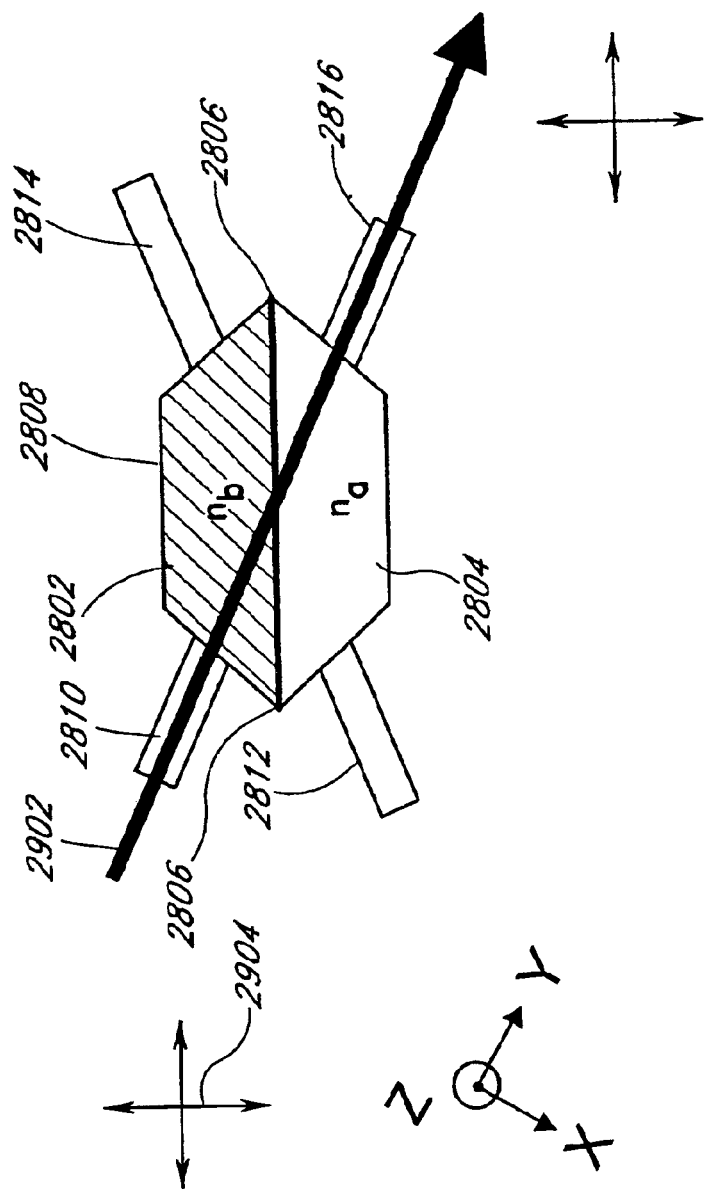
Figure 30:
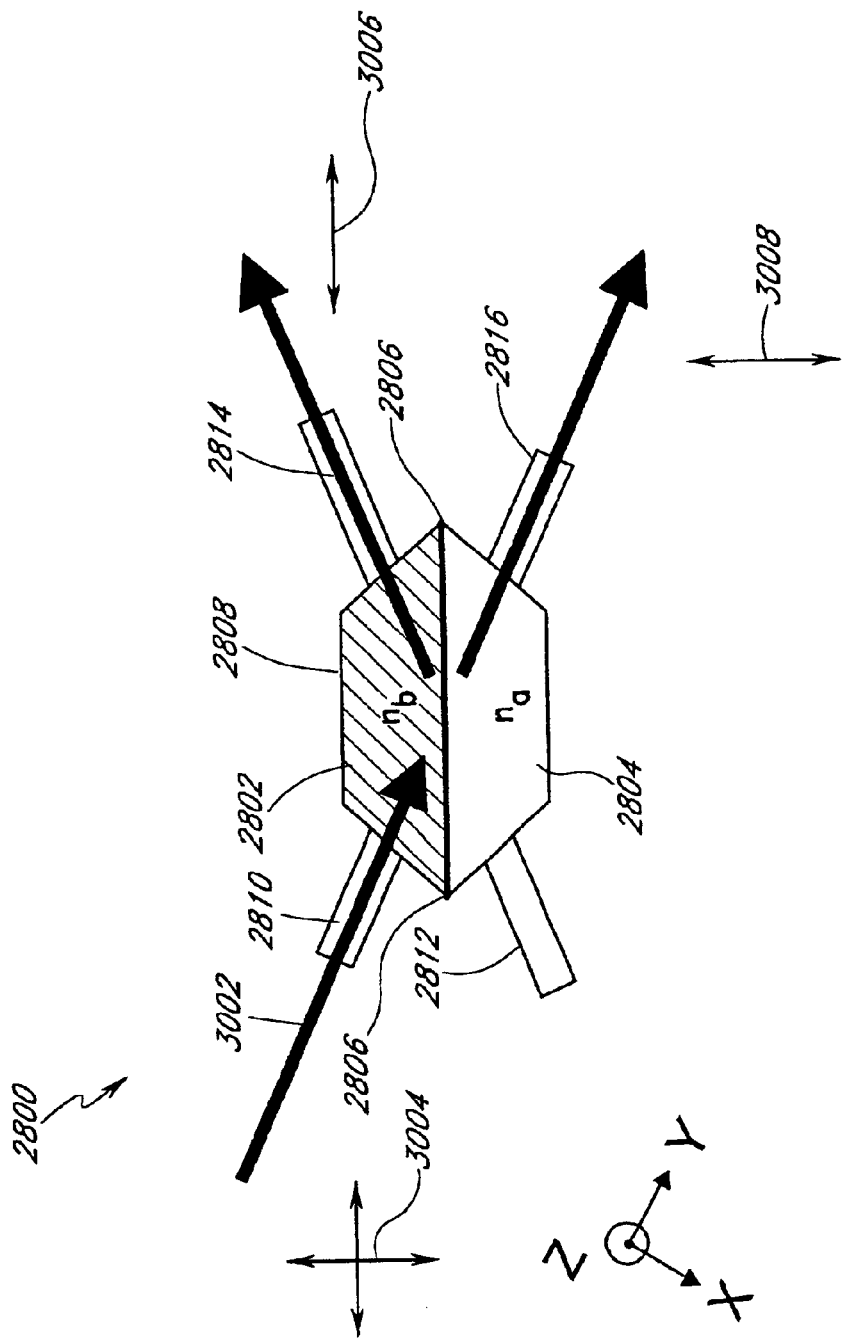

An optical switch 2800 similar to that depicted in FIGS. 18 and 19 is shown in FIGS. 28–30. As discussed above, in one preferred configuration, this switch 2800 is separated into first and second regions 2802, 2804 by a boundary 2806. Preferably, the first region 2802 comprises electro-optic material and has a pair of electrodes 2808 associated therewith. The electrodes 2808 are spaced apart, for example, in the Z direction so as to induce a vertically directed electric field (i.e., into or out of the page) through the first region 2802. In one preferred embodiment, the electro-optic material within the first region 2802 comprises PLZT.

A pair of input waveguides 2810 and 2812 and a pair of output waveguides 2814 and 2816 extend from the switch 2800. One input and one output waveguide 2810 and 2814 are optically connected to and permit coupling of light into and out of the first region 2802. Similarly, one input and one output waveguide 2812 and 2816 are optically connected to and permit coupling of light into and out of the second region 2804.

In one embodiment, when no voltage is applied across the electrodes 2808, the switch 2800 is in a first state. In this first state, an incoming beam 2818 comprising an arbitrary polarization state 2820 including both vertical and horizontal polarization components can be coupled into the first portion 2802 through the input waveguide 2810, and it will be substantially transmitted through the boundary 2806. This light beam may comprise, for example, unpolarized or randomly polarized light or light having a polarization that changes and is not known. Preferably, the first and second regions 2802 and 2804 have substantially similar or identical indices of refraction when the switch 2800 is in this state. Accordingly, the light incident on the boundary 2806 between the first and second regions 2802 and 2804 will pass through with negligible reflection. This beam 2818 continues through the second section 2804 and is output through the output waveguide 2816. As described above with reference to FIGS. 18 and 19, light coupled into the switch 2800 via the other input waveguide 2812 will enter the second region 2804, pass through the boundary 2806 into the first region 2802 and exit through the output waveguide 2814. Again, index matching between the first and second regions 2802 and 2804 provides substantial transmission through the boundary 2806.

The switch 2800 can be set to a second state by applying a voltage across the electrodes 2808 and inducing an electric field in the first region 2802 as shown in FIG. 29. With the applied voltage, the index of refraction of the first region 2802 will be lowered for light polarized parallel to the electric field, i.e., parallel to the Z direction, and preferably, this index is reduced below the refractive index in the second region 2804. FIG. 29 shows a light beam 2902 having both vertical and horizontal polarization components 2904 coupled into first section 2802 through the first input waveguide 2810. Since the vertically polarized light component is oriented parallel to the electric field, it will experience a reduced index of refraction in the first region 2802. Accordingly, this component will pass through the boundary 2806 into the higher index second section 2804 and will exit the switch 2802 through the output waveguide 2816.

The voltage for this second switch state is selected to induce a sufficient reduction in the index of refraction of the first region 2802 such that light coupled into the input waveguide 2812 attached to the second section 2804 with polarization parallel to the electric field will be reflected from the boundary 2806 by total internal reflection and will exit through the output waveguide 2816 as shown in FIG. 19 and discussed with reference thereto.

With application of this voltage to the electrodes 2808, the index of refraction of electro-optically active material in the first region 2802 will increase for light polarized perpendicular to the applied electric field. Thus, the index of the first region 2802 preferably exceeds the index of the second region 2804. The voltage may, however, be such that only a small increase in refractive index results. As discussed above, this increase is about ⅓ the magnitude of the decrease in refractive index associated with the parallel polarization component. In this second state, the voltage is appropriately selected to produce an increase in the index of refraction of the first region 2802 of the switch 2800 that is sufficiently small that the horizontal polarization components do not experience total internal reflection at the boundary 2806 between the higher index first region 2802 and the lower index second region 2804. Thus, the horizontally polarized light component as well as the vertical polarization components are substantially transmitted through the boundary 2806 when the switch 2800 is in this second state.

With the application of a higher voltage to the electrodes 2808, the switch 2800 can be set to a third state, which is depicted in FIG. 30. As above, with the applied voltage, the index of refraction of the first region 2802 will be lowered for light polarized parallel to the electric field, i.e., parallel to the Z direction, and preferably, below the refractive index in the second region 2804. FIG. 30 shows a light beam 3002 having both vertical and horizontal polarization components 3004 coupled into first section 2802 through the first input waveguide 2810. Since the vertically polarized light component is oriented parallel to the electric field, it will have associated with it a reduced index of refraction when propagating through the first region. Accordingly, this vertical component 3006 will pass through the boundary 2806 into the higher index second section 2804 and exit the switch 2802 through the output waveguide 2816.

When the switch is in this third state, the index of refraction of the first region 2802 will be reduced sufficiently below that of the second region such that light coupled into the input waveguide 2812 attached to the second "higher index" region 2804 with polarization parallel to the electric field will be reflected from the boundary 2806 by total internal reflection and will exit through the output waveguide 2816. This case is depicted in FIG. 19.

As discussed above, with application of this voltage to the electrodes 2808, the index of refraction of electro-optically active material in the first region 2802 will increase for light polarized perpendicular to the applied electric field. In this third state, the voltage applied is higher than that for the second state. In particular, this voltage is selected to raise the index of refraction of the first region 2802 of the switch 2800 a sufficient amount so that the horizontal polarization components are totally internally reflected at the boundary 2806 between the higher index first region 2802 and the lower index second region 2804. Thus, the horizontally polarized light component 3008 in the input beam 3002 that enters the first region 2802 is reflected at the boundary 2806 and exits through the output waveguide 2814 when the switch 2800 is in this third state.

This voltage will be higher than the voltage applied to the electrodes 2808 to switch light sent through the input waveguide 2812 into the second region 2804 to be totally internally reflected from the boundary 2808 as shown in FIG. 19. The reason for this disparity in applied voltage is that the electro-optic material manifests a smaller increase in refractive index for perpendicular polarization components in contrast to the larger decrease in index for light polarized parallel to the electric field (i.e., for PLZT, $\Delta n_{perpindicular} = \frac{1}{3} \Delta n_{parallel}$).

Thus, as illustrated in FIGS. 28–30, a variety of states can be obtained which can be used in incorporating this switch into varies components and designs.

The types of switches and optical components are not to be limited to those described above which are only set forth as examples. The optical switch may, for example, be configured to reflect an incoming optical signal when the voltage is not applied and to transmit the optical signal therethrough without reflection when the voltage is applied. Electro-optically active materials having an index that increase and/or decrease with applied voltage may be employed and either the increase or decrease may be exploited to induce total internal reflection depending on the configuration of the device.

As described above, the switch includes at least two sections at least one of which comprises electro-optically active material. Switching may be effectuated by creating an index miss match between these two section that results in total internal reflection for a range of angles. The switch is preferably configured to receive an input within this range of angles which is preferably beyond the critical angle when the switch is to provide reflection. The index mismatch can be created by either increase and/or decreasing the index of refraction of electro-optically active material in one or both sections. Application or removal of an electric field to either or both of the sections may be employed to induce such changes in refractive index and cause total internal reflection. This field applied to the two sections can be the same or different. The index of either of the sections can remain fixed or be changeable.

When the input optical signal is not to be reflected, the two sections preferably are index matched. However, such index matching is not required and the indexes of the two sections can be different and yet provide for transmission. Again, this state of the switch can be set either with the application of fields to one or both sections or with removal of such fields.

The two section are described above as being separated by a boundary. This boundary may be a physical interface where two materials meet in the case where the two sections comprise different materials. Alternatively, this boundary may be the interface between same or similar materials with different properties or different states. This boundary may be established by the regions where the electrodes extend and/or overlap or where the electric field is induced. This boundary may also be established by regions where the index of refraction for one or more polarization states is different when the switch is in at least one of its states. Other features on the switch, such as a step or change in thickness may indicate the location of the boundary. This boundary marks where the light is reflected when the switch is in a state that provides total internal reflection. This boundary may be sharp or gradual, however, preferably the index change between the two regions occurs over a sufficiently short distance to be described as sharp.

The two sections preferably have a dimension and shape to provide free space regions where the light passing therethrough is unguided. Reflection and switching occurs in this free space region. The switch can therefore be described as a non-waveguide or free space switch. Light can be coupled to the switch however either through waveguides such as optical fibers or planar waveguides. The optical waveguides preferably are planar single mode waveguides embedded in a planar substrate to provide optical pathways for optical communications signals. However, the waveguides is not limited to certain types of waveguides and may include ribbed waveguide, buried channel waveguides, etc., or waveguide based on technology yet to be developed. Alternatively, light can propagate in free space between the optical switches and/or other components. Lens or other coupling devices may be used to improve coupling efficiency.

Although the present invention has been described in detail herein with reference to the illustrated embodiments, it should be understood that the description is by way of example only and is not to be construed in a limiting sense. It is to be further understood, therefore, that numerous changes and the details of the embodiment of this invention and the additional embodiments of this invention will be apparent, and may be made by, persons of ordinary skill in the art having reference to this description. It is contemplated that all such changes and additional embodiments are within the spirit and true scope of the invention as claimed below.

What is claimed is:

1. An optical communications network comprising:
a plurality of fiber optic cables capable of carrying optical communications signals in the form of light beams;

a plurality of switching nodes capable of sending and receiving said optical communications signals, each of said nodes being connected to a predetermined group of said fiber optic cables for switching the optical pathway of said optical communications signals between said predetermined group of fiber optic cables, each of said switching nodes having a plurality of solid state total internal reflection optical switching elements connected to said fiber optic cables, said each of said solid state total internal reflection optical switching elements having:

a substantially planar substrate assembly which is electrically insulating and which is not substantially electro-optic, and containing substantially planar optical waveguides which are coplanar with and inside said substrate assembly and being capable of guiding the optical pathway of said optical communications signals, at least two of said waveguides meeting at a waveguide intersection inside said substrate assembly, an electro-optic switching part positioned inside said substrate assembly at said waveguide intersection and oriented to provide an optical pathway for said optical communications signals to travel through said part and between said waveguides, said switching part having a body material with an electro-optically active region, and activating electrodes positioned adjacent said switching part to create an optical total internal reflection boundary in said part when a voltage greater than a predetermined switching voltage is applied between said electrodes to create an electric field greater than a predetermined switching electric field inside said part, said electrodes being oriented to align said optical total internal reflection boundary at an angle greater than a predetermined critical angle with respect to said waveguides, a plurality of end nodes capable of converting optical communications signals into electronic communications signals, said end nodes being connected to said switching nodes through fiber optic cables for exchanging optical communications signals with said switching nodes, and a plurality of user stations being connected to said end nodes through electronic cables for exchanging electronic communications signals with said end nodes.

2. The optical communications network of claim 1 further comprising a plurality of interconnection nodes capable of exchanging optical communications signals at high speed and in substantial volume with each other, and connected to predetermined ones of said fiber optic cables for sending optical communications signals to said switching nodes and for receiving optical communications signals from said switching nodes.

3. The optical communications network of claim 2 further comprising a plurality of metro networks, each metro network having a plurality of said switching nodes, fiber optic cables for exchanging optical communications signals between said switching nodes, and at least one of said switching nodes in said metro network being connected to a fiber optic cable for exchanging optical communications signals with at least one of said interconnection nodes.

4. An optical communications network comprising:
a plurality of fiber optic cables capable of carrying optical communications signals in the form of light beams; and
a plurality of switching nodes capable of sending and receiving said optical communications signals, each of said nodes being connected to a predetermined group of said fiber optic cables for switching the optical pathway of said optical communications signals between said predetermined group of fiber optic cables, each of said switching nodes having a plurality of solid state total internal reflection optical switching elements connected to said fiber optic cables, said each of said solid state total internal reflection optical switching elements having:

a substantially planar substrate assembly which is electrically insulating and which is not substantially electro-optic, and containing substantially planar optical waveguides which are coplanar with and inside said substrate assembly and being capable of guiding the optical pathway of said optical communications signals, at least two of said waveguides meeting at a waveguide intersection inside said substrate assembly, an electro-optic switching part positioned inside said substrate assembly at said waveguide intersection and oriented to provide an optical pathway for said optical communications signals to travel through said part and between said waveguides, said switching part having a body material with an electro-optically active region, and activating electrodes positioned adjacent said switching part to create an optical total internal reflection boundary in said part when a voltage greater than a predetermined switching voltage is applied between said electrodes to create an electric field greater than a predetermined switching electric field inside said part, said electrodes being oriented to align said optical total internal reflection boundary at an angle greater than a predetermined critical angle with respect to said waveguides, wherein said body material comprises substantially homogenous electro-optic material, and wherein said activating electrodes are positioned across a first segment of the bulk of said body material, and said activating electrodes are not positioned across a second segment of the bulk of said body material, so that said optical total internal reflection boundary is created between said first segment and said second segment when a voltage greater than said predetermined switching voltage is applied to said activating electrodes.

5. The optical communications network of claim 4 wherein the thickness of said body material in said first segment is greater than the thickness of said body material in said second segment.

6. The optical communications network of claim 4 wherein said body material comprises lead lanthanate zirconate titanate.

7. An optical communications network comprising:
a plurality of fiber optic cables capable of carrying optical communications signals in the form of light beams; and
a plurality of switching nodes capable of sending and receiving said optical communications signals, each of said nodes being connected to a predetermined group of said fiber optic cables for switching the optical pathway of said optical communications signals between said predetermined group of fiber optic cables, each of said switching nodes having a plurality of solid state total internal reflection optical switching elements connected to said fiber optic cables, said each of said solid state total internal reflection optical switching elements having:

a substantially planar substrate assembly which is electrically insulating and which is not substantially electro-optic, and containing substantially planar optical waveguides which are coplanar with and inside said substrate assembly and being capable of guiding the optical pathway of said optical communications signals, at least two of said waveguides meeting at a waveguide intersection inside said substrate assembly, an electro-optic switching part positioned inside said substrate assembly at said waveguide intersection and oriented to provide an optical pathway for said optical communications signals to travel through said part and between said waveguides, said switching part having a body material with an electro-optically active region, and activating electrodes positioned adjacent said switching part to create an optical total internal reflection boundary in said part when a voltage greater than a predetermined switching voltage is applied between said electrodes to create an electric field greater than a predetermined switching electric field inside said part, said electrodes being oriented to align said optical total internal reflection boundary at an angle greater than a predetermined critical angle with respect to said waveguides, where said body material further comprises a non-electro-optically active region adjacent to said electro-optically active region, and positioned to make the boundary between said regions coincide with said optical total internal reflection boundary.

8. The optical communications network of claim 1 wherein said electro-optically active region comprises lead lanthanate zirconate titanate.

9. The optical communications network of claim 1 wherein said switching part is substantially thicker and substantially wider than said waveguides, so that light beams entering said switching part from said waveguides are substantially unguided and propagate through said switching piece in a substantially free space mode.

10. An optical communications network comprising:

a plurality of fiber optic cables capable of carrying optical communications signals in the form of light beams; and a plurality of switching nodes capable of sending and receiving said optical communications signals, each of said nodes being connected to a predetermined group of said fiber optic cables for switching the optical pathway of said optical communications signals between said predetermined group of fiber optic cables, each of said switching nodes having a plurality of solid state total internal reflection optical switching elements connected to said fiber optic cables, said each of said solid state total internal reflection optical switching elements having:

a substantially planar substrate assembly which is electrically insulating and which is not substantially electro-optic, and containing substantially planar optical waveguides which are coplanar with and inside said substrate assembly and being capable of guiding the optical pathway of said optical communications signals, at least two of said waveguides meeting at a waveguide intersection inside said substrate assembly, an electro-optic switching part positioned inside said substrate assembly at said waveguide intersection and oriented to provide an optical pathway for said optical communications signals to travel through said part and between said waveguides, said switching part having a body material with an electro-optically active region, and activating electrodes positioned adjacent said switching part to create an optical total internal reflection boundary in said part when a voltage greater than a predetermined switching voltage is applied between said electrodes to create an electric field greater than a predetermined switching electric field inside said part, said electrodes being oriented to align said optical total internal reflection boundary at an angle greater than a predetermined critical angle with respect to said waveguides, wherein said switching part is positioned inside a cavity in said substrate assembly, said cavity having a lateral periphery, said cavity extending into the thickness of said substrate assembly to a depth such that the cross section of said waveguides at said waveguide intersection is exposed to said lateral periphery of said cavity.

11. An optical communications switching node comprising:

a plurality of optical inputs to said switching node for receiving optical communications signals;

a plurality of optical outputs from said switching node for sending optical communications signals;

a node controller capable of providing electronic switch selection signals that specify the optical pathway for optical communications signals traveling between said optical inputs and said optical outputs, said electronic switch selection signals exceeding a predetermined switching voltage; and an optical component connected to said optical inputs and to said optical outputs, and responsive to said electronic switch selection signals, said optical component having a plurality of solid state total internal reflection optical switching elements connected, each of said solid state total internal reflection optical switching elements having:

a substantially planar substrate assembly which is electrically insulating and which is not substantially electro-optic, and containing substantially planar optical waveguides which are coplanar with and inside said substrate assembly and being capable of guiding the optical pathway of said optical communications signals, at least two of said waveguides meeting at a waveguide intersection inside said substrate assembly, an electro-optic switching part positioned inside said substrate assembly at said waveguide intersection and oriented to provide an optical pathway for said optical communications signals to travel through said part and between said waveguides, said switching part having a body material with an electro-optically active region, and activating electrodes positioned adjacent said switching part to create an optical total internal reflection boundary in said part when a voltage greater than said predetermined switching voltage is applied between said electrodes to create an electric field greater than a predetermined switching electric field inside said part, said electrodes being oriented to align said optical total internal reflection boundary at an angle greater than a predetermined critical angle with respect to said waveguides.

12. A method of using an optical communications network comprising:

sending optical communication signals on fiber optic cables connected in a network, and directed to be received by a predetermined destination node connected to the network;

providing node control signals to specify the optical pathway for said optical communications signals through nodes connected to said fiber optic cables in said network; and switching the optical pathway for said optical communications signals inside a node connected to the network, in response to said node control signals, using a plurality of solid state total internal reflection optical switching elements connected to said fiber optic cables, said each of said solid state total internal reflection optical switching elements having;

a substantially planar substrate assembly which is electrically insulating and which is not substantially electro-optic, and containing substantially planar optical waveguides which are coplanar with and inside said substrate assembly and being capable of guiding the optical pathway of said optical communications signals, at least two of said waveguides meeting at a waveguide intersection inside said substrate assembly, an electro-optic switching part positioned inside said substrate assembly at said waveguide intersection and oriented to provide an optical pathway for said optical communications signals to travel through said part and between said waveguides, said switching part having a body material with an electro-optically active region, and activating electrodes positioned adjacent said switching part to create an optical total internal reflection boundary in said part when a voltage greater than a predetermined switching voltage is applied between said electrodes to create an electric field greater than a predetermined switching electric field inside said part, said electrodes being oriented to align said optical total internal reflection boundary at an angle greater than a predetermined critical angle with respect to said waveguides.

13. A method of using an optical communications switching node comprising:

receiving optical communications signals on a fiber optic cable connected to an input of said node;

receiving node control signals that specify the optical pathway for said optical communications signals through said node and switching the optical pathway for said optical communications signals inside said node, for sending said optical communications signals along an optical pathway to a fiber optic cable connected to a selected output of said node, said selected output being specified by said node control signals, said switching uses a plurality of solid state total internal reflection optical switching elements connected to said fiber optic cables, said each of said solid state total internal reflection optical switching elements having:

a substantially planar substrate assembly which is electrically insulating and which is not substantially electro-optic, and containing substantially planar optical waveguides which are coplanar with and inside said substrate assembly and being capable of guiding the optical pathway of said optical communications signals, at least two of said waveguides meeting at a waveguide intersection inside said substrate assembly, an electro-optic switching part positioned inside said substrate assembly at said waveguide intersection and oriented to provide an optical pathway for said optical communications signals to travel through said part and between said waveguides, said switching part having a body material with an electro-optically active region, and activating electrodes positioned adjacent said switching part to create an optical total internal reflection boundary in said part when a voltage greater than a predetermined switching voltage is applied between said electrodes to create an electric field greater than a predetermined switching electric field inside said part, said electrodes being oriented to align said optical total internal reflection boundary at an angle greater than a predetermined critical angle with respect to said waveguides.

* * * * *